US007950676B2

(12) United States Patent
Goldsmith et al.

(10) Patent No.: US 7,950,676 B2
(45) Date of Patent: May 31, 2011

(54) ARTICLE OF FOOTWEAR COMPRISING A UNITARY SUPPORT STRUCTURE AND METHOD OF MANUFACTURE

(75) Inventors: Edward M. Goldsmith, Studio City, CA (US); Roman D. Halko, Chula Vista, CA (US); Daniel Chartrand, Quebec (CA); Neil Wensley, Stevenson Ranch, CA (US)

(73) Assignee: Easton Sports, Inc., Van Nuys, CA (US)

( * ) Notice: Subject to any disclaimer, the term of this patent is extended or adjusted under 35 U.S.C. 154(b) by 593 days.

(21) Appl. No.: 10/939,265

(22) Filed: Sep. 10, 2004

(65) Prior Publication Data
US 2005/0116379 A1 Jun. 2, 2005

Related U.S. Application Data

(60) Provisional application No. 60/501,752, filed on Sep. 10, 2003.

(51) Int. Cl.
*A63C 1/22* (2006.01)

(52) U.S. Cl. ...................................... 280/11.12; 36/115

(58) Field of Classification Search ............... 280/11.27, 280/825, 11.18, 11.12, 11.19, 841, 7.13, 280/11.14, 11.15; 36/115, 10, 55, 117.6, 36/117.1, 825, 45, 118.2
See application file for complete search history.

(56) References Cited

U.S. PATENT DOCUMENTS

| 90,282 A | 5/1869 | McGrath |
|---|---|---|
| 475,650 A | 5/1892 | Wierda |
| 1,243,993 A | 10/1917 | Skoulikides |
| 1,371,609 A | 3/1921 | Drevitson |
| 1,666,690 A | 4/1928 | Drevitson |
| 2,034,091 A | 3/1936 | Dunbar |
| 2,095,942 A | 10/1937 | Wetterstrand |
| 2,129,492 A | 9/1938 | Dahlberg |
| 2,188,971 A | 2/1940 | Adonizio |
| 2,203,278 A | 6/1940 | Foley |
| D122,837 S | 10/1940 | Ebling |
| 2,219,123 A | 10/1940 | Wold |
| 2,356,490 A | 8/1944 | Crotty |

(Continued)

FOREIGN PATENT DOCUMENTS

AT 254009 5/1967

(Continued)

OTHER PUBLICATIONS

U.S. Appl. No. 60/443,449, filed Jan. 2003, Meibock, Antonin A.*

(Continued)

*Primary Examiner* — J. Allen Shriver, II
*Assistant Examiner* — John D Walters
(74) *Attorney, Agent, or Firm* — Perkins Coie LLP

(57) ABSTRACT

An article of footwear comprising a pliable upper component and a molded unitary support structure formed of a plurality of wall stuctures and methods of manufacturing are disclosed. Some embodiments include a sole and first and second side wall structures extending therefrom and partitioned from one another. The sole and the first and second side wall structures may be in part or entirely constructed of multiple layers of fibers having different orientations from one another and disposed in a hardened resin matrix. The pliable upper component comprises outer and inner panels that overlap the inner and outer surfaces of one or more of the side wall structures and are conjoined thereto.

24 Claims, 41 Drawing Sheets

U.S. PATENT DOCUMENTS

| | | |
|---|---|---|
| 2,414,967 A | 1/1947 | Meyers |
| 2,452,502 A | 10/1948 | Tarbox |
| 2,520,548 A | 8/1950 | Jack |
| 3,279,807 A | 10/1966 | Jacobson |
| 3,373,511 A | 3/1968 | Krapp |
| 3,526,976 A | 9/1970 | Jacobs |
| 3,535,418 A | 10/1970 | Daum et al. |
| 3,558,149 A | 1/1971 | Weidenbacker |
| 3,570,148 A | 3/1971 | Morgan |
| 3,581,412 A * | 6/1971 | Dalebout ................. 36/117.6 |
| 3,583,081 A | 6/1971 | Hayashi |
| 3,597,862 A | 8/1971 | Vogel |
| 3,689,091 A | 9/1972 | Nagin |
| 3,756,614 A | 9/1973 | Grubin |
| 3,784,217 A | 1/1974 | Staples |
| 3,785,662 A | 1/1974 | Staples |
| 3,807,062 A | 4/1974 | Spier |
| 3,814,453 A | 6/1974 | Staples |
| 3,829,111 A | 8/1974 | Nicholls |
| 3,866,927 A | 2/1975 | Tvengsberg |
| 3,877,710 A | 4/1975 | Nyitrai |
| 3,880,441 A | 4/1975 | Silver |
| 3,885,804 A | 5/1975 | Cudmore |
| 3,900,203 A | 8/1975 | Kukulowicz |
| 3,901,520 A | 8/1975 | McMahan |
| 3,918,729 A | 11/1975 | Peters |
| 3,934,892 A | 1/1976 | Baikie |
| 3,936,061 A | 2/1976 | Wada |
| 3,947,050 A | 3/1976 | Isely |
| 3,954,278 A | 5/1976 | McLeod |
| 3,967,832 A | 7/1976 | Chambers |
| 3,993,318 A | 11/1976 | Rothmayer |
| 3,999,772 A | 12/1976 | Brennan |
| 4,008,901 A | 2/1977 | Conn |
| 4,026,045 A | 5/1977 | Druss |
| D245,800 S | 9/1977 | Gustavsson et al. |
| D245,872 S | 9/1977 | Baikie et al. |
| 4,053,168 A | 10/1977 | Goverde |
| 4,058,324 A | 11/1977 | Dallaire |
| 4,070,029 A | 1/1978 | Panarelli |
| 4,071,938 A | 2/1978 | Chambers |
| 4,072,317 A | 2/1978 | Pommerening |
| 4,074,909 A | 2/1978 | Baikie |
| 4,085,944 A | 4/1978 | Chambers |
| 4,088,335 A | 5/1978 | Norton et al. |
| 4,093,249 A | 6/1978 | Chambers |
| D248,583 S | 7/1978 | Zuuring |
| 4,107,856 A | 8/1978 | Bourque |
| 4,108,450 A | 8/1978 | Cote |
| 4,114,295 A | 9/1978 | Schaefer |
| D249,973 S | 10/1978 | Norton et al. |
| 4,126,323 A | 11/1978 | Scherz |
| D250,490 S | 12/1978 | Baikie et al. |
| 4,132,016 A | 1/1979 | Vaccari |
| 4,138,127 A | 2/1979 | Kimmell et al. |
| 4,139,209 A | 2/1979 | Humphreys |
| 4,144,659 A | 3/1979 | Eisenberg |
| 4,150,455 A | 4/1979 | Fukuoka |
| 4,150,499 A | 4/1979 | Wang |
| 4,150,837 A | 4/1979 | Zuuring |
| D253,139 S | 10/1979 | Foldes |
| D253,670 S | 12/1979 | Gustavsson et al. |
| D254,201 S | 2/1980 | Norton et al. |
| D255,955 S | 7/1980 | Chiarella |
| 4,218,069 A | 8/1980 | Baikie |
| 4,222,183 A | 9/1980 | Haddox |
| 4,223,900 A | 9/1980 | Olivieri |
| 4,251,086 A | 2/1981 | Woolley |
| 4,264,090 A | 4/1981 | Davies |
| 4,268,981 A | 5/1981 | Olivieri |
| 4,272,090 A | 6/1981 | Wheat |
| 4,282,659 A | 8/1981 | Bourque et al. |
| 4,303,253 A | 12/1981 | Rottenkolber |
| D262,986 S | 2/1982 | Cox |
| 4,314,708 A | 2/1982 | Zuuring |
| 4,322,895 A | 4/1982 | Hockerson |
| 4,323,259 A | 4/1982 | Boudreau |
| 4,324,408 A | 4/1982 | Bensette et al. |
| 4,328,627 A | 5/1982 | Sanders |
| D264,984 S | 6/1982 | Olivieri |
| D265,016 S | 6/1982 | Haddox |
| 4,336,948 A | 6/1982 | Couture |
| 4,351,120 A | 9/1982 | Dalebout |
| 4,351,536 A | 9/1982 | Sandino |
| 4,351,537 A | 9/1982 | Seidel |
| 4,353,173 A | 10/1982 | Paquet |
| 4,353,562 A | 10/1982 | Tiefenthal |
| 4,363,494 A | 12/1982 | Klawitter |
| 4,379,563 A | 4/1983 | Arsenault |
| 4,384,413 A | 5/1983 | Bourque |
| 4,385,456 A | 5/1983 | Livernois et al. |
| 4,392,658 A | 7/1983 | Redmond et al. |
| 4,394,042 A | 7/1983 | Smith |
| D271,036 S | 10/1983 | Baikie |
| 4,407,522 A | 10/1983 | Suroff |
| 4,413,430 A | 11/1983 | Brown |
| 4,418,928 A | 12/1983 | Cox |
| 4,447,967 A | 5/1984 | Zaino |
| 4,453,727 A | 6/1984 | Bourque |
| D274,742 S | 7/1984 | Couture |
| D275,218 S | 8/1984 | Chang |
| 4,468,869 A | 9/1984 | Fukuoka |
| 4,470,205 A | 9/1984 | Olivieri |
| 4,492,385 A | 1/1985 | Olson |
| 4,507,880 A | 4/1985 | Ohashi |
| 4,509,276 A | 4/1985 | Bourque |
| 4,520,580 A | 6/1985 | Brown |
| 4,546,999 A * | 10/1985 | Lehr ............................. 280/825 |
| 4,549,742 A | 10/1985 | Husak et al. |
| 4,580,359 A | 4/1986 | Kurrash et al. |
| 4,603,868 A | 8/1986 | Schiitz |
| D285,819 S | 9/1986 | Bourque |
| D285,820 S | 9/1986 | Bourque |
| 4,618,158 A | 10/1986 | Liberkowski |
| D286,903 S | 11/1986 | Olivieri |
| 4,638,578 A | 1/1987 | Eiteljorg, II |
| 4,651,445 A | 3/1987 | Hannibal |
| 4,655,465 A | 4/1987 | Schaeffer |
| 4,656,761 A * | 4/1987 | Lord ............................. 36/77 R |
| 4,657,265 A | 4/1987 | Ruth |
| 4,666,169 A | 5/1987 | Hamill et al. |
| 4,693,021 A | 9/1987 | Mazzarolo |
| 4,699,390 A | 10/1987 | Cote |
| 4,708,352 A | 11/1987 | Vullierme |
| 4,724,627 A | 2/1988 | Sisco |
| 4,744,574 A | 5/1988 | Soo |
| 4,769,927 A | 9/1988 | Liggett et al. |
| 4,771,555 A | 9/1988 | Ohashi |
| 4,773,658 A | 9/1988 | Bourque et al. |
| 4,777,741 A | 10/1988 | James |
| 4,778,717 A | 10/1988 | Fitchmun |
| 4,779,361 A | 10/1988 | Kinsaul |
| 4,783,911 A | 11/1988 | Brown |
| 4,801,649 A | 1/1989 | Statz |
| 4,813,158 A | 3/1989 | Brown |
| 4,826,183 A | 5/1989 | Bratland et al. |
| 4,835,885 A | 6/1989 | Hoshizaki et al. |
| 4,870,761 A | 10/1989 | Tracy |
| D305,477 S | 1/1990 | Maccano et al. |
| D305,560 S | 1/1990 | Hoshizaki et al. |
| 4,906,013 A | 3/1990 | Hussien et al. |
| 4,907,813 A | 3/1990 | Hall |
| 4,909,523 A | 3/1990 | Olson |
| 4,922,631 A | 5/1990 | Anderie |
| 4,943,075 A | 7/1990 | Gates |
| D311,447 S | 10/1990 | Hatfield |
| 4,964,229 A | 10/1990 | Laberge |
| 4,966,377 A | 10/1990 | Yu |
| D311,810 S | 11/1990 | Hatfield |
| D312,917 S | 12/1990 | Hatfield |
| D313,113 S | 12/1990 | Aveni |
| 4,988,122 A | 1/1991 | Saunders |
| 4,993,725 A | 2/1991 | Barnes et al. |
| D315,442 S | 3/1991 | Kilgore et al. |
| D316,324 S | 4/1991 | Rogers |
| D317,824 S | 7/1991 | Hatfield |
| D317,828 S | 7/1991 | Rogers |

| | | | | | | |
|---|---|---|---|---|---|---|
| D318,945 S | 8/1991 | Hatfield | | D347,724 S | 6/1994 | Teague |
| D319,331 S | 8/1991 | Hatfield et al. | | 5,318,310 A | 6/1994 | Laberge |
| D319,337 S | 8/1991 | Hatfield | | 5,319,866 A | 6/1994 | Foley et al. |
| D319,535 S | 9/1991 | Hatfield | | 5,320,366 A | 6/1994 | Shing |
| D320,108 S | 9/1991 | Hatfield et al. | | D348,765 S | 7/1994 | Lozano |
| 5,046,746 A | 9/1991 | Gierveld | | 5,327,329 A | 7/1994 | Stiles |
| 5,048,848 A | 9/1991 | Olson et al. | | 5,330,208 A | 7/1994 | Charron et al. |
| 5,052,130 A | 10/1991 | Barry et al. | | 5,331,752 A | 7/1994 | Johnson et al. |
| D321,973 S | 12/1991 | Hatfield | | 5,332,242 A | 7/1994 | Cann et al. |
| D321,974 S | 12/1991 | Hatfield | | 5,339,544 A | 8/1994 | Caberlotto |
| D322,505 S | 12/1991 | Hatfield | | 5,340,132 A | 8/1994 | Malewicz |
| D322,507 S | 12/1991 | Hatfield | | 5,342,070 A | 8/1994 | Miller et al. |
| 5,068,956 A | 12/1991 | Malewicz | | D350,640 S | 9/1994 | Kayano et al. |
| 5,069,462 A | 12/1991 | Murga | | 5,343,638 A | 9/1994 | Legassie et al. |
| 5,072,529 A | 12/1991 | Graf | | 5,345,638 A | 9/1994 | Nishida |
| D323,056 S | 1/1992 | Cavasin | | 5,367,791 A | 11/1994 | Gross et al. |
| D323,059 S | 1/1992 | Hatfield | | D353,429 S | 12/1994 | Gay et al. |
| D323,418 S | 1/1992 | Hatfield | | D353,430 S | 12/1994 | Pratt et al. |
| D323,423 S | 1/1992 | Rogers | | 5,371,957 A | 12/1994 | Gaudio |
| 5,082,300 A | 1/1992 | Cucurullo | | D354,163 S | 1/1995 | Hatfield |
| D323,735 S | 2/1992 | Aveni | | D354,847 S | 1/1995 | Diaz et al. |
| 5,088,749 A | 2/1992 | Olivieri | | 5,380,020 A | 1/1995 | Arney et al. |
| 5,092,614 A | 3/1992 | Malewicz | | 5,383,674 A | 1/1995 | Cann et al. |
| D325,416 S | 4/1992 | Olson et al. | | D355,523 S | 2/1995 | Losi, II |
| 5,101,580 A | 4/1992 | Lyden | | D355,690 S | 2/1995 | Meibock et al. |
| D326,011 S | 5/1992 | Smith et al. | | 5,388,845 A | 2/1995 | Soo |
| 5,123,664 A | 6/1992 | DeMars | | 5,388,846 A | 2/1995 | Gierveld |
| 5,125,687 A | 6/1992 | Hwang | | 5,390,430 A | 2/1995 | Fitchmun et al. |
| 5,129,663 A | 7/1992 | Soo | | 5,393,077 A | 2/1995 | Wanous |
| 5,131,173 A | 7/1992 | Anderie | | 5,393,078 A | 2/1995 | Bourdeau |
| D328,771 S | 8/1992 | Molnar | | D356,666 S | 3/1995 | Ueda |
| 5,137,290 A | 8/1992 | Patterson et al. | | D356,672 S | 3/1995 | Ueda |
| D330,112 S | 10/1992 | Hatfield et al. | | 5,397,141 A | 3/1995 | Hoshizaki et al. |
| 5,152,083 A | 10/1992 | Gagne | | 5,398,948 A | 3/1995 | Mathis |
| 5,152,086 A | 10/1992 | Bonaventure | | 5,401,037 A | 3/1995 | O'Donnell et al. |
| D330,799 S | 11/1992 | Hatfield | | 5,401,039 A | 3/1995 | Wolf |
| D330,801 S | 11/1992 | McDonald | | 5,401,564 A | 3/1995 | Lee et al. |
| D330,972 S | 11/1992 | Hatfield et al. | | 5,406,723 A | 4/1995 | Okajima |
| D331,146 S | 11/1992 | Brown et al. | | 5,408,761 A | 4/1995 | Gazzano |
| 5,170,574 A | 12/1992 | Weisbrich | | D357,794 S | 5/1995 | Avar et al. |
| 5,171,033 A | 12/1992 | Olson et al. | | 5,411,277 A | 5/1995 | Pratt |
| 5,177,884 A | 1/1993 | Rullier | | 5,411,278 A | 5/1995 | Wittmann |
| 5,184,834 A | 2/1993 | Yu | | 5,413,380 A | 5/1995 | Fernandez |
| 5,190,301 A | 3/1993 | Malewicz | | 5,416,988 A | 5/1995 | Potter et al. |
| 5,191,727 A | 3/1993 | Barry et al. | | 5,437,466 A | 8/1995 | Meibock et al. |
| 5,193,827 A | 3/1993 | Olson | | D361,886 S | 9/1995 | Johnson |
| 5,199,726 A | 4/1993 | Willett | | D362,334 S | 9/1995 | Avar |
| 5,207,454 A | 5/1993 | Blankenburg et al. | | 5,446,976 A | 9/1995 | Donnadieu et al. |
| 5,210,963 A | 5/1993 | Harwood | | 5,446,977 A | 9/1995 | Nagano et al. |
| D337,872 S | 8/1993 | Bevier | | 5,449,183 A | 9/1995 | Klamer et al. |
| 5,234,230 A | 8/1993 | Crane et al. | | 5,452,907 A | 9/1995 | Meibock et al. |
| D339,223 S | 9/1993 | Crowley | | D362,893 S | 10/1995 | Osborne |
| D339,672 S | 9/1993 | Olson | | 5,456,393 A | 10/1995 | Mathis et al. |
| 5,243,772 A | 9/1993 | Francis et al. | | 5,456,477 A | 10/1995 | Bourdeau |
| 5,248,156 A | 9/1993 | Cann et al. | | 5,456,495 A | 10/1995 | McLeod |
| 5,251,934 A | 10/1993 | Gates | | 5,459,949 A | 10/1995 | MacPhail |
| 5,255,929 A | 10/1993 | Lemelson | | 5,461,801 A | 10/1995 | Anderton |
| D341,863 S | 11/1993 | Cavasin | | 5,462,295 A | 10/1995 | Seltzer |
| D342,113 S | 12/1993 | Cavasin | | 5,462,297 A | 10/1995 | Lee |
| D342,600 S | 12/1993 | Hatfield et al. | | 5,465,509 A | 11/1995 | Fuerst et al. |
| D342,607 S | 12/1993 | Uda | | 5,470,086 A | 11/1995 | Peterson et al. |
| 5,282,288 A | 2/1994 | Henson | | D365,195 S | 12/1995 | Chen |
| 5,286,043 A | 2/1994 | Tkaczyk | | 5,472,218 A | 12/1995 | Pratt |
| D345,405 S | 3/1994 | Cavasin | | 5,475,936 A | 12/1995 | Cavasin |
| 5,295,701 A | 3/1994 | Reiber et al. | | D365,866 S | 1/1996 | Cheng |
| D346,192 S | 4/1994 | Miller et al. | | D365,919 S | 1/1996 | Chen |
| 5,303,955 A | 4/1994 | Zurnamer | | D366,354 S | 1/1996 | Yoshikawa et al. |
| D346,480 S | 5/1994 | Davidson | | 5,484,148 A | 1/1996 | Olivieri |
| D346,481 S | 5/1994 | Worthington | | D366,921 S | 2/1996 | Losi, II |
| D346,484 S | 5/1994 | Hatfield | | 5,492,345 A | 2/1996 | Kruczek |
| D346,633 S | 5/1994 | Conte | | 5,494,304 A | 2/1996 | Levy et al. |
| D346,898 S | 5/1994 | Teague | | 5,495,683 A | 3/1996 | Miotto et al. |
| D347,318 S | 5/1994 | Avar | | 5,498,009 A | 3/1996 | Young |
| 5,308,152 A | 5/1994 | Ho | | 5,498,033 A | 3/1996 | Hoshizaki et al. |
| 5,310,250 A | 5/1994 | Gonsior | | 5,499,461 A | 3/1996 | Danezin et al. |
| 5,312,120 A | 5/1994 | Wiegner | | D368,355 S | 4/1996 | Loving |
| 5,312,669 A * | 5/1994 | Bedard ............... 428/105 | | D368,507 S | 4/1996 | Losi, II |
| 5,314,199 A | 5/1994 | Olson et al. | | D368,757 S | 4/1996 | Conte |
| D347,672 S | 6/1994 | Arney et al. | | D368,948 S | 4/1996 | Conte |

| | | |
|---|---|---|
| D369,396 S | 4/1996 | Losi, II |
| 5,503,412 A | 4/1996 | Hill |
| 5,503,413 A | 4/1996 | Belogour |
| 5,505,470 A | 4/1996 | Hoshizaki |
| 5,507,506 A | 4/1996 | Shadroui |
| D370,117 S | 5/1996 | Worthington |
| 5,513,449 A | 5/1996 | Gramola |
| 5,513,863 A | 5/1996 | Klamer et al. |
| 5,524,912 A | 6/1996 | Laub et al. |
| 5,528,841 A | 6/1996 | Pozzobon |
| D371,672 S | 7/1996 | Hoshizaki et al. |
| 5,533,279 A | 7/1996 | Mitsue et al. |
| 5,536,025 A | 7/1996 | Landay |
| 5,536,074 A | 7/1996 | Hsu et al. |
| D372,949 S | 8/1996 | Losi, II |
| 5,549,309 A | 8/1996 | Gleichmann |
| 5,549,310 A | 8/1996 | Meibock et al. |
| D373,548 S | 9/1996 | Losi, II |
| D373,807 S | 9/1996 | Swande |
| D374,340 S | 10/1996 | Avar |
| D375,829 S | 11/1996 | Schaper et al. |
| 5,570,522 A | 11/1996 | Olson et al. |
| 5,570,893 A | 11/1996 | Swande |
| D376,894 S | 12/1996 | Olson |
| 5,595,392 A | 1/1997 | Casillas |
| D378,472 S | 3/1997 | Bramani |
| D379,395 S | 5/1997 | Aird |
| D379,863 S | 6/1997 | Kayano |
| 5,641,169 A | 6/1997 | Bekessy |
| D380,516 S | 7/1997 | Cavasin |
| D380,889 S | 7/1997 | Earle |
| D382,098 S | 8/1997 | Pamio |
| D382,099 S | 8/1997 | Hoeft |
| 5,657,558 A | 8/1997 | Pohu |
| 5,662,338 A | 9/1997 | Steinhauser |
| 5,692,319 A | 12/1997 | Parker et al. |
| 5,701,689 A | 12/1997 | Hansen et al. |
| D389,995 S | 2/1998 | Cockrell |
| D390,345 S | 2/1998 | Aird et al. |
| D390,900 S | 2/1998 | Lee |
| D391,054 S | 2/1998 | Vestuti |
| D391,060 S | 2/1998 | Cass |
| D391,066 S | 2/1998 | Smith, III |
| 5,720,117 A | 2/1998 | Toschi |
| D393,358 S | 4/1998 | Teague |
| D393,538 S | 4/1998 | Marshall |
| 5,738,937 A | 4/1998 | Baychar |
| 5,768,807 A * | 6/1998 | Caeran et al. ............... 36/115 |
| 5,769,434 A | 6/1998 | Wurthner |
| D396,515 S | 7/1998 | Venier et al. |
| 5,778,566 A * | 7/1998 | Edauw et al. ............. 36/117.1 |
| 5,779,246 A | 7/1998 | Bengtsson |
| 5,782,014 A | 7/1998 | Peterson |
| 5,784,809 A | 7/1998 | McDonald |
| 5,797,610 A | 8/1998 | Grande et al. |
| 5,803,466 A | 9/1998 | Wrike |
| D399,283 S | 10/1998 | Rench |
| D399,341 S | 10/1998 | Munns |
| D399,343 S | 10/1998 | Egelja et al. |
| D401,039 S | 11/1998 | Lupo |
| D401,396 S | 11/1998 | Kayano |
| D401,397 S | 11/1998 | Chen |
| 5,839,736 A | 11/1998 | Chiu et al. |
| D401,741 S | 12/1998 | Clarke |
| D401,744 S | 12/1998 | Greenberg |
| D402,447 S | 12/1998 | Munns |
| 5,843,851 A | 12/1998 | Cochran |
| 5,848,796 A | 12/1998 | Meibock et al. |
| 5,852,887 A | 12/1998 | Healy et al. |
| 5,855,380 A | 1/1999 | Di Filippo et al. |
| D405,593 S | 2/1999 | Hamel |
| D405,596 S | 2/1999 | Aird et al. |
| D410,966 S | 6/1999 | Cretinon |
| 5,913,593 A | 6/1999 | Aird et al. |
| 5,940,991 A | 8/1999 | Cabalquinto |
| 5,961,129 A | 10/1999 | Post et al. |
| 5,970,629 A | 10/1999 | Tucker et al. |
| 5,974,696 A | 11/1999 | Aird et al. |
| 5,988,683 A | 11/1999 | Venier et al. |
| 5,996,521 A * | 12/1999 | Kitano et al. ................ 114/90 |
| 6,000,704 A | 12/1999 | Balbinot et al. |
| D422,044 S | 3/2000 | Peterson |
| 6,039,328 A | 3/2000 | Pawlowski et al. |
| 6,066,235 A | 5/2000 | Scheinberg |
| 6,079,128 A | 6/2000 | Hoshizaki et al. |
| 6,105,280 A * | 8/2000 | Marcolin .................. 36/117.1 |
| 6,105,975 A | 8/2000 | Shum |
| 6,381,877 B2 | 5/2002 | Filice |
| 6,457,265 B1 | 10/2002 | Lepage et al. |
| 6,467,778 B1 | 10/2002 | Goldsmith et al. |
| 6,485,661 B1 | 11/2002 | Brown |
| 6,499,233 B1 | 12/2002 | Chenevert |
| 6,505,422 B2 * | 1/2003 | Racine ......................... 36/115 |
| 6,558,784 B1 | 5/2003 | Norton et al. |
| 6,695,322 B2 | 2/2004 | Goldsmith et al. |
| 7,047,668 B2 * | 5/2006 | Burris et al. .................. 36/3 A |
| 7,140,127 B2 | 11/2006 | Yang ............................. 36/45 |
| 7,219,446 B1 * | 5/2007 | Haimerl .......................... 36/12 |
| 7,219,900 B2 * | 5/2007 | Meibock ................... 280/11.27 |
| 2001/0003876 A1 | 6/2001 | Racine |
| 2002/0056972 A1 | 5/2002 | Fask et al. |
| 2002/0093154 A1 | 7/2002 | Durocher |
| 2002/0174568 A1 | 11/2002 | Neiley |
| 2002/0190487 A1 | 12/2002 | Blankenburg et al. |

FOREIGN PATENT DOCUMENTS

| | | |
|---|---|---|
| DE | 28 36 793 A1 | 3/1980 |
| DE | G 81 26 134.9 U1 | 12/1981 |
| DE | 30 43 425 A1 | 7/1982 |
| DE | 32 20 025 A1 | 12/1982 |
| DE | 32 20 215 A1 | 12/1983 |
| DE | G 94 00 085.9 U1 | 2/1994 |
| DE | G 94 17 779.1 U1 | 1/1995 |
| DE | 297 23 193 U1 | 5/1998 |
| EP | 0 273 891 A2 | 7/1988 |
| EP | 0 273 891 A3 | 6/1991 |
| EP | 0 752 217 A2 | 1/1997 |
| EP | 0 788 818 A2 | 8/1997 |
| EP | 0 788 818 A3 | 11/1997 |
| FR | 2298288 | 8/1976 |
| FR | 2 570 256 A1 | 3/1986 |
| GB | 2 316 327 A | 2/1998 |
| JP | 07-276357 | 10/1995 |
| WO | WO 83/04166 | 12/1983 |
| WO | WO 93/20725 | 10/1993 |
| WO | WO 94/08668 | 4/1994 |
| WO | WO 99/12615 | 3/1999 |

OTHER PUBLICATIONS

Europe, Supplementary European Search Report, Apr. 22, 2009.
D.B. Miracle & S.L. Donaldson, "vol. 21 Composites", ASM International, USA XP002522529, pp. 59-67 (Dec. 15, 1998).

* cited by examiner

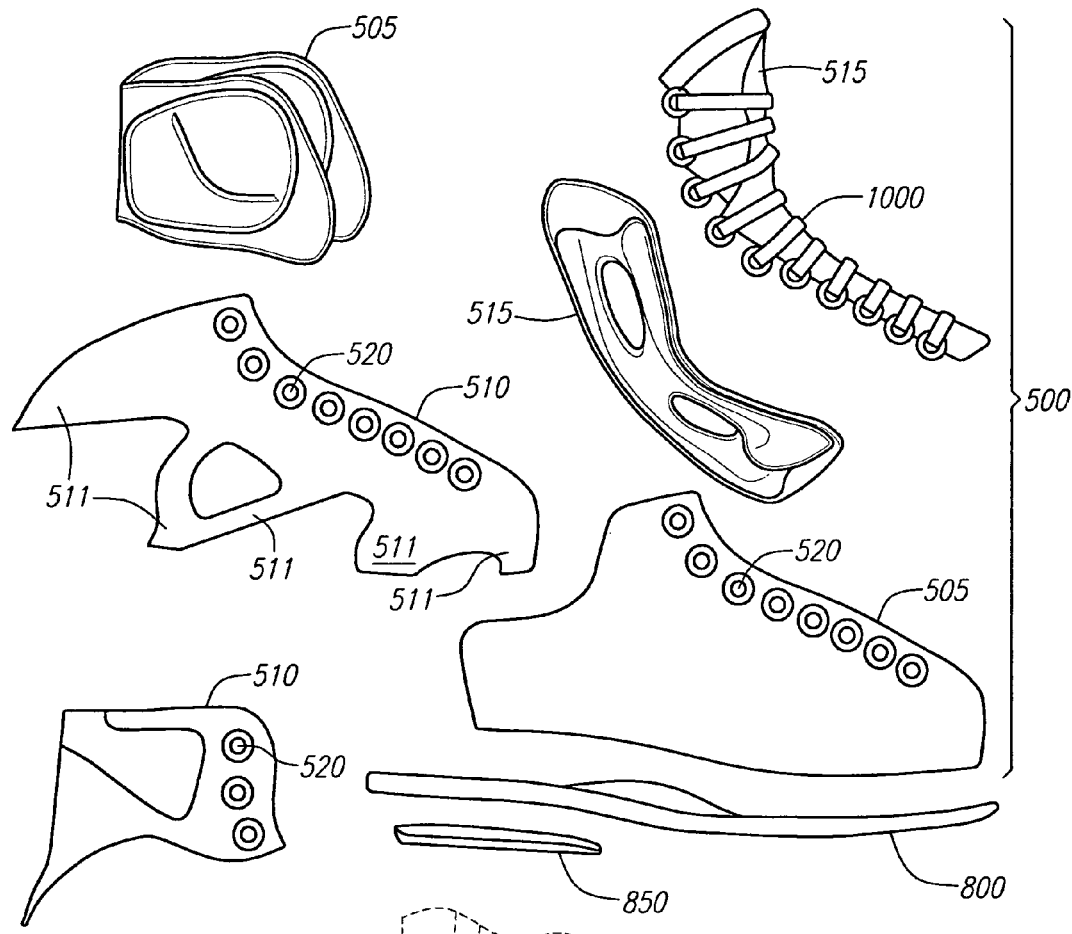
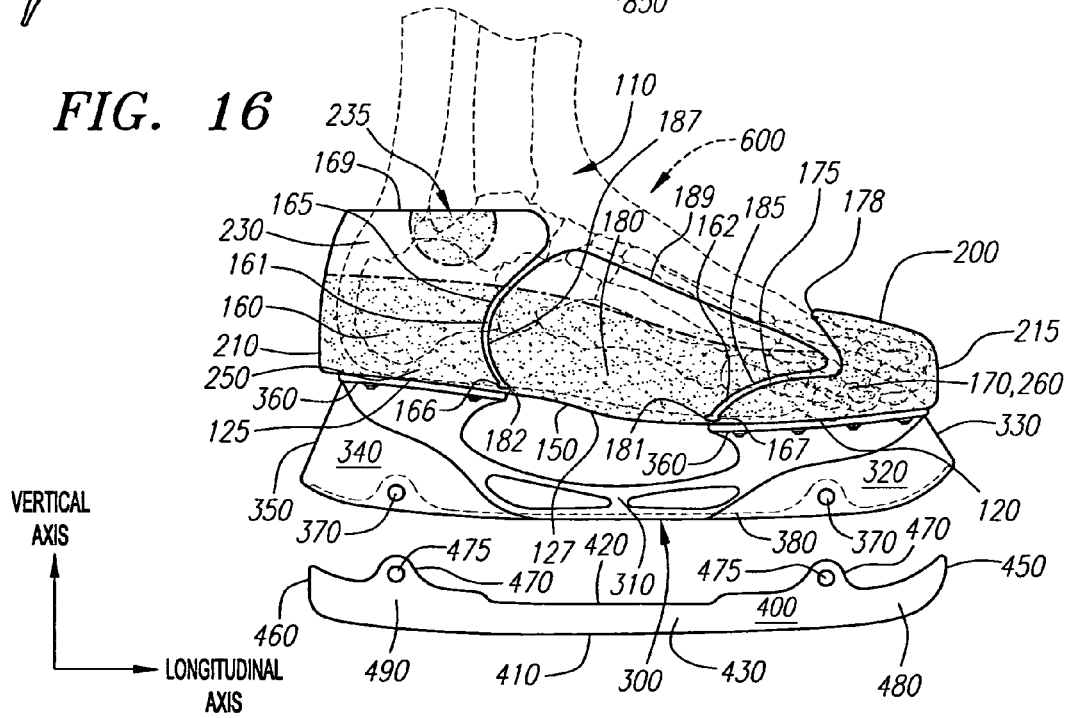
FIG. 16

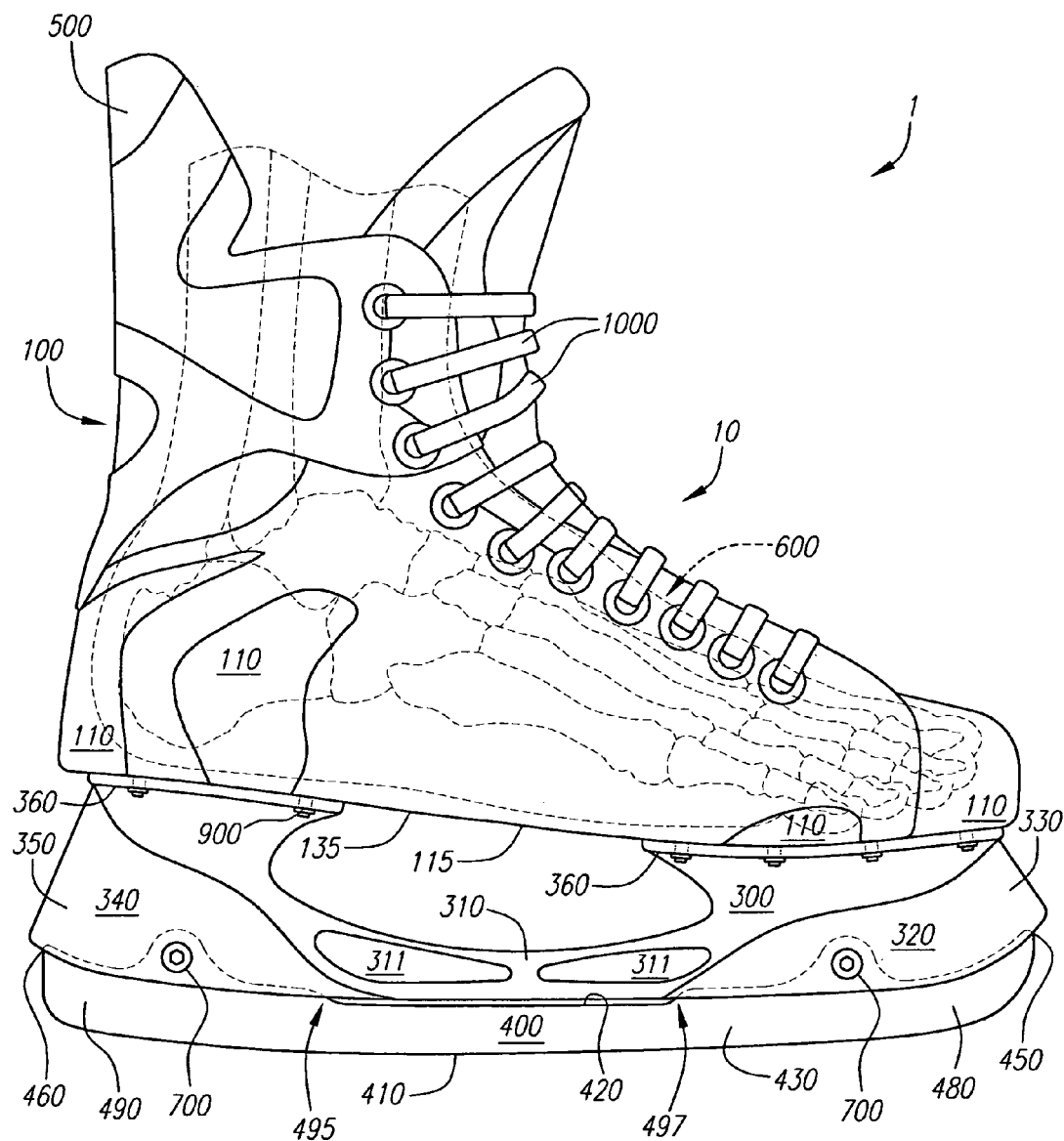
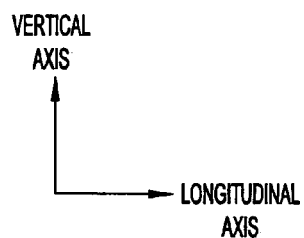
FIG. 20

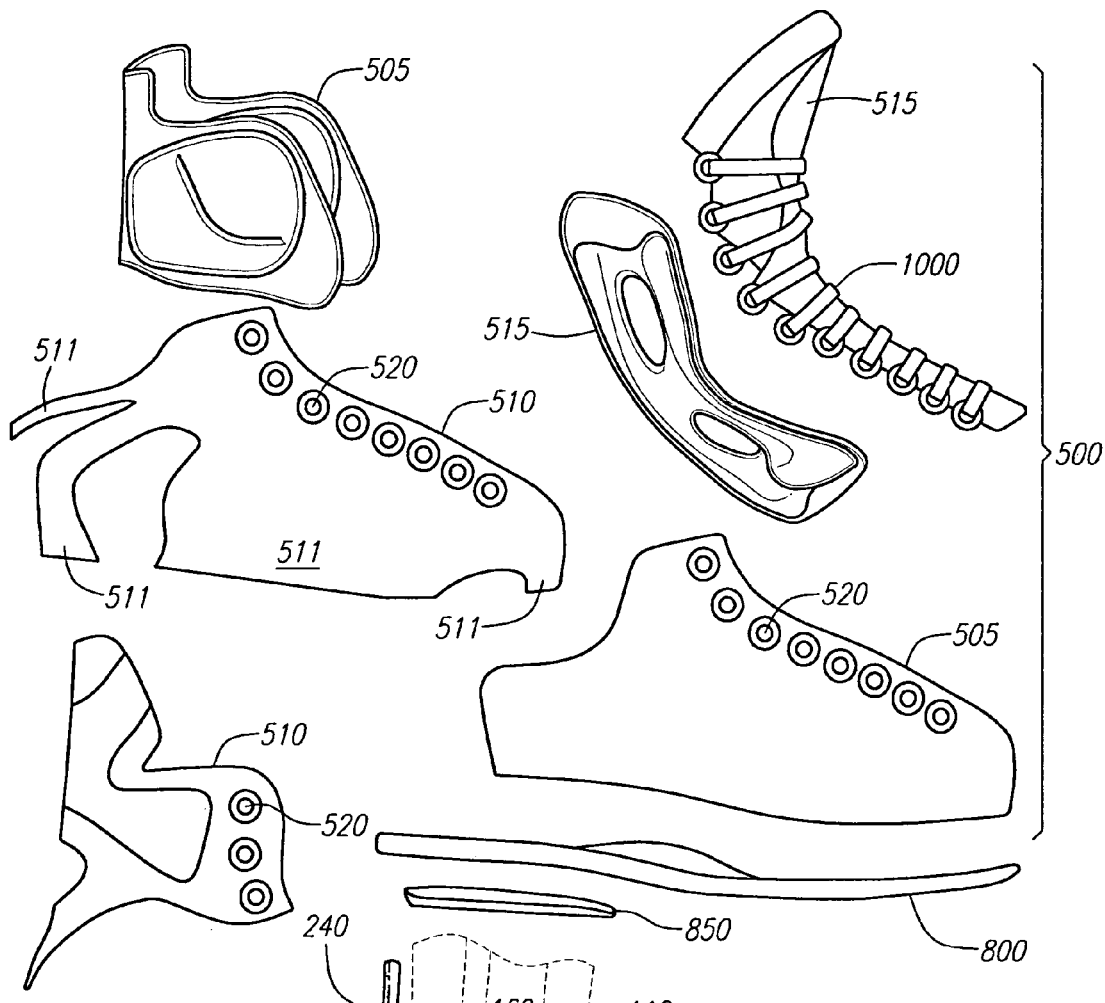
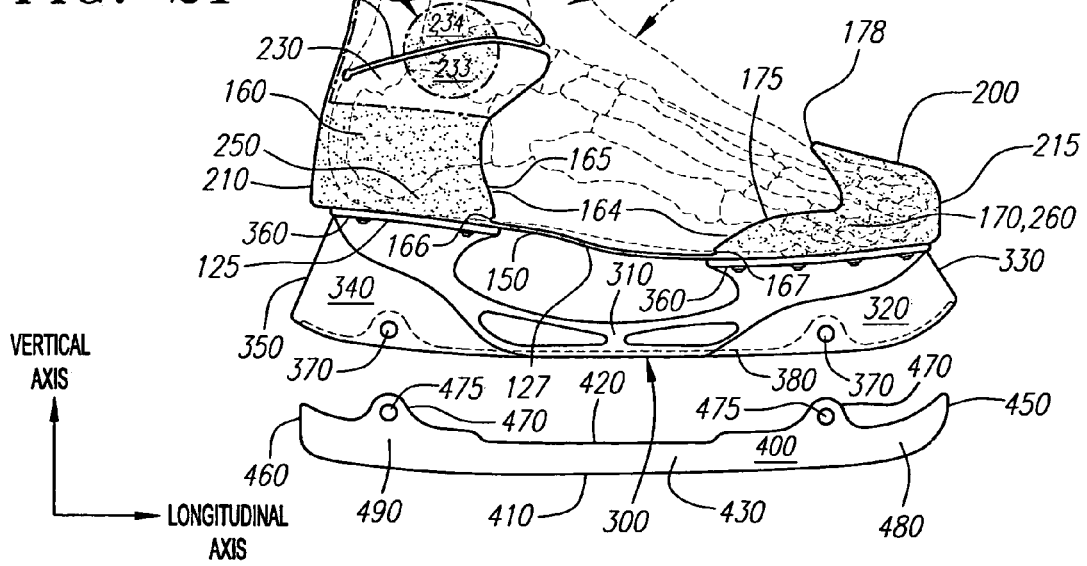
FIG. 21

ARTICLE OF FOOTWEAR COMPRISING A UNITARY SUPPORT STRUCTURE AND METHOD OF MANUFACTURE

RELATED APPLICATIONS

This applications claims the benefit of priority of U.S. Provisional Application Ser. No. 60/501,752 filed on Sep. 10, 2003, the entirety of which is hereby incorporated by reference.

FIELD OF THE INVENTION

The field of the present invention relates to footwear such as ice skates and more particularly to the configuration and construction of footwear employing unitary support structures and even more particularly to the configuration and construction of footwear employing unitary molded support structures comprising a construction of substantially continuous fibers aligned in one or more defined orientations and disposed within a hardened resin matrix.

BACKGROUND OF THE INVENTION

Footwear such as shoes, boots, ice and roller skates and the like are commonly fabricated by employing a method referred to in the shoe industry as "lasting." The process is referred to as lasting because the article of footwear is formed over a "last," which is a three-dimensional rigid shape (e.g., formed of wood or metal) of the inner cavity of the desired form of the footwear. Typically, a mid-sole is first secured to the bottom of the last. Then, various and often numerous component layers of textiles, leather, and/or synthetic materials are glued and/or stitched to one another, stretched over the last and the lower ends folded underneath and secured to the mid-sole to form the "upper" portion of the footwear. Once the components of the upper are assembled to conform with the last, an out-sole is secured to the bottom of the mid-sole over the folded ends of the upper via an appropriate mechanical and/or adhesive means such as stitching, tacks, or glue. An insole or foot bed, often formed of a cushioning material, is then placed within the internal cavity of the footwear over the mid-sole. Additional strength or definition to the footwear may be imparted by incorporation of one or more rigid components in selected areas. The shape of the last not only corresponds to the shape of the inner cavity of the desired form of the footwear but also corresponds to the shape of the foot of the intended wearer. Thus, as a general proposition both the last and the inner cavity of the article of footwear will have regions that are configured to correspond to the toe, heel and mid-regions of the intended foot for which the article of footwear is configured.

Measurement devices such as the "Brannock Device" facilitate sizing the wearer's foot to the appropriate article of footwear. Such measurement devices typically are adapted to taking a heel to toe measurement, a heel to the ball of the foot measurement, and a horizontal/lateral width measurement between the medial and lateral extent of the forefoot and correlating those measurements with standardized footwear sizing schemes.

Performance characteristics of the footwear, such as fit, support, rigidity, flexibility, durability, bulk, weight, protection, and appearance are derived by virtue of the external configuration of the last together with the choice of the construction material employed for a given component, the geometry of each component, the position of the individual components relative to one another and the last, and the manner by which the various components are attached or otherwise secured to one another and stretched over the last. Incremental and selective modification of the individual assembly components and the manner by which they are joined provides the manufacturer significant design and construction freedom. As a result, the lasting process continues to be widely employed and is generally accepted as producing a good quality product by which other footwear products are measured.

The lasting process, however, is time and labor intensive. Moreover, the quality and consistency of lasted footwear is inherently subject to the skill of the particular craftsman and variations inherent in the chosen component materials employed. Consequently, manufacturers have often implemented stringent quality assurance measures, which result in additional cost to an already expensive process. Notwithstanding such measures, it is not infrequent for manufacturers to incur substantial costs due to reworking, scrapping, or sale of the footwear as factory seconds or specials at a reduced price. Nor can such quality assurance measures necessarily avoid the inherent dimensional inconsistency that is endemic to the lasting process; such that seemingly identical footwear having the same manufactured size, nevertheless fit or feel noticeably different. Thus, even with stringent quality assurance measures in place, it is not uncommon for end-consumers to try on several of the same shoe of the same "size" to find a best fitting pair. This is so because once the last is removed from the footwear, the internal cavity of the article of footwear takes on its natural unstressed form and the functional properties resultant therefrom. Hence, slight variations in the manner by which the component elements are stretched or otherwise formed over the last or in the properties or dimensions of the component elements, their interposition, alignment, and/or attachment points may effect both the natural cavity size and the functionality (e.g., flexibility, support, and fit) of the article of footwear.

Furthermore, lasted footwear products, like baseball gloves, often require significant break-in time in order to provide the desired flexibility and fit. This is especially true in the case of ice skates and the like in that those types of footwear are often formed more stiffly by employment of additional, thicker, or stiffer layers of textile or other materials to provide greater support and more efficient transfer of force. It is not uncommon for ice skaters, for example, to have to wear an ice skate for many months to break-in the ice skate. Once broken-in, continued use of the ice skate, however, may often result in the ice skate being physically degraded to the point where it no longer provides the needed support or stiffness in the desired areas, such as at or about regions configured to surround the ankle and the outward protrusions created by the lateral and medial malleolus bone formations. As a consequence, a new ice skate needs to be purchased, which requires yet another break-in period. Moreover, the employment of additional layers of textile materials to fortify the walls of the article of footwear often adds significant weight and bulk. Hence, ice skate boots, for example, typically weigh two or three times that of a dress or street boot of the same size. Furthermore, because optimum performance is achieved between the period of break-in and degradation, performance is transient with time and use.

In an effort to improve upon the lasting process, attempts have been made toward reducing the number of assembly components by employing unitary shell structures made from injected molded plastics. Such shell structures are manufactured typically by preparing a metal mold of the desired internal and external configuration of the shell walls, injecting heated thermoplastics in the liquid stage into the mold, and then cooling the mold to allow the injected thermoplastic to harden. Once hardened, the shell is removed from the mold and employed as either internal or external support to the article of footwear.

Employment of such unitary plastic shell structures may facilitate both control over the end-shape and volume of the footwear as well as utilization of less complicated assembly procedures and techniques. Less skilled labor or in some cases even an automated assembly process is capable of being employed. In addition, the management costs associated with procuring and processing the numerous assembly components in a timely fashion may be commensurately reduced, thereby potentially increasing profit margins. Moreover, such shell structures being formed as a single molded unitary component are capable of providing efficient communication between regions of the footwear that are formed thereby. Thus, reductions in bulk and weight are capable.

Even so, prior art unitary molded plastic shell constructions have their shortcomings. In a lasted footwear product, the walls that form the foot cavity are constructed or otherwise defined by the various and numerous assembly components, each of which having unique functions and properties that are resultant from their shape, material composition, interposition, and the manner and location by which each component is attached to the other. The various material properties of the individual components independently and in conjunction with the other components, thus, define the functionality or performance of the footwear article.

In contrast, injected molded plastic shells are generally isotropic constructs in that they are formed of generally homogenous materials that, at any given location, tend to exhibit homogenous physical properties in all directions following the molding process. Thus, for example, the elastic modulus, which is an indicator of the material's inherent stiffness or rigidity, is generally not dependent on direction, rather it is the same regardless of the direction that the stress is applied.

Engineering unitary injected molded plastic shell structures, therefore, is primarily limited to (1) the choice of plastic material(s), (2) the design of the external and internal configuration of the shell, and (3) the manipulation of the thickness of the chosen plastic material at any given location in the shell. As a consequence, the more substantial the shell component, the more difficult it is to design and the less likely it will provide the wearer with the desired performance. On the other hand, employment of a less substantial shell component tends to negate both the shell's ability to define end-shape and foot cavity volume as well as the likelihood of realizing significant manufacturing efficiencies relative to the lasting process.

To make matters worse, experience has shown that many consumers find such injected molded plastic shell structures to be aesthetically displeasing or otherwise indicative of poor craftsmanship. Consequently, such articles of footwear are subject to the additional expense associated with concealing the plastic shell within more aesthetically pleasing textile materials.

Moreover, because such plastic shell structures are rigidly formed to provide a defined end-shape and foot cavity volume while also providing firm support to the foot, such shell structures have an inherent disadvantage in facilitating flexibility vis-à-vis lasted footwear, which are generally formed of layers of pliable components. Recent attempts to facilitate flex in an otherwise rigid plastic construction have, therefore, tended to use softer plastics (lesser elastic modulus) or more thinly formed plastics molded into selected regions of the shell on the theory that those regions would be more complaisant or amenable to flexing when stressed.

Although, there has been numerous and continuing attempts to design and implement injected molded plastic shell structures to form non-lasted articles of footwear, such attempts have generally not sufficiently overcome the significant aforementioned design hurdles and as a result have been met with limited consumer acceptance. For instance, over the last 25 years or more, non-lasted ice skates employing unitary injected molded plastic shells have repeatedly been introduced to recreational and professional consumers. Nevertheless, most if not all professional hockey players in the National Hockey League (NHL™) continue to skate on nothing other than a lasted ice skate formed of traditional footwear materials or contemporary synthetic substitutes thereof.

There continues, therefore, to be a long felt need in the industry for a footwear construction employing a unitary molded support structure that is capable of one or more of the following: (1) effectuating a controlled end-shape and volume of the footwear while providing the appropriate support and flexibility to the foot, (2) providing manufacturing efficiencies by reducing the number of components parts, (3) being conducive to facilitating the engineering freedom needed to provide the desired performance characteristics, (4) providing an aesthetically pleasing appearance to the consumer, (5) providing support and performance traditionally only obtainable from a lasted construction, (6) reducing weight and/or bulk while providing the desired support and fit, (7) reducing or eliminating break-in time, (8) extending the longevity of the footwear by minimizing degradation resultant from use, and (9) implementing a non-lasted footwear construction.

SUMMARY OF THE INVENTION

The present invention is directed to an article of footwear comprising a unitary support structure formed of a plurality of wall structures as described herein and preferred methods of manufacture. The configuration and construction of the unitary support structure as well as the preferred methods of manufacture constitute separate aspects of the invention. Thus any wall structure of the unitary support structure disclosed herein may be combined with any other wall structure of the unitary support structure without limitation.

One aspect of the invention is directed to the positioning and partitioning of the wall structures at defined locations or ranges corresponding to various regions or positions of the foot for which the article of footwear is configured to fit. When the article of footwear is in the form of an ice skate another aspect of the invention is the positioning and partitioning of the wall structures at defined locations or ranges corresponding to various regions or positions of the blade and/or blade holder.

Another aspect is directed to a non-isotropic unitary support structure formed of one or more plies of aligned fibers disposed in a hardened resin matrix. The relative orientation of adjacent plies of aligned fibers that form the unitary support structure constitute yet another aspect.

Another aspect is directed to the relative inward and outward flexibility of portions of the walls of the unitary support structure vis-à-vis other walls of the unitary support structure or other portions of the same wall of the unitary support structure. The relative flexibility of wall portions extending inwardly over or about the foot for which the article of footwear is configured to fit constitute yet another aspect of this invention.

Another aspect of this invention is directed to an article of footwear comprising a generally pliable upper portion coupled to a generally rigid unitary support structure. The construction and configuration of the upper portion, the manner by which the upper portion overlaps and attaches to the unitary support structure, as well as the manner by which the upper portion extends beyond the walls of the unitary support structure to further encapsulate and secure the article of footwear to foot, each constitute separate aspects of the invention.

Yet other aspects of this invention are directed to methods of manufacturing the unitary support structure and the resultant unitary support structure manufactured therefrom.

While certain aspects of the invention disclosed herein have been briefly summarized above it should be understood that the invention encompasses each and every teaching disclosed herein as well as any combination thereof.

BRIEF DESCRIPTION OF THE DRAWINGS

The accompanying drawings illustrate presently preferred implementations of the invention and together with the written specification, serve to explain by way of example various elements, teachings, and principles of the invention disclosed herein.

FIG. 16 is a diagram of an exploded lateral side view of the article of footwear illustrated in FIG. 15 revealing in more detail the construction of the unitary support structure and the various components of the article of footwear, with the foot depicted in FIGS. 1-4 illustrated in phantom for reference.

FIG. 20 is a lateral side view diagram of an article of footwear, in the form of an ice skate, employing a unitary support structure in accordance with a fourth preferred implementation, with the foot depicted in FIGS. 1-4 illustrated in phantom for reference.

FIG. 21 is a diagram of an exploded lateral side view of the article of footwear illustrated in FIG. 20 revealing in more detail the construction of the unitary support structure and the various components of the article of footwear, with the foot depicted in FIGS. 1-4 illustrated in phantom for reference.

DETAILED DESCRIPTION

Figure 1:
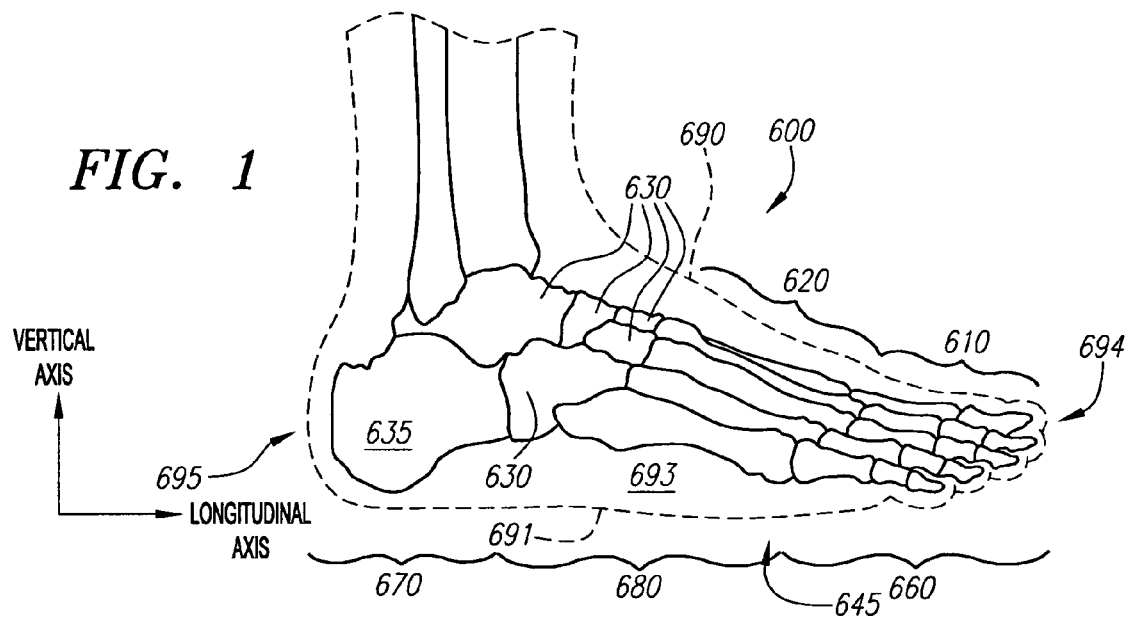
FIGS. 1-4 depict a lateral side view, medial side view, medial front perspective view, and a top plan view (i.e., dorsal view) of a representative human foot, respectively.

Reference will now be made to the construction and operation of preferred implementations of the present invention, examples of which are illustrated in the accompanying drawings. The following descriptions of the preferred implementations are only exemplary of the invention and the elements, teachings and principles embodied therein. The present invention is not limited to these implementations, but may be realized by other implementations. For clarity of description, any reference numeral representing an element in one figure shall represent the same element in any other figure.

Illustrated in FIGS. 1-4 are diagrams of a representative foot 600, which are illustrated and discussed for purposes of providing reference to the configuration and construction of the footwear implementations illustrated and described herein. Illustrated in FIGS. 5-24 is an article of footwear 1, in the form of an ice hockey skate 10, comprising a blade holder 300, a blade 400, and a boot 100, which includes unitary support structure 110, an upper portion 500, a foot bed 800, and a heel cushion 850. Each of these components as well as preferred methods of manufacturing is discussed in detail in the following sections set forth below.

Throughout this disclosure reference is made to the terms "construction" and "configuration" of various structural components. It is to be understood that the term "construction" refers to internal formation of the structural component such as the materials (or orientation or inter-positioning of materials) or the physical properties of the materials that form the structural component. For example, suppose the structural component is constructed of substantially continuous fiber filaments disposed in a hardened resin matrix. In such a construction, changes in construction would include changes in the fiber materials and/or the dimensions of the fibers employed, changes in the resin employed, changes in the orientation of the fibers employed, changes in the concentration of fibers relative to resin, changes in the properties of the construction materials (e.g., elastic modulus), and/or any combination thereof. On the other hand, the term "configuration" refers to the external formation of the structural component such as the dimensions, contour, and positioning of the structural component. For example, the configuration of a structural component would include the thickness, length, and width of the component; the contour of the surfaces of the component; spatial separations between the components; and the location or positioning of the component or regions or points thereof in relation to other structural components of the article of footwear 1 (e.g., other regions of the unitary support structure 110, blade holder 300 or blade 400) and/or in relation to the foot for which the article of footwear is configured to fit. Furthermore, it is to be understood that construction and configuration modifications may be employed either independently or in combination to effectuate, facilitate, or augment a desired functionality of the unitary support structure 110.

In this regard, it is also noted that various aspects of the teachings and principles disclosed herein relate to the configuration of the article of footwear 1 and the component elements thereof. Other aspects of the teachings and principles disclosed herein relate to construction of the component elements themselves. Yet other aspects of the teachings and principles disclosed herein relate to the functional properties of the component elements due to their configuration and/or construction. Yet other aspects of the teachings and principles disclosed herein relate to combinations of configuration, construction, and/or functional or physical properties of the component elements. Some of these aspects may be illustrated or discussed in relation to a particular representative implementation, while others may be illustrated or discussed in relation to one or more different representative implementations. Notwithstanding, the scope of the invention disclosed and contemplated herein includes all aspects of the teachings and principles whether found in, or discussed in relation to, a single representative implementation or multiple representative implementations. Thus, it is contemplated that one or more aspects or features relating to configuration, construction, functional or physical properties of the component elements in, or discussed in relation to, an exemplary implementation may be combined with any of the one or more aspects or features in, or discussed in relation to, a different exemplary implementation without limitation. Accordingly, no restriction should be placed on any patentable elements disclosed herein—whether disclosed in a single embodiment or combinable from multiple embodiments—other than those that exist in the prior art or under applicable law can be rightfully combined therefrom to defeat patentability. In addition, the written description includes headings of various aspects of the invention. It should be understood, however, that the headings are provided for convenience only and are not to limit in anyway the invention described in this disclosure.

I. The foot

Figure 2:
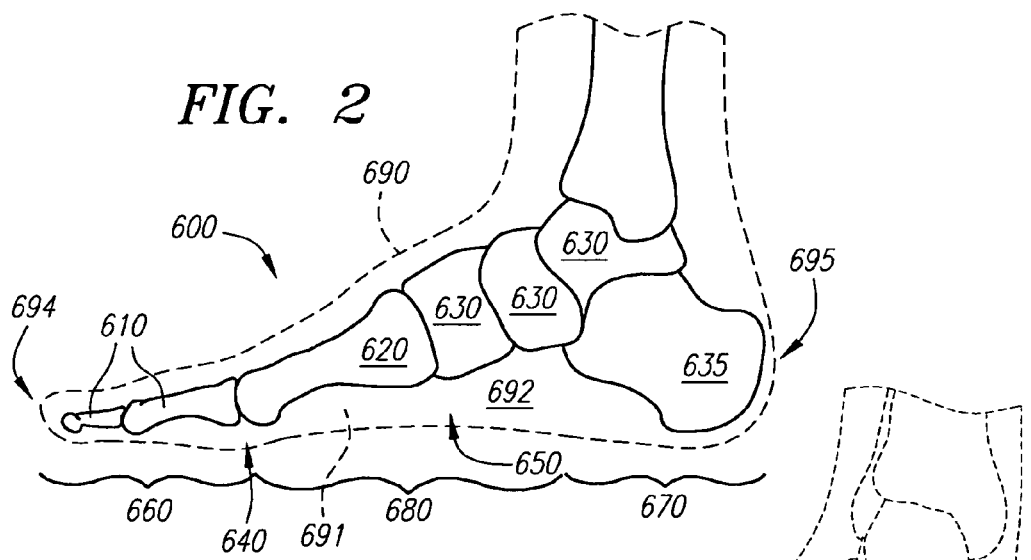
Figure 3:
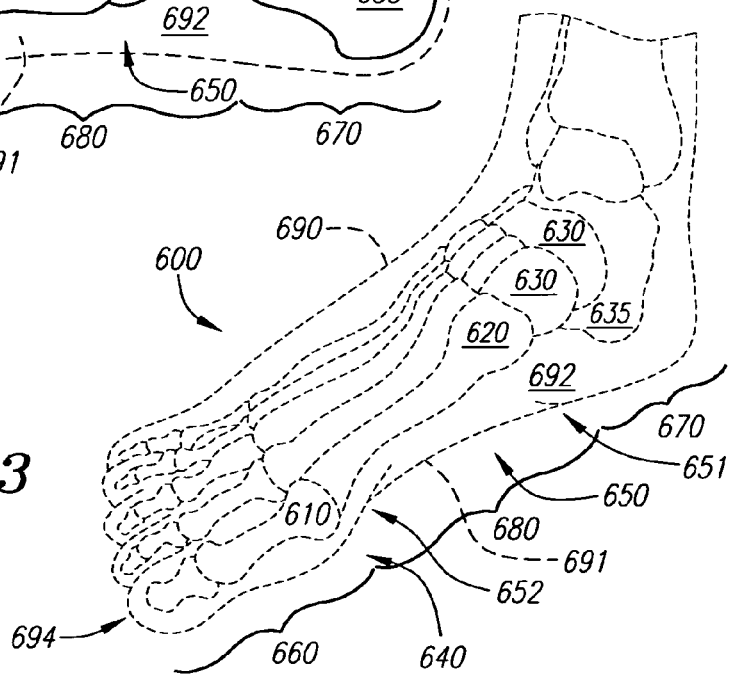

Illustrated in FIGS. 1-4 are diagrams of a representative foot 600. Internally, the foot 600 is formed of phalange bones 610, metatarsal bones 620, and tarsal bones 630 including a heel or calcaneus bone 635. Externally the foot 600 includes a top surface 690, a bottom surface 691, a medial side 692, a lateral side 693, an anterior end 694, a posterior end 695, a toe region 660, a heel region 670, a mid-region 680, and a longitudinal arch of the foot 650 that generally falls within the mid-region 680 and is separated on the medial side 692 from the toe region 660 by the ball of the foot 640. As illustrated in FIGS. 1-3, the heel region 670, the toe region 660, and the mid-region 680 residing therebetween effectively partition the foot 600 into three discrete regions.

Figure 4:
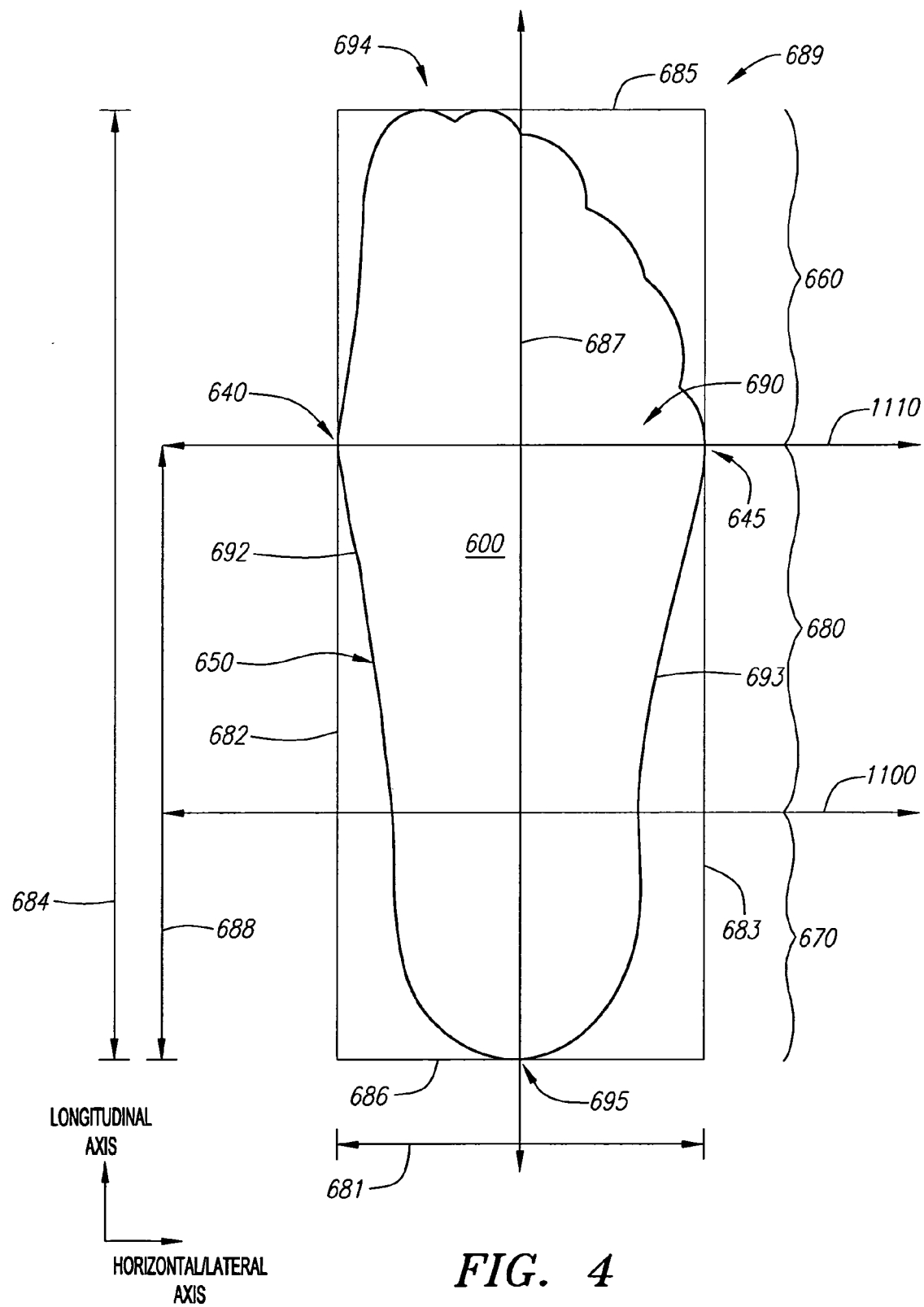
Figure 5:
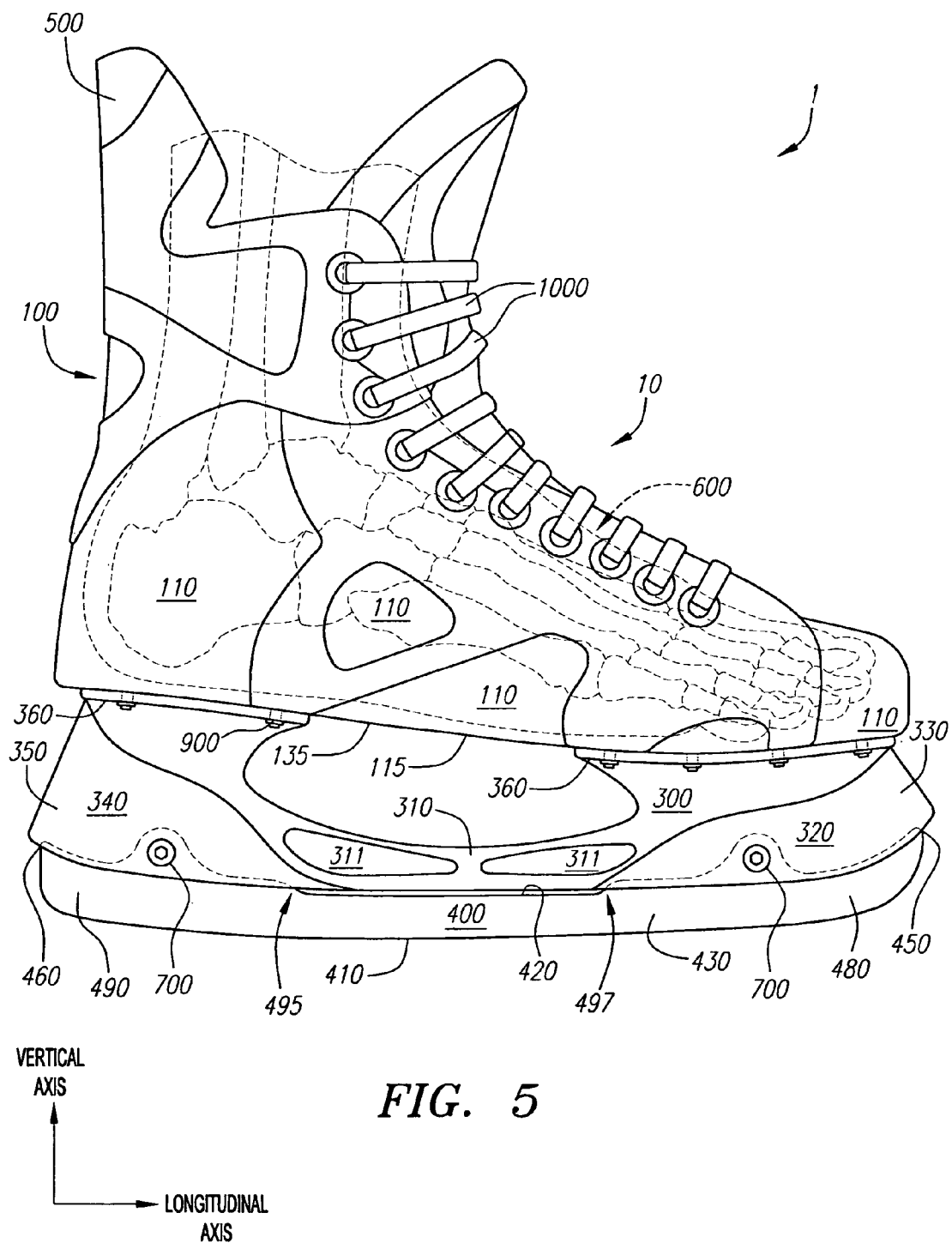
FIG. 5 is a lateral side view diagram of an article of footwear, in the form of an ice skate, employing a unitary support structure in accordance with a first preferred implementation, with the foot depicted in FIGS. 1-4 illustrated in phantom for reference.
Figure 6:
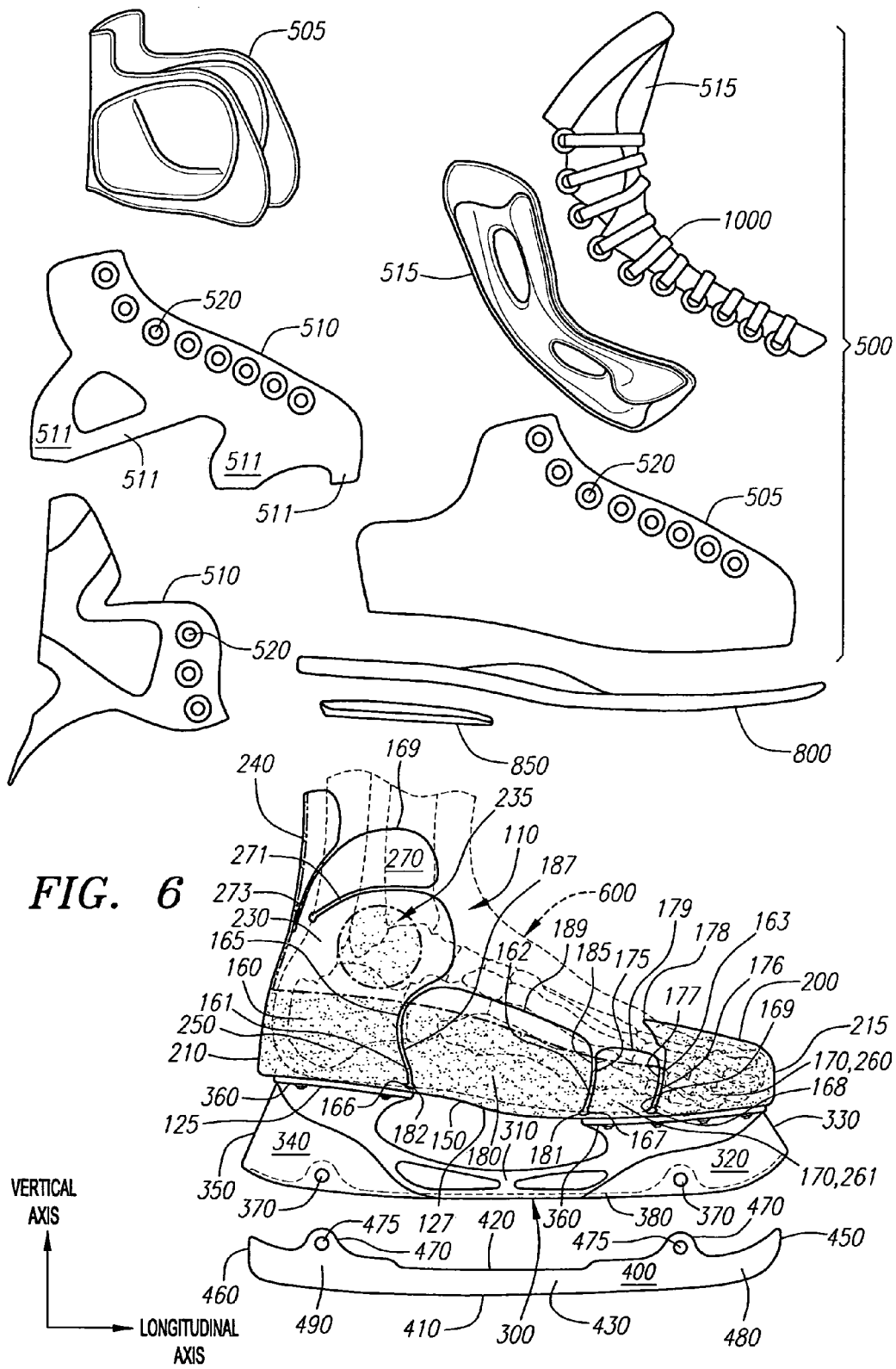
FIG. 6 is a diagram of an exploded lateral side view of the article of footwear illustrated in FIG. 5 revealing in more detail the construction of the unitary support structure and the various components of the article of footwear, with the foot depicted in FIGS. 1-4 illustrated in phantom for reference.
Figure 7:
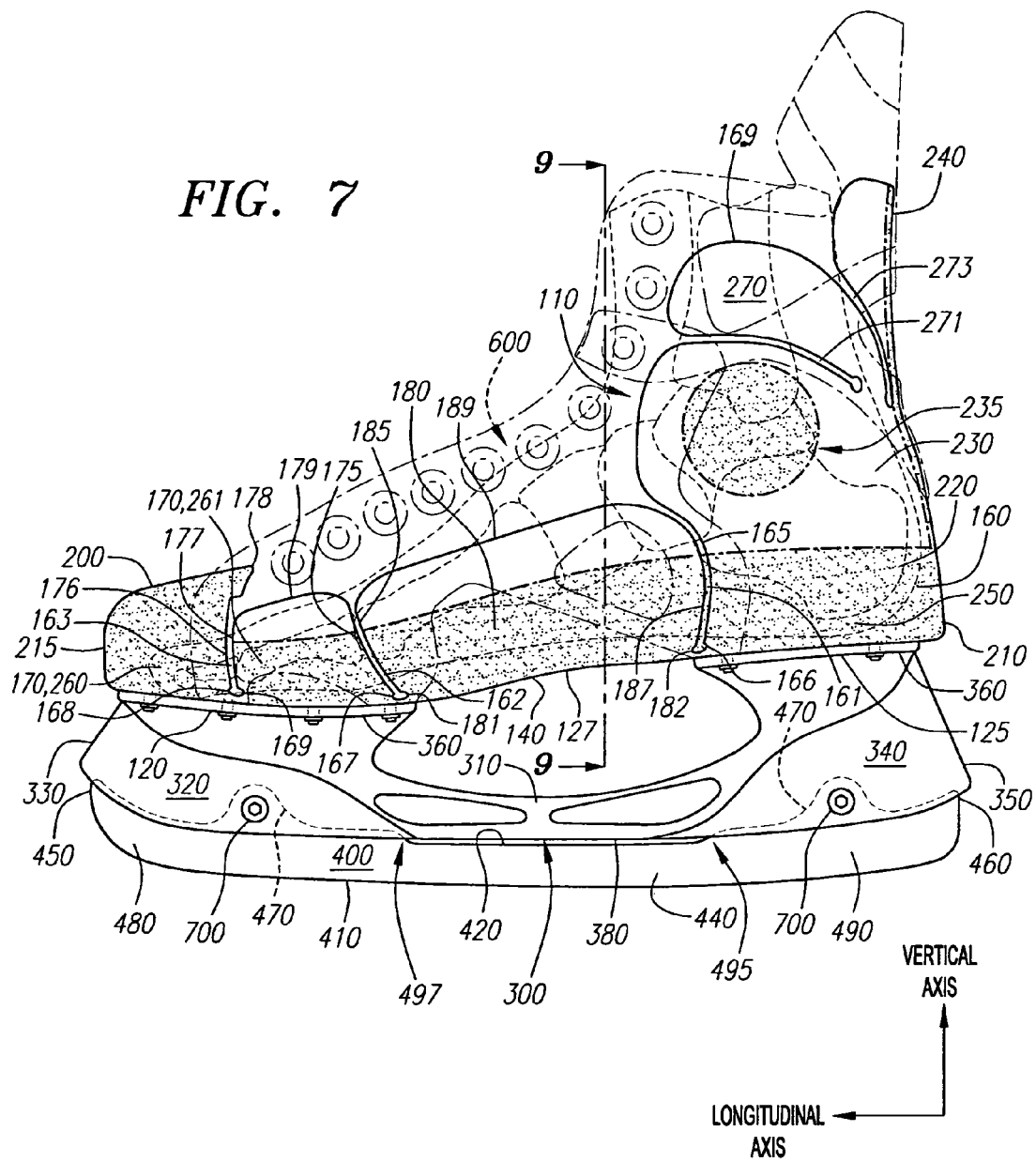
FIG. 7 is a medial side view diagram of the article of footwear illustrated in FIG. 5, with the foot depicted in FIGS. 1-4 and the upper portion being illustrated in phantom for reference.
Figure 8:
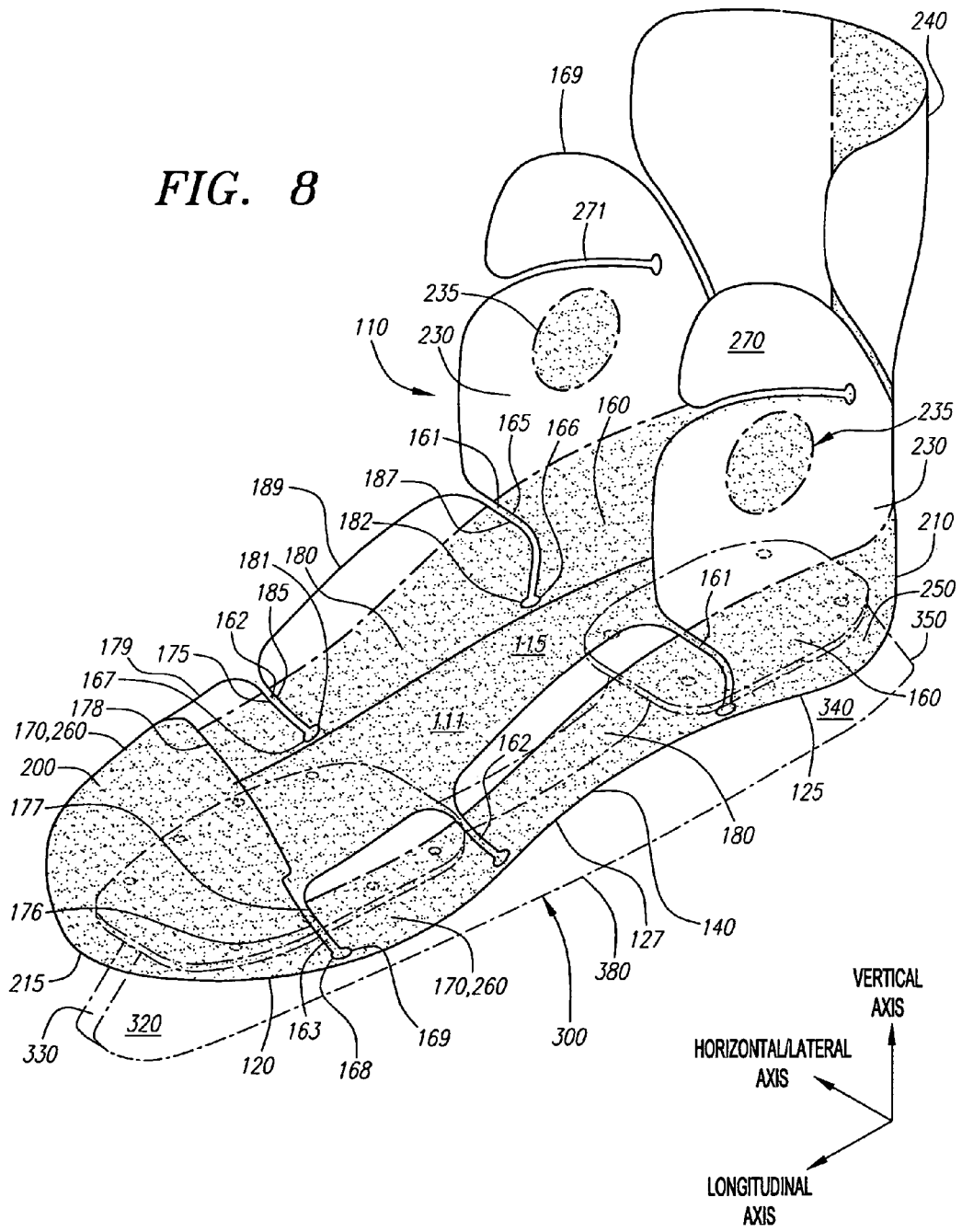
FIG. 8 is a medial perspective view diagram of the unitary support structure illustrated in FIG. 5, with the blade holder illustrated in phantom.
Figure 9:
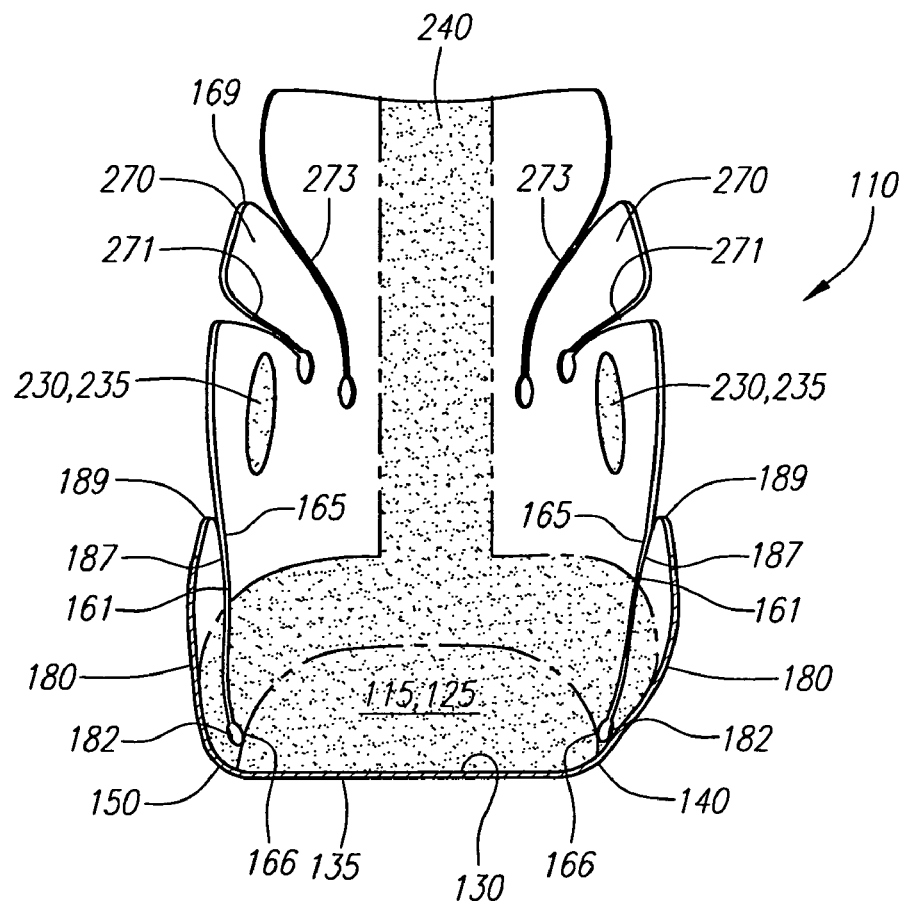
FIG. 9 is a sectional view diagram of the unitary support structure taken along line 9-9 of FIG. 7.
Figure 10:
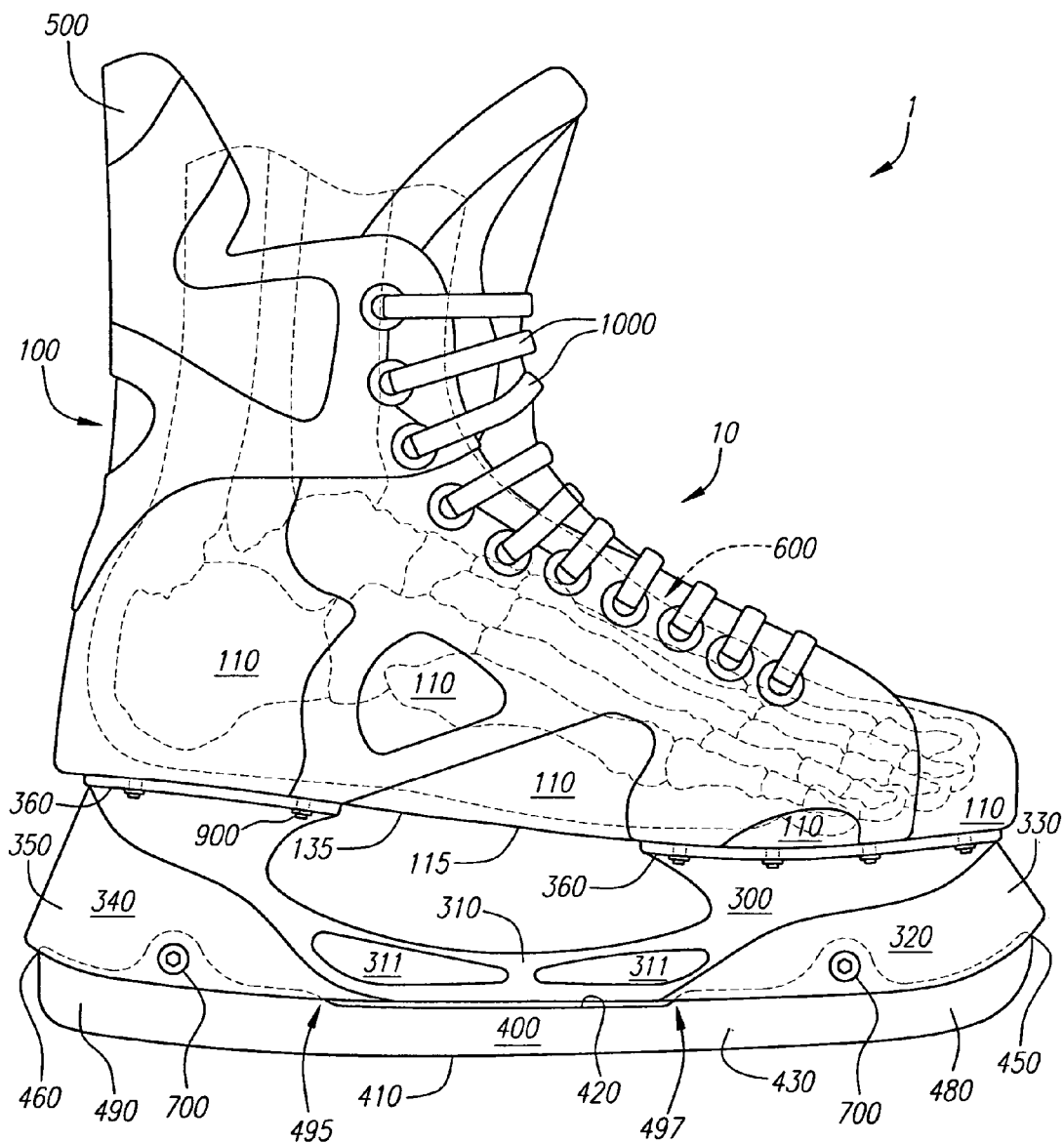
FIG. 10 is a lateral side view diagram of an article of footwear, in the form of an ice skate, employing a unitary support structure in accordance with a second preferred implementation, with the foot depicted in FIGS. 1-4 illustrated in phantom for reference.
Figure 11:
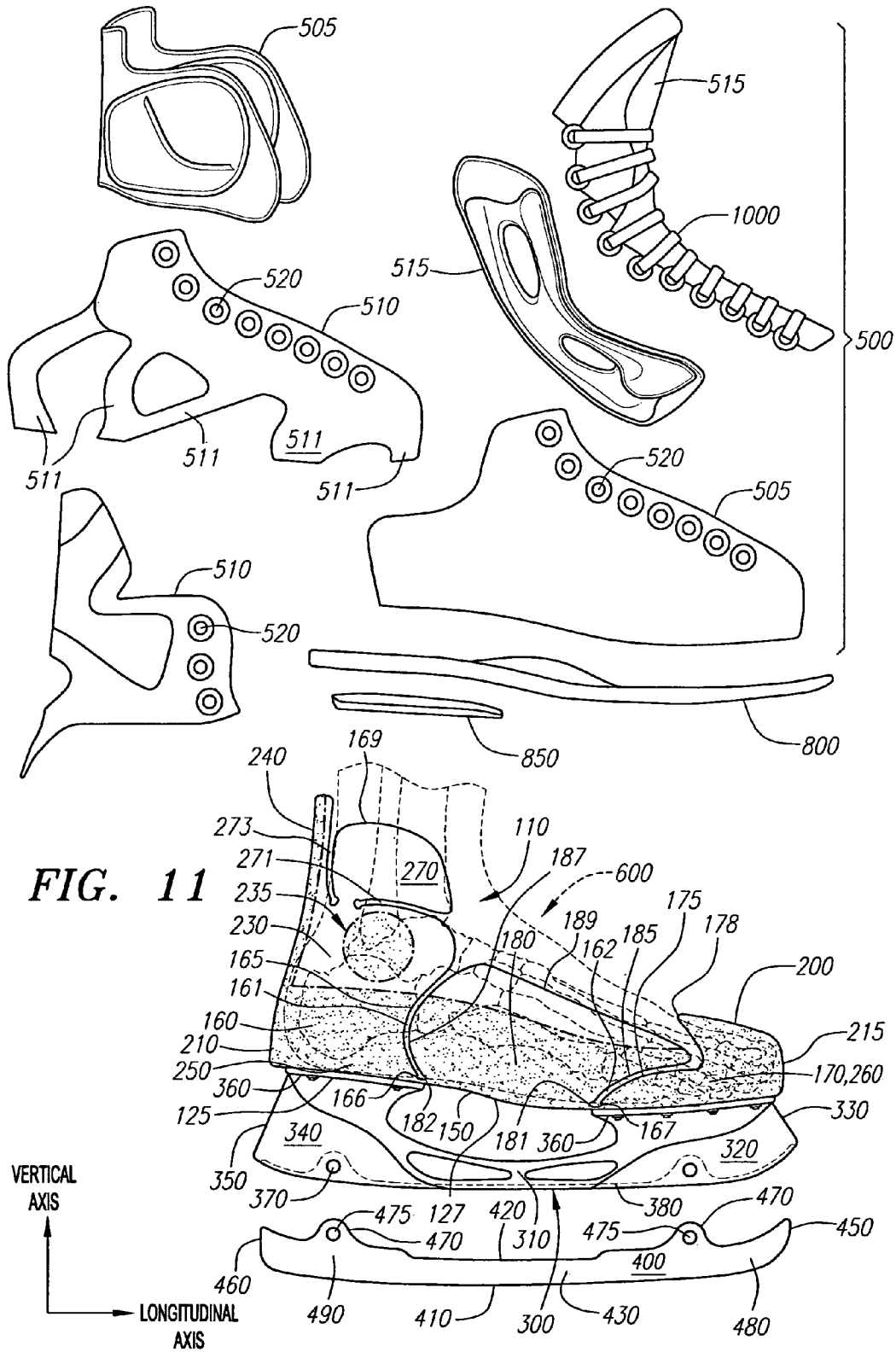
FIG. 11 is a diagram of an exploded lateral side view of the article of footwear illustrated in FIG. 10 revealing in more detail the construction of the unitary support structure and the various components of the article of footwear, with the foot depicted in FIGS. 1-4 illustrated in phantom for reference.
Figure 12:
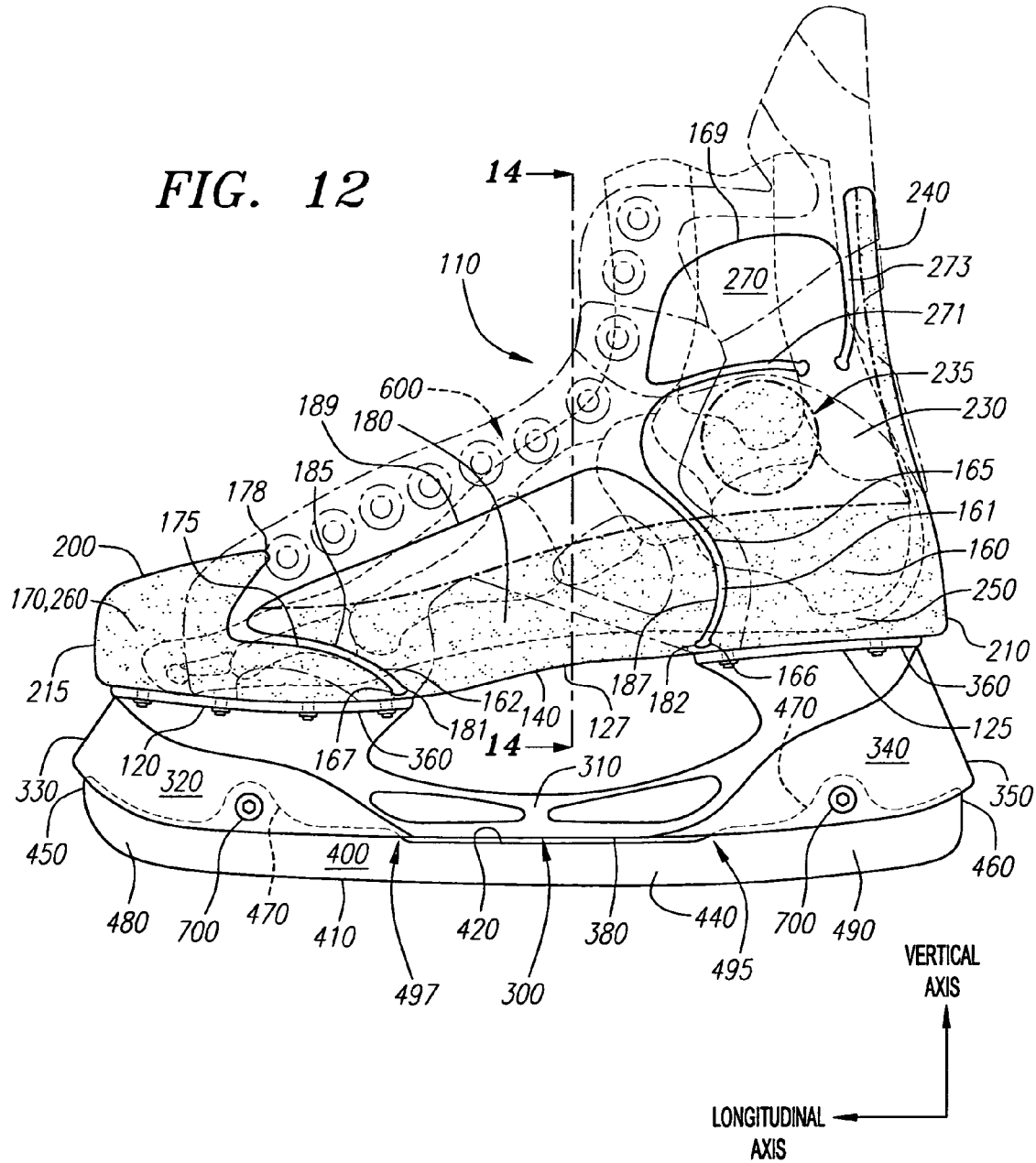
FIG. 12 is a medial side view diagram of the article of footwear illustrated in FIG. 10, with the foot depicted in FIGS. 1-4 and the upper portion being illustrated in phantom for reference.
Figure 13:
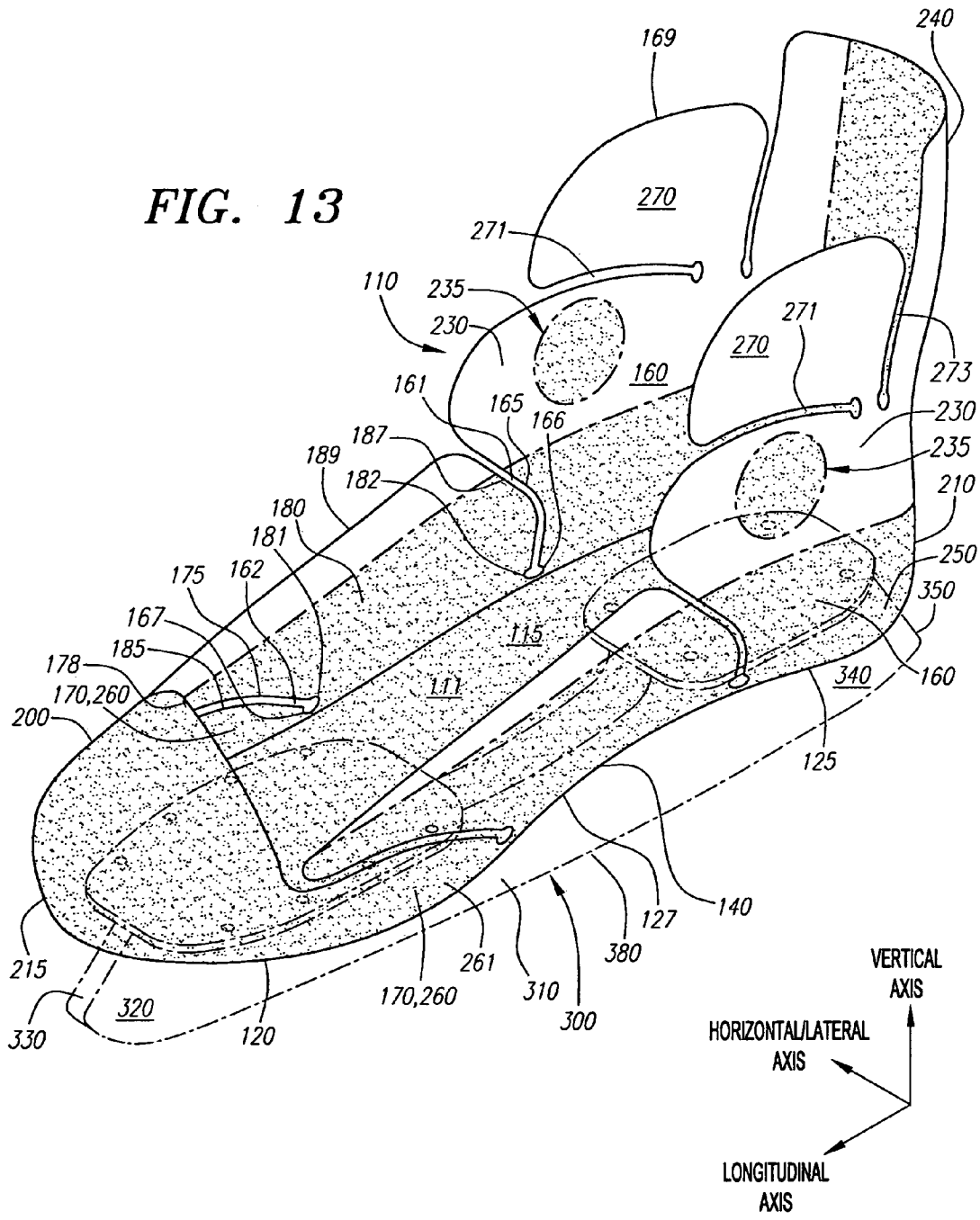
FIG. 13 is a medial perspective view diagram of the unitary support structure illustrated in FIG. 10, with the blade holder illustrated in phantom.
Figure 14:
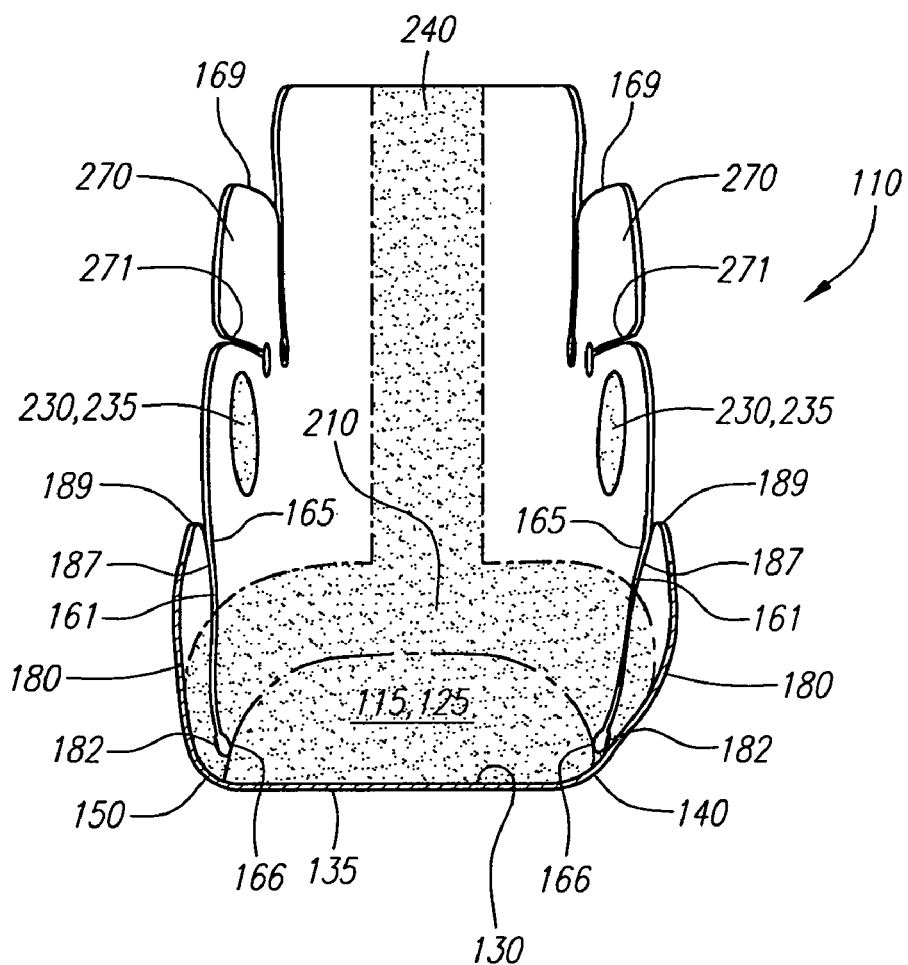
FIG. 14 is a sectional view diagram of the unitary support structure taken along line 14-14 of FIG. 12.
Figure 15:
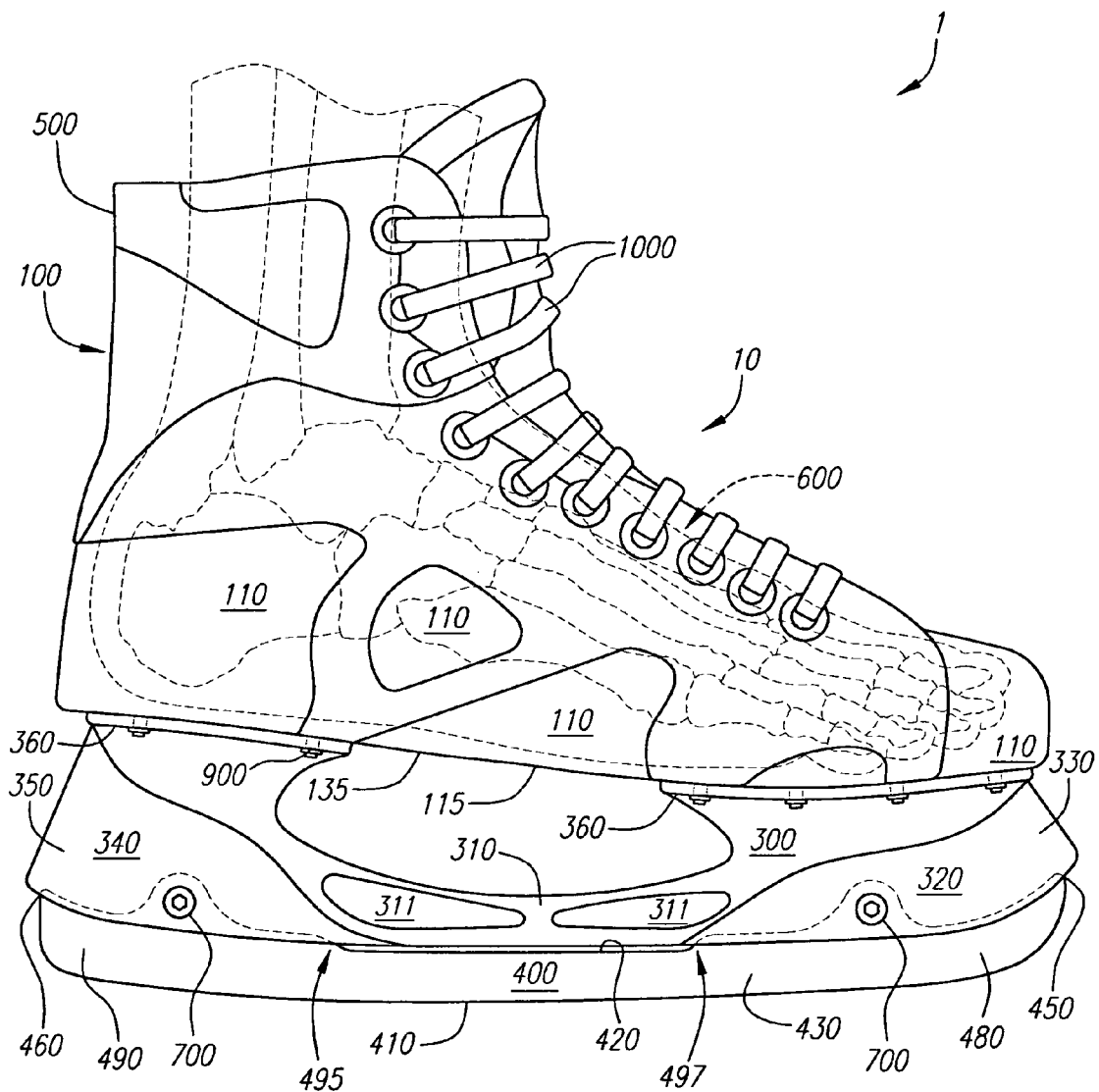
FIG. 15 is a lateral side view diagram of an article of footwear, in the form of an ice skate, employing a unitary support structure in accordance with a third preferred implementation, with the foot depicted in FIGS. 1-4 illustrated in phantom for reference.
Figure 17:
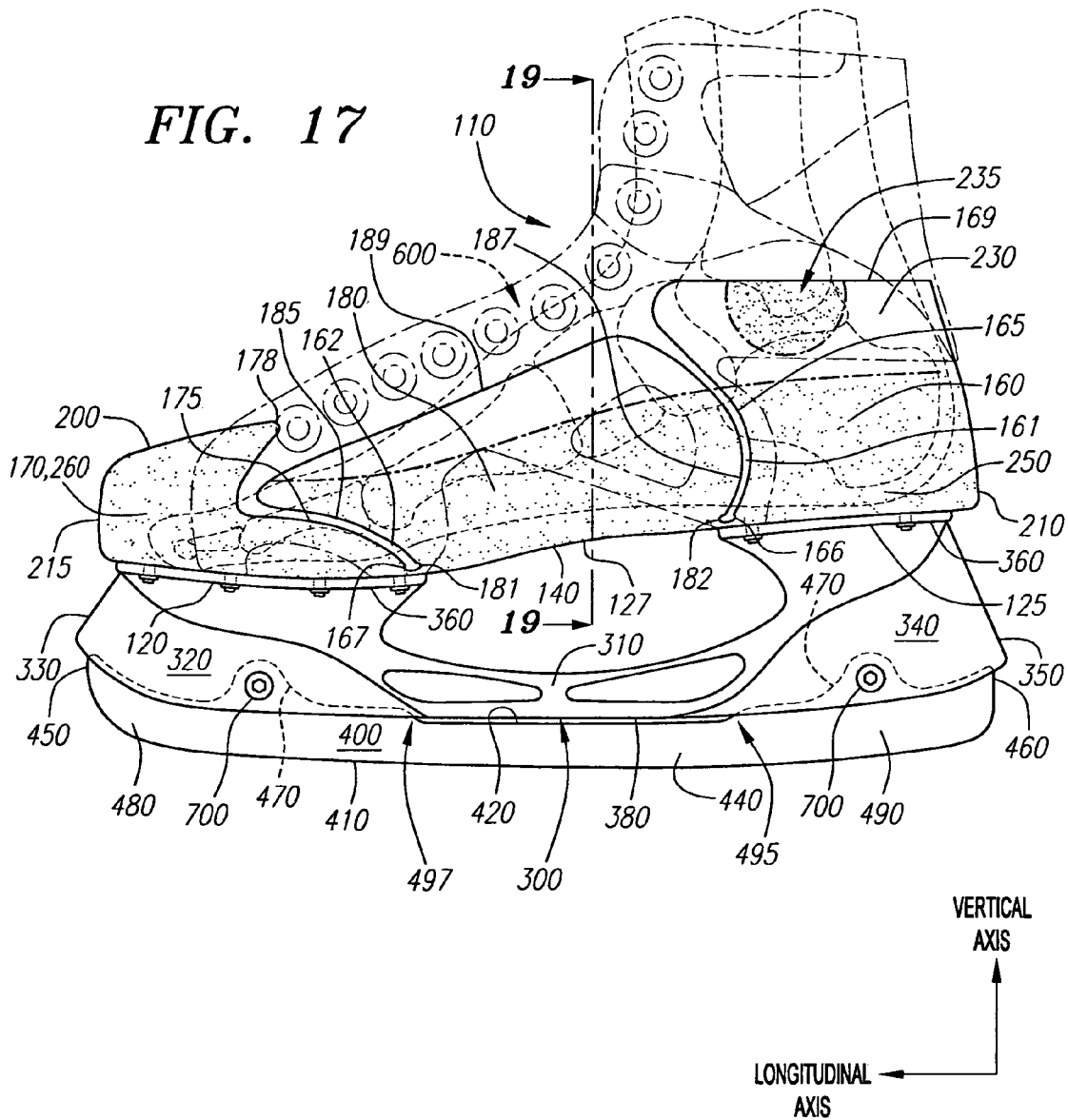
FIG. 17 is a medial side view diagram of the article of footwear illustrated in FIG. 15, with the foot depicted in FIGS. 1-4 and the upper portion being illustrated in phantom for reference.
Figure 18:
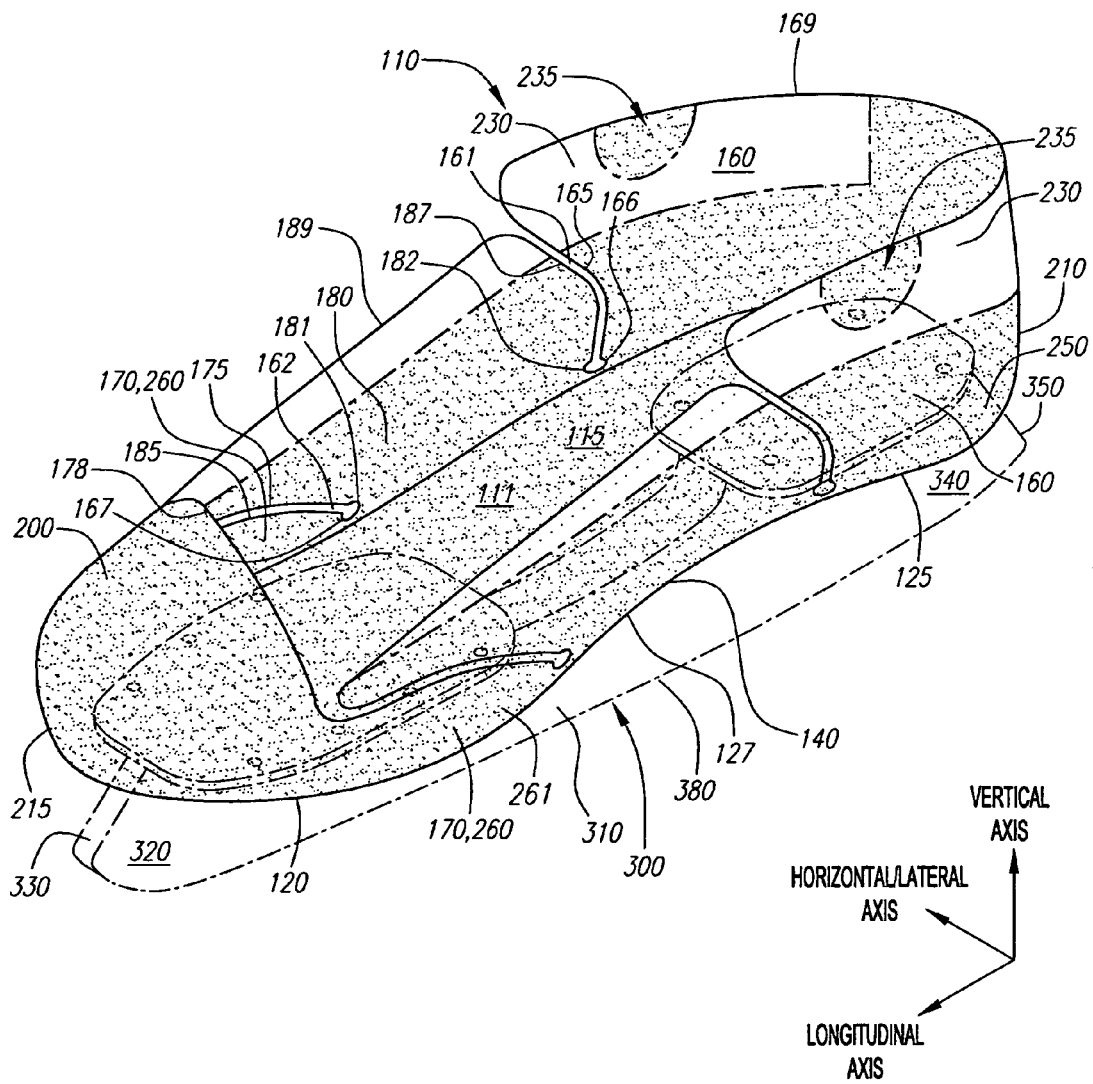
FIG. 18 is a medial perspective view diagram of the unitary support structure illustrated in FIG. 15, with the blade holder illustrated in phantom.
Figure 19:
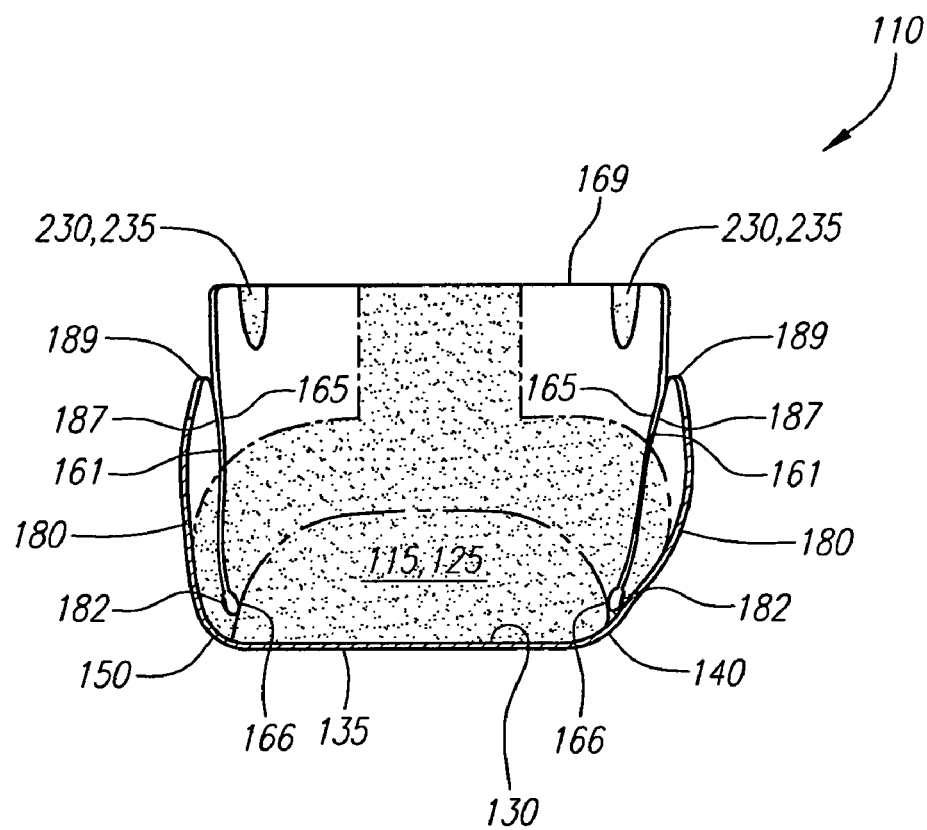
FIG. 19 is a sectional view diagram of the unitary support structure taken along line 19-19 of FIG. 17.
Figure 22:
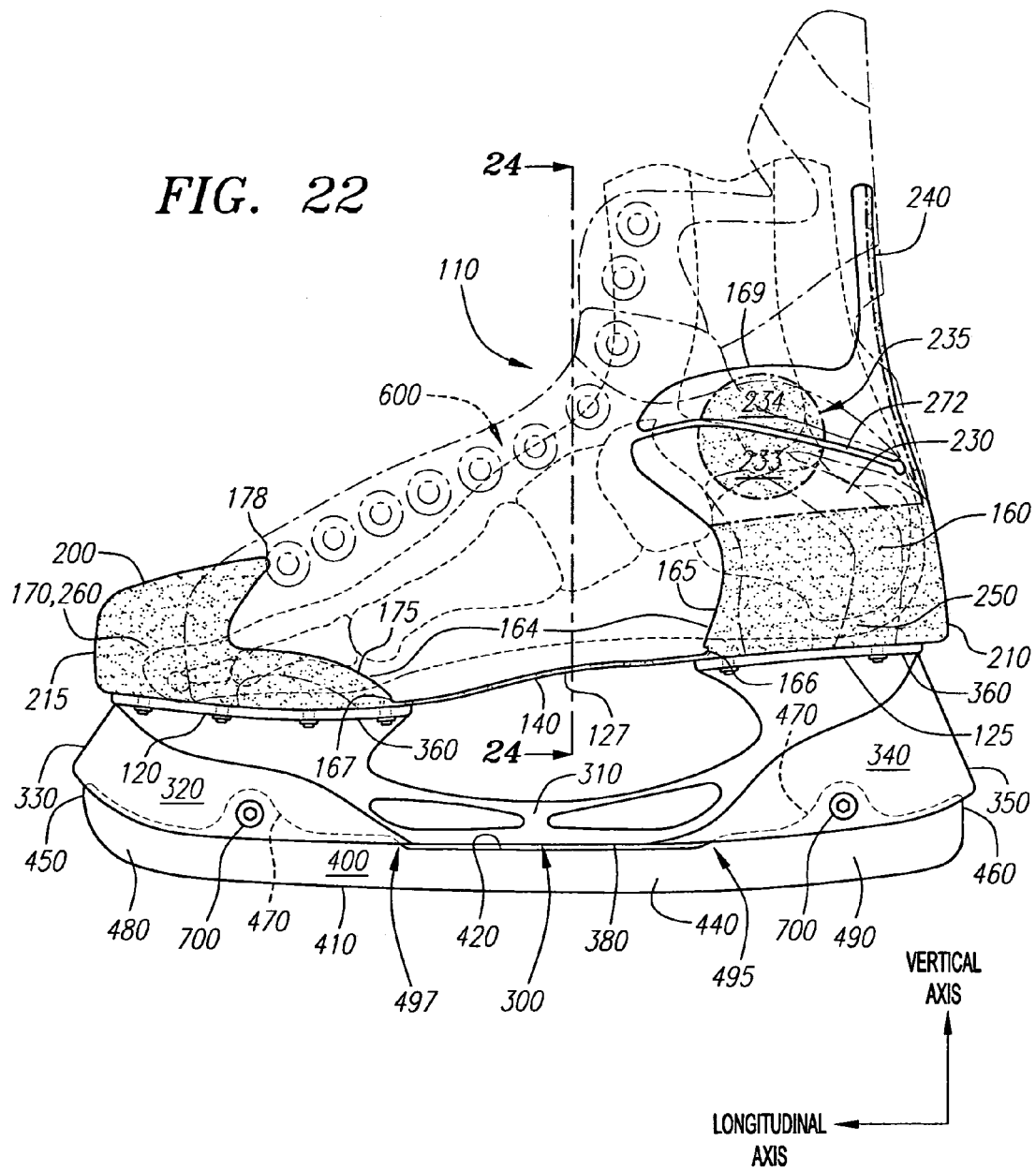
FIG. 22 is a medial side view diagram of the article of footwear illustrated in FIG. 20, with the foot depicted in FIGS. 1-4 and the upper portion being illustrated in phantom for reference.
Figure 23:
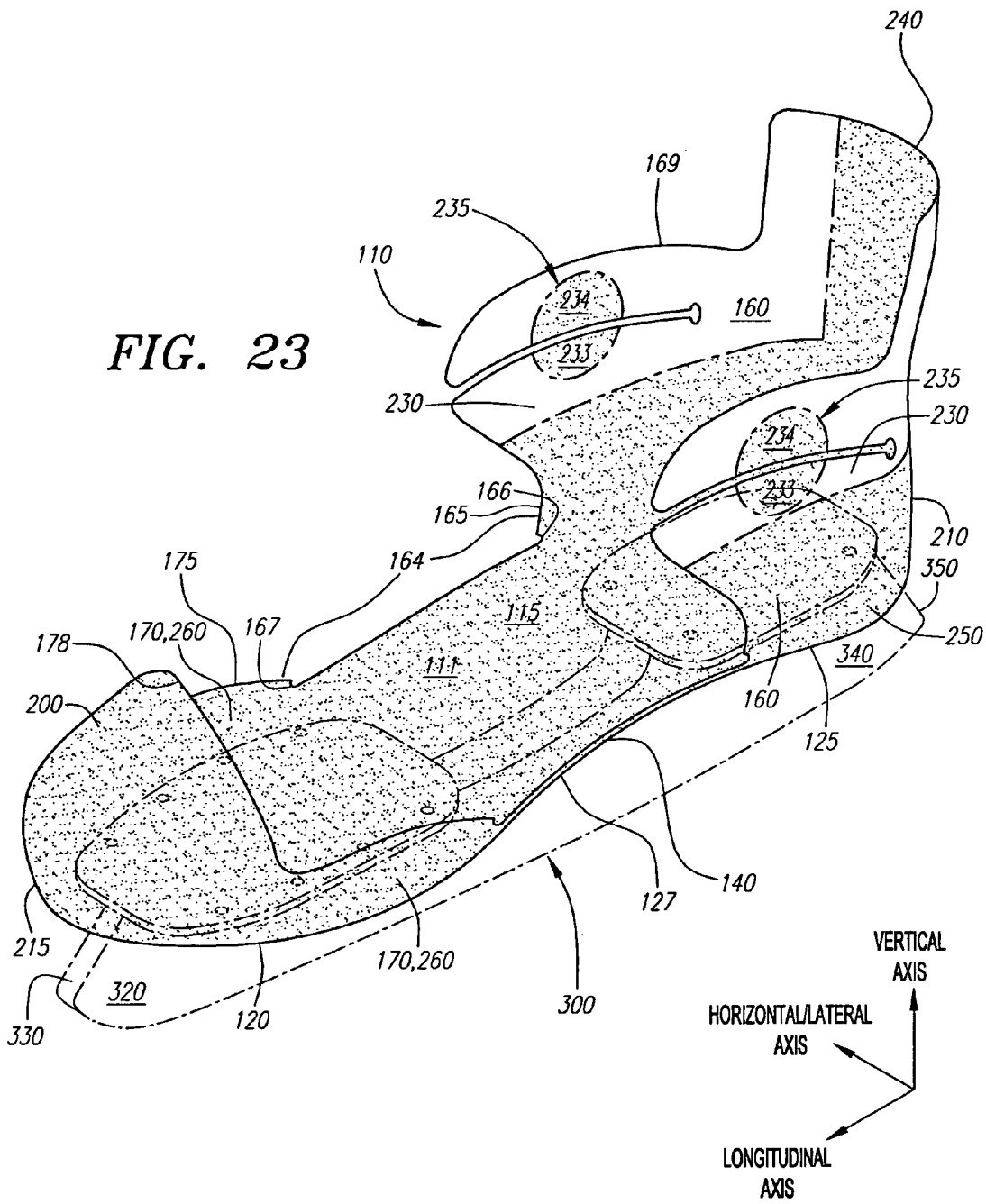
FIG. 23 is a medial perspective view diagram of the unitary support structure illustrated in FIG. 20, with the blade holder illustrated in phantom.
Figure 24:
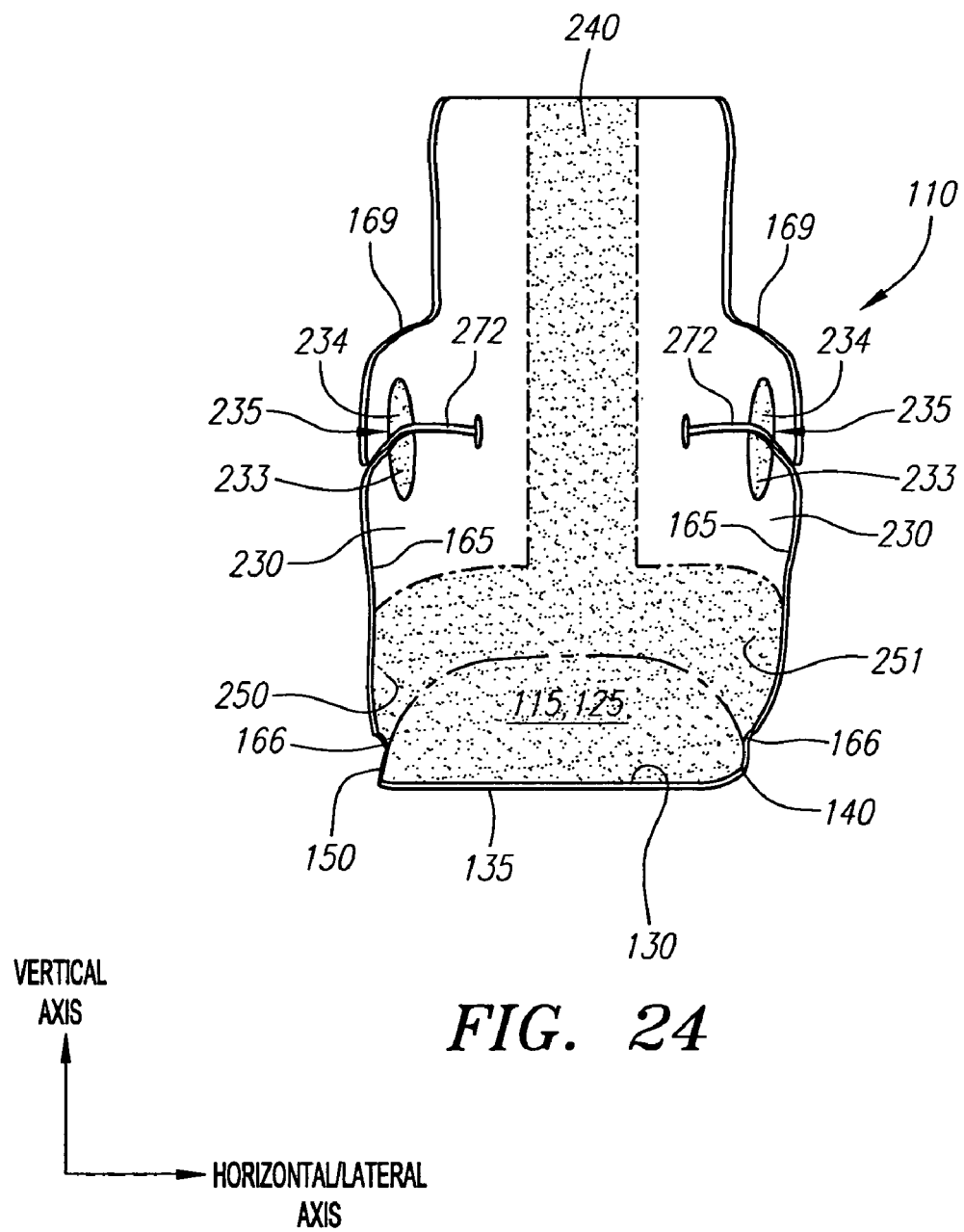
FIG. 24 is a sectional view diagram of the unitary support structure taken along line 24-24 of FIG. 22.

Turn now to the particulars of the top plan view of the representative foot 600 illustrated in FIG. 4. Shown in FIG. 4 is a reference rectangle 689 having a medial side 682, a lateral side 683, an anterior side 685, and a posterior side 686, which together form a rectangular perimeter about the top plan view of the representative foot 600. Notably, the reference rectangle 689 is dimensioned so that the area defined by its perimeter is sufficient to surround the plan view of the representative foot 600 without defining an area that is greater than necessary to do so. Hence, the reference rectangle 689 is the smallest rectangle in terms of area defined by its perimeter that may enclose the perimeter of the representative foot 600, such as that illustrated in FIG. 4.

The phrase "width of the foot" refers to the dimension of the foot 600 identified by reference numeral 681 in FIG. 4 and is defined as the distance between the medial and lateral sides, 682, 683 of the reference rectangle 689. It is also the horizontal or lateral distance across the ball of the foot 640, from the medial extent of the foot to the lateral extent of the foot 645.

The phrase "longitudinal length of the foot" refers to the dimension of the foot 600 identified by reference numeral 684 in FIG. 4 and is defined as the distance between the anterior and posterior sides 685, 686 of the reference rectangle 689. It is also the longitudinal distance that is generally defined between the anterior end 694 and the posterior end 695 of the foot 600.

The phrase "longitudinal length between the back of the heel and the ball of the foot" is identified by reference numeral 688 in FIG. 4. It is the longitudinal distance between the posterior side 686 of the reference rectangle 689 and ball of the foot 640. It is also the longitudinal distance that is generally defined between the posterior end 695 of the foot 600 and the ball of the foot 640. It is also referred to herein by the acronym "L-HB."

Figure 26:
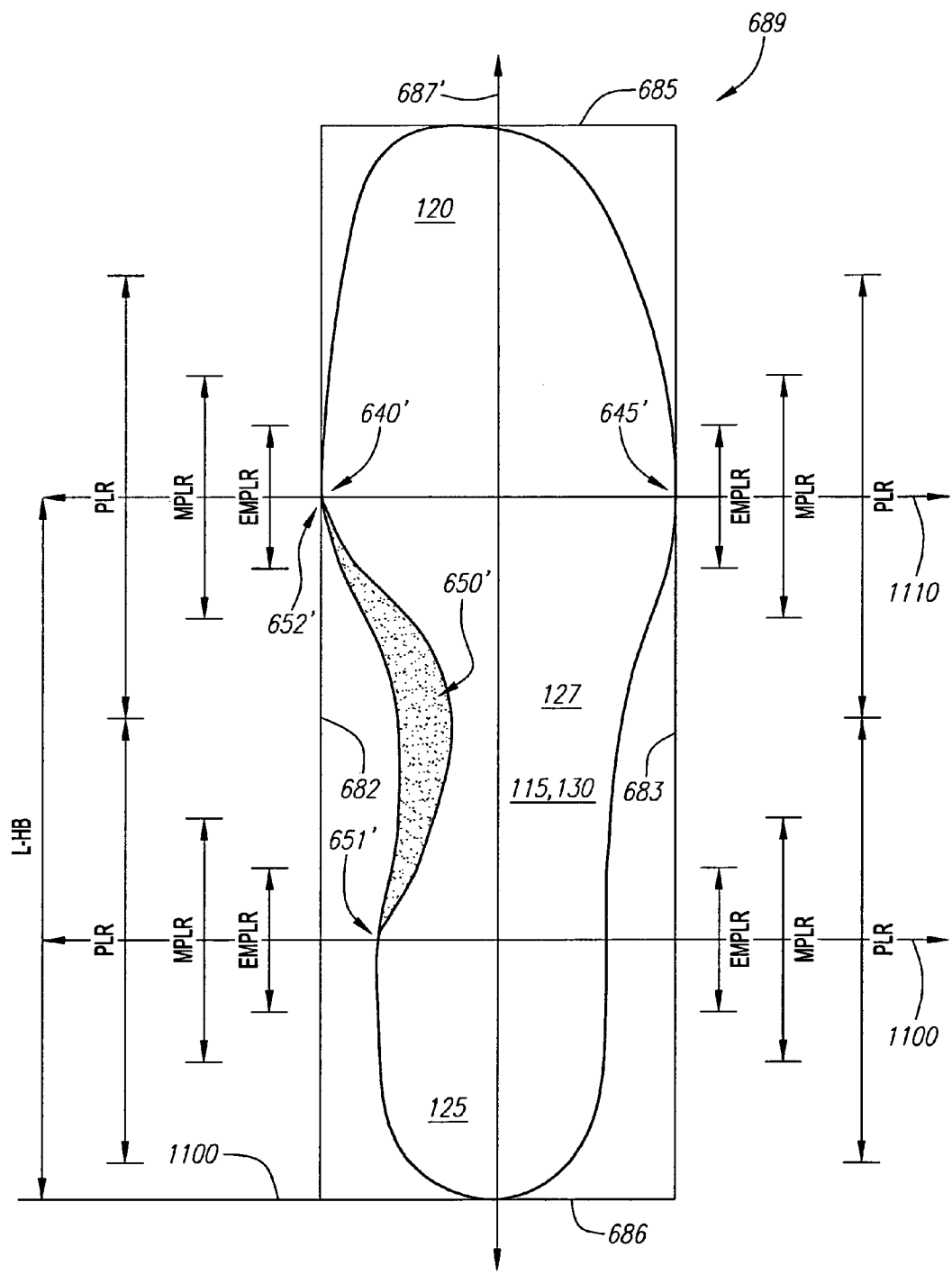
FIG. 26 is a diagram of the top plan view of the top surface of the sole of the unitary support structure of the preferred implementations illustrated FIGS. 5-24, preferred positioning ranges for longitudinally partitioning the wall members extending from the sole on the medial and/or lateral sides thereof of unitary support structures in accordance with the teachings and principles described herein are illustrated.

The phrase "longitudinal center axis of the foot" is identified by reference numeral 687 in FIGS. 4 and 26 and is defined as the axis that partitions, in equal lengths, the anterior and posterior sides 685, 686 of the reference rectangle 689. It generally runs lengthwise from the heel to the toes of the foot 600 and generally parallel or co-extensive to the longitudinal midline of the foot 600. The longitudinal midline of the foot is generally the axis line that extends from a point midway between the second and third toes to the midpoint of the calcaneus or heel bone 635, which is illustrated in FIGS. 1-3.

The phrase "anterior end of the foot" (identified by reference numeral 694) refers to the most anterior end of the foot 600 that extends forward from the leg, which in the top plan view diagram of FIG. 4 is located at the anterior side 685 of the rectangle 689.

The phrase "posterior end of the foot" (identified by reference numeral 695) refers to the most posterior end of the foot 600 that extends backward from the front of the leg, which typically extends generally some amount rearward from the ankle joint (i.e., the joint between the leg and the foot 600), which in the top plan view diagram of FIG. 4 is located at the posterior side 686 of the rectangle 689.

The phrase "ball of the foot" refers to the portion of the foot 600 identified by reference numeral 640. Internally, it is defined generally as the area where the most medial metatarsal bone 620 (or the "first metatarsal bone") meets the most medial phalange bone 610 (or the "first phalange bone"), which is often referred to as the first metatarsal-phalange joint. Externally, it is generally characterized as the area of the forefoot (i.e., the front portion of the foot) that extends the greatest distance medially from the longitudinal center line axis 687 of the foot 600 and delineates on the medial side 692 of the foot 600 the toe region 660 from the more posterior regions of the foot 600 (e.g., the heel and mid regions 670, 680). It is also referred to herein as the "medial extent of the foot."

The phrase "lateral extent of the foot" refers to the portion of the foot 600 identified by reference numeral 645. Internally, it is defined generally as the area where the most lateral metatarsal bone 620 (or the "fifth metatarsal bone") meets the most lateral phalange bone 610 (or the "fifth phalange bone"), which is often referred to as the fifth metatarsal-phalange joint. Externally, it is generally characterized as the area of the forefoot that extends the greatest distance laterally from the longitudinal center line axis 687 of the foot 600 and delineates on the lateral side 693 of the foot 600 the toe region 660 from the more posterior regions of the foot 600.

The phrase "toe region of the foot" or "toe region" refers to the portion of the foot 600 identified by reference numeral 660. Internally, it is the portion of the foot that is formed by the phalange bones 610. Externally, it is the region of the foot 600 that is generally anterior relative to the arch of the foot 650. On the medial side 692 of the foot 600, the toe region 660 extends anterior from the ball of the foot 640. On the lateral side 693 of the foot 600, the toe region 660 extends anterior from the lateral extent of the foot 645.

The phrase "heel region of the foot" or "heel region" refers to the portion of the foot 600 identified by reference numeral 670. Internally, it is defined as the portion of a foot 600 that is formed by the posterior aspect of the calcaneus or heel bone 635. Externally, it is generally defined as the portion of the foot 600 that resides generally below and posterior to the upright ankle. It is also externally characterized as the portion of the foot 600 that resides posterior to the posterior end 651 of the longitudinal arch of the foot 650. Notably, applicants have determined that typically the heel region 670 measures approximately 40 percent of the longitudinal distance between the posterior end of the foot 695 (i.e. the back of the heel region 670) and the ball of the foot 640.

The phrase the "mid-region of the foot" refers to the portion of the foot 600 identified by reference numeral 680, which resides between the toe region 660 of the foot 600 and the heel region 670 of the foot 600. At its anterior end, it is generally characterized externally on the medial side by the beginning of the narrowing of the transverse width of the foot 600 moving from the ball of the foot 640 toward the heel of the foot, while on the lateral side by the beginning of the narrowing of the transverse width of the foot 600 moving from the lateral extent of the foot 645 toward the heel of the foot. The mid-region of the foot 680 is also generally characterized externally at its posterior end by the posterior end 651 of the arch of the foot 650 and on its anterior end by the anterior end 652 of the arch of the foot 650 as characterized on the medial side 692 of the foot 600.

The phrase the "longitudinal arch of the foot" or the "arch of the foot" refers to the portion of a foot 600 identified by reference numeral 650. Internally, the arch of the foot 650 is defined at its anterior end by the heads of the metatarsals 620 and its posterior end by the posterior aspect of the calcaneus bone 635. Externally it is defined by the vaulted portion of the foot 600 that extends between the ball of the foot 640 and the heel region 670.

The phrase "top of the foot" or "top surface of the foot" (identified by reference numeral 690) refers to the surface of the foot 600 that is defined by the perimeter of the upright foot 600 as seen from a top plan view of the foot 600, such as that illustrated in FIG. 4.

The phrase "bottom of the foot" or "bottom surface of the foot" (identified by reference numeral 691) refers to the surface of the foot 600 that is defined by the perimeter of the upright foot 600 as seen from a bottom plan view of the foot 600. Thus, the perimeter of the bottom of the foot 691 and the top of the foot 692 are the same and therefore co-define the perimeter of the foot 600.

The phrase "longitudinal axis of the foot" refers to an axis that is generally parallel to the longitudinal center axis 687 of the foot 600.

The phrase "horizontal axis of the foot" refers to an axis that is generally perpendicular to the longitudinal center axis 687 and vertical axis of the foot 600 as illustrated in FIGS. 4, 8, 9, 13, 14, 18, 19, 23, and 24. It is also referred to herein as the "lateral axis" or "lateral axis of the foot."

The phrase "vertical axis of the foot" refers to an axis that is generally perpendicular to the longitudinal center axis 687 and horizontal axis of the foot 600 as illustrated in FIGS. 1 and 5-24. It is also referred to herein as the "vertical axis."

Hence, a vertical axis is generally normal to a plane defined by the horizontal and longitudinal axes; a horizontal axis is generally normal to a plane defined by the vertical and longitudinal axes; and a longitudinal axis is generally normal to a plane defined by the vertical and horizontal axes.

The phrase "transverse axis" refers to an axis line that is generally parallel to the plane defined by horizontal and longitudinal axes but is not necessarily normal to the plane defined by vertical and longitudinal axes. Thus a "transverse axis" as used herein may or may not correspond to a "horizontal axis".

The representative foot 600 illustrated in FIGS. 1-4 is depicted in phantom in FIGS. 5-7, 10-12, 15-17, and 20-22 to provide reference to the structure and configuration of the footwear implementations illustrated therein. It is to be understood that the regions and axes of representative foot 600 defined and discussed above are proxies for the corresponding regions and axes of the foot cavity 111 of the article of footwear 1. Thus, for example, the perimeter of the foot is a proxy for the perimeter of the sole 115 vis-à-vis representative regions of the foot 600 configured to correspond to the sole 115.

II. Blade and Blade Holder

The four exemplary implementations, illustrated in FIGS. 5-24, each include a blade holder 300 and blade 400, which are illustrated in FIGS. 5-8, 10-13, 15-18, and 20-23. The blade holder 300 comprises a front member 320 including a front end section 330 and a back member 340 including a back end section 350. The front and back members 320, 340 are depicted as being in the form of a pedestal. The front member 320 is configured to generally underlie the toe region 660 of the foot 600 and the back member 340 is configured to generally underlie the heel region 670 of the foot 600. The front and back members 320, 340 each include flanges 360, which extend around the circumference of the top edge of the pedestal that is formed by each member 320, 340. The flanges 360 function to facilitate the attachment of the blade holder 300 to the boot 100 via conventional mechanical means such as rivets (900), screws or the like. It is contemplated, that as an alternative or supplemental means for attaching the blade holder to the blade, that one or more components of the boot 100 may be formed integral with the blade holder 300 or may be attached thereto with a suitable adhesive.

The blade holder 300 may also include a center section 310 which extends between the front and back members 320, 340 of the blade holder 300. The center section 310 may be formed to include one or more voids 311, which may be in the form of a depression (relative to one or more outer surfaces of the center section within which the void resides). The depression may take the form of a closed-ended cavity or may pass all the way through the opposing medial and lateral sides of the center section 310 of the blade holder 300. The structure of the center section 310, void 311, or both may be engineered to effect the overall weight, rigidity, and structural integrity of the blade holder 300 as well as to facilitate the desired mechanical communication and flexibility between the front and rear members 320, 340 of the blade holder 300. Furthermore, although the center section 310 is illustrated as being displaced vertically from the boot 100, it is contemplated that the center section 310 may be configured to mate with the bottom surface 135 of the sole 115 of the boot 100: In such a configuration, flanges may be provided similar to flanges 360 provided at the front and back members 320, 340 of the blade holder 300 to facilitate attachment, as previously described.

Formed at the bottom of the blade holder 300 is an elongated groove 380 (best illustrated in phantom in FIGS. 6, 11, 16, 21) that is adapted or configured to receive the blade 400. Blade attachment holes 370 are provided through the blade holder 300 at the front and back end members 320 and 340 to facilitate retention of the blade 400 within the groove 380 of the blade holder 300. The blade holder 300 may comprise opposed wall members 390 (not expressly called out in the drawings) located on the medial and lateral sides and joined together at opposing external or internal perimeter formations. The blade holder 300 may be formed as a unitary structure or multi-part structure joined or otherwise coupled together either directly or indirectly, for example, via the blade 400 or bolt 100. The blade holder 300 may be manufactured or constructed of random or chopped fibers disposed in a hardened resin matrix, one or more groups or layers of substantially continuous fibers disposed in a hardened resin matrix in either defined or random orientations, injected molded plastics having suitable rigidity, or any other suitable material capable of providing rigid lateral support to the blade 400 at one or more regions thereof. In a preferred embodiment, the grooves 380 are dimensioned at the front member 320 and preferably the front end section 330 and/or the back member 340 and preferably the back end section 350 so as to snugly receive the blade 400 when attached thereto.

In the exemplary implementations illustrated in FIGS. 5-24, the blade 400, which is illustrated in FIGS. 5-7, 10-12, 15-17, and 20-22, is formed so that it is generally curved along its length in a longitudinal plane to define a generally convex lower surface or ice engaging surface 410. The ice-engaging surface 410 may include one or more edges configured to engage the ice surface. Generally opposed to the ice engaging surface 410 is an upper surface 420 of the blade 400. The blade 400 is further comprised of first and second sides 430, 440, which are generally opposed to one another and generally perpendicular to the ice engaging surface 410 and the upper surface 420. The blade 400 further comprises a front end 450 and a back end 460 at the most posterior and anterior ends thereof, respectively. Positioning holes 475 are provided in attachment ears 470 of the blade 400 and are positioned so that when the blade 400 is received in the desired location of the blade holder 100, the positioning holes 475 are generally concentric with the blade attachment holes 370. These elements of the blade 400 are best illustrated in FIGS. 6, 11, 16, and 21 of the drawings. A securing means 700, such as screws and nuts or the like, are employed to secure the blade 400 to the blade holder 300 via positioning holes 475 in the blade 400 and blade attachment holes 370 in the blade holder 300. Although attachment of the blade 400 to the blade holder 300 is illustrated as being facilitated by mechanical coupling; it is contemplated that adhesive or any other suitable attachment means, whether temporary or permanent, may be employed as an alternative or supplemental means to secure the blade 400 to the blade holder 300.

The blade 400 is preferably rigidly supported in the lateral direction (on either the lateral or medial side or both the lateral and medial sides) at a forward section 480 of the blade 400 and preferably at the front end section 330 of the blade holder 300. The blade 400 may also be rigidly supported in the lateral direction (on either the lateral or medial side or both the lateral and medial sides) at a rearward section 490 of the blade 400, preferably at the back end section 350 of the blade holder 300. The front and back end sections 330, 350 of the blade holder 300 preferably enclose the front end 450 and/or back end 460 of the blade 400, respectively, so as to encase or enclose the front and back end top corners of the blade 400. The rearward section 490 of the blade 400 is defined as the section of the blade 400 located rearward of the forward section 480 of the blade 400.

In a preferred embodiment of the ice skate 10, such as those implementations illustrated in FIGS. 5-24, a portion of at least one side of the rearward section 490 of the blade 400 is laterally unsupported and displaced from the blade holder 300. Such a construction is capable of facilitating lateral flexing of the blade 400 along the blade's longitudinal axis so as to allow the blade 400 to bend more freely at that portion. The bending may facilitate improved blade-ice contact by, for example, allowing additional or different areas of the ice engaging surface 410 of the blade 400 to contact the ice surface. It is preferable that the unsupported and displaced portion of the blade 400 be positioned or configured so that it generally resides longitudinally at or behind the ball of the foot 640. In the preferred implementations illustrated in FIGS. 5-24, the unsupported and displaced portion of the blade 400 is configured to reside underneath the mid-region 680 of the foot 600, generally between the ball of the foot 640 and the heel region 670. Accordingly, the unsupported and displaced portion of the blade 400, in the preferred implementations, is configured to reside underneath the rearward metatarsal and/or tarsal bones 620, 630 of the skater's foot 600. It is to be understood that while only a single unsupported and displaced portion of the blade 400 is illustrated, it is contemplated that multiple unsupported and displaced portions of the blade 400 may be employed.

In the preferred implementations illustrated in FIGS. 5-24, a portion of the upper surface 420 of the blade 400 that is located in the rearward section 490 is displaced vertically from the blade holder 300 to define a gap or space between the upper surface 420 of the blade 400 and lower edge of blade holder 300 residing directly thereabove. When such a construction is employed in an otherwise normally configured blade 400 and/or blade holder 300, there is a commensurate inherent reduction in weight, which provides yet another advantage of the foregoing configuration. In this regard, it is also contemplated that one or more slots or cavities may be formed in the sides 430, 440 of the blade 400 along its longitudinal length to further lighten the blade 400. The slots or cavities may be rectangular, triangular, circular, or any shape or combinations of shapes deemed suitable.

Although not fully illustrated in the drawings, it is noted that an alternative blade 400/blade holder 300 configuration may be employed to provide lateral freedom of the blade 400 as described above. In particular, the groove 380 may be widened at the desired location to form a lateral gap between one or both sides 430, 440 of the blade 400, in the rearward section 490, and the internal wall of the groove 380 of the blade holder 300. The top surface 420 of the blade 400 could therefore be configured to reside within the groove 380 but displaced laterally from one or more of the internal sides that form the groove 380. In this respect, the sides of the groove 380 are capable of serving the additional purposes of functioning as a "stop," so as to limit the distance the blade 400 may flex in the lateral direction and as a protective guard by covering the upper edges of the blade 400. Moreover, in order to control, absorb or cushion the flexing of the blade 400, one or more elastic non-rigid support members may be interposed between the sides of the groove 380 and a laterally displaced portion of the first side 430 and/or second side 440 of the rearward section of the blade 400. Such elastic non-rigid materials may include elastomer thermoplastics such as urethane and rubber, elastic thermoset materials, cork or other materials that have suitable elasticity and resilience to allow for the desired lateral flex while maintaining the ability to reform into their original shape after being repeatedly compressed between the blade 400 and the internal walls that form the groove 380 on the lateral and/or medial side of blade holder 300. Such an alternative ice skate blade holder/blade construction is described and illustrated in commonly owned U.S. Pat. No. 6,467,778 issued on Oct. 22, 2002, the entirety of which is hereby incorporated by reference.

III. Boot

A. General Overview

We now turn to the boot, which in the preferred implementations illustrated in FIGS. 5-24 is called out by reference numeral 100. Commonly shown in those drawings is a boot 100 comprising a unitary support structure 110, an upper portion 500, a foot bed 800 and a heel cushion 850. The upper portion 500 is attached externally and internally to discrete regions of the unitary support structure 110 to provide additional support to the foot, a comfortable fit and a means for securing the boot 100 to the foot 600. The foot bed 800 and heel cushion 850 are placed one on top of the other internally over the upper surface of the bottom of the unitary support structure 110 to provide support and comfort to the bottom of the foot 600.

Generally, the unitary support structure 110 is in the form of a three-dimensional shell comprising a plurality of wall structures configured to define a foot cavity 111 dimensioned to receive the foot 600 of the intended wearer. The plurality of wall structures that form the unitary support structure 110 include a sole 115 and one or more side walls (e.g., 160, 170, and 180) that extend upwardly from the medial and/or lateral sides of the sole 115. Each wall structure is preferably configured to reflect the contour of the outer formation of the foot 600 that it is configured to reside proximate or adjacent thereto thereby facilitating a good fit.

The foot cavity 111 defined by the wall structures of the unitary support structure 110 is preferably configured to take into account the dimensions (e.g., thickness) of any internal components, such as the internal liner 505 of the upper 500, the foot bed 800, and heel cushion 850 (best illustrated in FIGS. 6, 11, 16 and 21). In this regard, it is generally preferably that the unitary support structure 110 define a foot cavity 111 that is not smaller but rather larger, if only slightly, than the foot 600 of the intended wearer when the wall structures forming the unitary support structure 110 are in their unstressed state. It is contemplated, however, that regions of the unitary support structure 110 may be configured such that the internal liner 505 interposed between the foot 600 and the unitary support structure 110 would exert force on the foot 600 of the intended wearer when the walls of the unitary support structure 110 are in their unstressed state. In other words, it is contemplated that the unitary support structure 110 may or may not be configured to have bias toward a position that would result in regions of the internal liner 505 and/or unitary support structure 110 to bear on the foot 600 of the intended wearer.

Each side wall is preferably molded as a unitary component with the region of the sole 115 from which it extends. In addition, it is preferable that the sole 115 be molded as a unitary component. Hence, in the preferred implementation the sole 115 and the side walls (e.g., 160, 170, and 180) are formed as a unitary molded support structure, which serves to define the desired internal and external end shape of the article of footwear. A preferred teaching of the construction of the unitary support structure 110 comprises molding one or more groups or layers of substantially continuous fibers within a hardened resin matrix, wherein the fibers are aligned in one or more defined directions, and preferably in a plurality of defined directions, along the plane of the wall structure which they form. Such a construction, although more rigid than plastic, when employed in the manner taught herein has been found capable of forming a unitary support structure 110 that provides control over end-shape and foot cavity volume while also facilitating, to a greater degree, functional attributes such as fit, flexibility and support that consumers might only otherwise obtain from lasted footwear.

Unitary support structure 110, according to the preferred implementations illustrated in FIGS. 5-24, includes a plurality of opposing walls 160, 170, and 180 which extend from the sole 115 on the medial and lateral sides thereof and which are spaced apart from one another by slots or gaps defined between forward and rearward facing edges (e.g., 165, 175, 176, 177, 185, and 187) of adjacent side walls. The forward and rearward facing edges of the side wall structures, each extend from a terminal end point (e.g., 166, 167, 169, 181, and 182), which defines the lowest or most proximate point relative to the sole 115 along the forward or rearward facing edge of the side wall, above which the side wall is not contiguously joined with side walls extending from the sole 115 anterior or posterior therefrom, as the case may be.

Defined within each slot or gap are longitudinal partitions (e.g., 161, 162, 163, and 164) that extend longitudinally between the forward and rearward facing edges of the side walls at and above the terminal end points. Hence, for a given slot or gap there are multiple longitudinal partitions that extend between the forward and rearward facing edges of the side walls that define the particular slot or gap. For example, in the preferred implementations illustrated in FIGS. 5-19, there are a continuum of longitudinal partitions 161 that extend between the forward facing edge 165 and rearward facing edge 187; some reside nearer the sole 115 while others reside at a vertical location more distant from the sole 115; some extend from the forward facing edge 165 at a location that is closer to the toes, while others extend from the forward facing edge 165 at a location that is closer to the back of the heel; and depending on the width of the slot or gap at any vertical position, some longitudinal partitions might extend a longer distance than others. As a result the longitudinal partitions (e.g., 161) defined by a given slot or gap may differ in longitudinal and vertical location as well as longitudinal length.

The first, second and third preferred implementations of unitary support structure 110, illustrated in FIGS. 5-19, each contain a first set of opposing walls 160, a second set of opposing walls 170, and a third set of opposing walls 180. Opposing walls 160 extend from the rear end region 125 of the sole 115. Opposing walls 170 extend from the front end region 120 of sole 115. And, opposing walls 180 extend from the mid-region 127 of sole 115. The first set of opposing walls 160 is separated from the third set of opposing walls 180 by slots, which are defined by the forward and rearward facing edges 165, 187 of walls 160 and 180, respectively. The second set of opposing walls 170 is separated from the third set of opposing walls 180 by another set of slots, which are defined by the forward and rearward facing edges 185, 175 of walls 180 and 170, respectively. Furthermore, vis-à-vis the first preferred implementation of unitary support structure 110, illustrated in FIGS. 5-9, the anterior portions of walls 170 are also partitioned from the posterior portions of walls 170 by a third set of slots, which are defined by forward and rearward facing edges 177 and 176 of the posterior and anterior portions of walls 170, respectively. The forward facing edges 165, 185, and 177 extend from terminal end points 166, 181, and 169, respectively; while the rearward facing edges 187, 175, and 176 extend from terminal end points 182, 167, and 168, respectively. Extending longitudinally between the forward facing edges 165 and rearward facing edges 187 are longitudinal partitions 161; extending longitudinally between forward facing edges 185 and rearward facing edges 175 are longitudinal partitions 162; and extending longitudinally between forward facing edges 177 and rearward facing edges 176 are longitudinal partitions 163.

By contrast, the fourth preferred implementation of unitary support structure 110, illustrated in FIGS. 20-24, contains a first set of opposing walls 160 and a second set of opposing walls 170. The first set of opposing walls 160 extend from the rear end region 125 of sole 115, while the second set of opposing walls 170 extend from the front end region 120 of sole 115. Accordingly, walls 160 and 170 on the medial and lateral side of the unitary support structure 110 are separated from one another by a gap, which is defined by the forward facing edge 165 of wall 160 and the rearward facing edge 175 of wall 170. In the implementation illustrated in FIGS. 20-24, the gap is generally co-extensive with the mid-region 127 (best illustrated in FIG. 26) on the medial and lateral sides 140, 150 of sole 115. The forward facing edges 165 of walls 160 extend from terminal end points 166, while the rearward facing edges 175 of walls 170 extends from terminal end points 167. Extending longitudinally between the forward facing edges 165 and rearward facing edges 175 of walls 160 and 170, respectively are longitudinal partitions 164.

While in the preferred implementations illustrated in FIGS. 5-24 an equal number of partitioned walls are employed on the medial and lateral sides of the unitary support structure 110, in other implementations asymmetric designs may be employed such that the side walls on the lateral side are not partitioned while the side walls on the medial side are or vice versa. Similarly, an unequal number of side wall partitions may be employed on the medial and lateral sides of the unitary support structure 110. Thus, for example, side walls extending from one side of the sole 115 may be separated by one or more longitudinal partitions while side walls extending from the other side of the sole 115 may be un-partitioned or may include one or more separations (e.g., slots or gaps) that are the same as those on the opposing side or that differ in dimension, contour and/or longitudinal location than those employed on the opposing side. In the preferred implementations illustrated in FIGS. 5-19, longitudinal partitions 162 and 161 are fairly limited and generally uniform in longitudinal breadth or width. In contrast, in the preferred implementation illustrated in FIGS. 20-24, the longitudinal partitions 164 defined between the upright rearward facing edge 175 of wall 170 and upright forward facing edge 165 of wall 160 are relatively expansive in width and non-uniform or varying in width dimension. Generally, the smaller the width of the partition the greater amount of protection and/or support is capable of being provided to the foot 600 by the unitary support structure 110; the greater the width of the partition the greater the independence between the substructures defined and separated thereby. However, the width of the partition should preferably provide sufficient spatial separation to allow for desired relative longitudinal movement between the walls partitioned thereby so as to facilitate the desired flexibility of the unitary support structure 110. Hence, it should be understood that the breadth and configuration of the longitudinal partitions 161, 162, 163, and 164 may be varied. Furthermore, it should be understood that it is also contemplated that changes in the contour of the upright edges that define the longitudinal partitions may facilitate forces being communicated from one region of the foot 600 to be communicated to the sole 115 underlying another region of the foot 600. Moreover, it is to be understood that while the representative implementations illustrated in FIGS. 5-24 include opposing walls, other implementations may not include opposing walls. Hence, it is contemplated that unitary support structure 110 may comprise or consist of a sole 115 and one or more, preferably a plurality of, side wall structures extending from: (a) the rear end region 125 of the sole 115 on the medial side, lateral side or both, such as walls 160, (b) the mid-region 127 of the sole 115 on the medial side, lateral side or both, such as walls 180, and/or (c) the front end region 120 of the sole 115 on the medial side, lateral side or both, such as walls 170. Accordingly, it should be understood that the unitary support structure 110 may comprise or consist of a sole 115 and any of the foregoing side walls, in any combination. For example, it is contemplated that one of walls 180 extending from in between the front end region 120 and the rear end region 125 of the sole 115, on either the medial and/or lateral side 140, 150 thereof, may form with the sole 115 or portion thereof a unitary support structure 110 with or without any one of walls 160, 170 extending from either the medial and/or lateral sides 140, 150 of the sole 115. Similarly, it is contemplated that one of walls 160 extending from the rear end region 125 of the sole 115, on either the medial and/or lateral side 140, 150 thereof, may form with the sole 115 or portion thereof a unitary support structure 110 with or without any one of walls 180, 170 extending from either the medial and/or lateral sides 140, 150 of the sole 115. Moreover, it is contemplated that one of walls 170 extending from the front end region 120 of the sole 115, on either the medial and/or lateral side 140, 150 thereof, may with the sole 115 or portion thereof form a unitary support structure 110 with or without any one of walls 160, 180 extending from either the medial and/or lateral sides 140, 150 of the sole 115.

By partitioning the wall structures of the unitary support structure 110 longitudinally from one another, a greater degree of structural and functional independence between the wall components is facilitated. Wall structures of the unitary support structure 110, that might otherwise not be amenable to flexing, may more readily flex relative to one another. Configuration (e.g., contour, internal and external dimensions, position of terminal end points, etc.) and/or construction (e.g., materials and properties thereof employed to form the wall structure) of the individual wall structures themselves may facilitate, augment or otherwise effectuate the tendency or likelihood of the unitary support structure 110 to flex at defined regions or points between segmented regions of the unitary support structure by transmitting forces to locations proximate to those desired regions or points of flex. Hence, forces from discrete or defined regions of the foot 600 are more capable of being communicated to the desired regions or points along or proximate to the sole 115 thereby facilitating the desired functionality or performance.

Further, the partitioned regions of the unitary support structure 110 may be structurally and functionally fitted to the foot 600 more independently to provide improved fit and performance. Greater design freedom is also facilitated in that variations in construction and configuration within, as well as between, a given partitioned region is capable of being implemented without directly impacting the functionality of another partitioned region. Thus, the movements of the foot 600 within and/or between defined regions such as the heel, toe, and mid regions, 670, 660, 680 of the foot 600 may be better and more independently accommodated to effectuate the desired flexibility, support, and communication of forces.

Furthermore, while the terminal end points define the lowest end of the forward and rearward facing edges of the side walls, it should be understood that longitudinal partitions may actually extend into the sole 115 so as to partition the sole 115 longitudinally. Extending the partitions into the sole 115 may further contribute to the desired flexibility of the unitary support structure 110 about one or more transverse axes extending across the longitudinal partition in the sole 115. This is so because the width of the sole 115 between the medial and lateral sides 140, 150 would, from a configuration standpoint, be effectively reduced, therefore the configuration of the sole 115 would be less resistant to bending along such axes.

Moreover, it is noted that one or more of the side walls 160, 170, and 180 and the sole 115 may include one more internal partitions or slots to further facilitate flexing or bending in a given wall structure. The term "internal" refers to a slot or partition that does not extent to the outer edges of the wall but rather resides completely within the wall structure. It is contemplated for example that one or more side walls 160, 170, and 180 may include one or more internal slots that are configured to reside at locations that coincide with the perimeter of the foot 600 or above or below the perimeter of the foot 600 to facilitate the desired bending or flexibility of the side wall.

B. Preferred Vertical and Longitudinal Locations of Terminal End Points and Longitudinal Partitions The longitudinal partitions (e.g., 161, 162, 163, and 164) and the terminal end points (e.g., 166, 167, 168, 169, 181, and 182) are preferably configured to reside at or within preferred vertical and longitudinal locations. For purposes of this disclosure, a longitudinal partition, such as longitudinal partitions 161, 162, 163, and 164, is considered to reside at a particular longitudinal location if any portion of that longitudinal partition resides at the preferred location position or within the preferred location range or region notwithstanding that portions of that particular longitudinal partition or other longitudinal partitions defined within the same slot or gap fall outside the specified longitudinal location preference. Similarly, any longitudinal partition that resides at or within a preferred vertical position or region is capable of meeting the specified vertical location preference notwithstanding the existence of other longitudinal partitions defined within the same slot or gap falling outside the specified vertical location preference.

In the preferred implementations illustrated herein, the terminal end points and longitudinal partitions are configured to generally reside at or within both the preferred longitudinal and vertical locations. Those preferred longitudinal and vertical locations are defined in detail below in the following sections. However, it should be understood that the preferred vertical and longitudinal locations are independent preferences and are independently applicable to define preferred locations of either the longitudinal partitions or terminal end points. Examples of how vertical and longitudinal preferences may be independently applied include:

Example A: a vertical location preference may be employed to define the vertical location of a terminal end point while another or the same vertical preference may be employed to define the vertical location of a longitudinal partition.

Example B: a longitudinal location preference may be employed to define the longitudinal location of a terminal end point while another or the same longitudinal location preference may be employed to define the longitudinal location of a longitudinal partition.

Example C: a longitudinal location preference may be employed to define the longitudinal location of a terminal end point or longitudinal partition while another or the same longitudinal location preference may be employed to define the longitudinal location of a different terminal end point or different longitudinal partition.

Example D: a vertical location preference may be employed to define the vertical location of a terminal end point or longitudinal partition while another or the same vertical location preference may be employed to define the vertical location of a different terminal end point or different longitudinal partition.

Example E: a longitudinal location preference may be employed to define the longitudinal location of a longitudinal partition and/or terminal end point on the medial side of the unitary support structure while the same or different longitudinal location preference may be employed to define the longitudinal location of a longitudinal partition and/or terminal end on the lateral side.

Example F: a vertical location preference may be employed to define the vertical location of a longitudinal partition and/or terminal end point on the medial side of the unitary support structure while the same or different vertical location preference may be employed to define the vertical location of a longitudinal partition and/or terminal end on the lateral side.

Example G: a vertical location preference may be employed to define the vertical location of a longitudinal partition and/or terminal end point while a preferred longitudinal location preference may be employed to define the longitudinal location of the same longitudinal partition and/or terminal end point.

The foregoing examples are not comprehensive. Rather they are meant to be exemplary of the manner by which the preferred longitudinal and vertical location preferences may be independently applied. Accordingly, it should be understood that any terminal end point, whether on the medial or lateral side of the unitary support structure 110, may be located both vertically and longitudinally in different locations than any other terminal end point located on the same or opposite side of the unitary support structure 110. Similarly, it should be understood that any longitudinal partition, whether on the medial or lateral side of the unitary support structure 110, may be located both vertically and longitudinally in different locations than any other longitudinal partition on the same or opposing side of the unitary support structure 110.

For example, to the extent that there is a terminal end point 166 on both the medial and lateral side of the unitary support structure, the terminal end point 166 on the medial side 140 need not be, but may be, positioned in the same longitudinal position as the terminal end point 166 on the lateral side 150. Hence, it is contemplated that the terminal end point 166 on the medial side 140 may be positioned longitudinally rearward of the terminal end point 166 on the lateral side 150, or vice versa. Similarly, to the extent there are longitudinal partitions 161 on both the medial and lateral sides of the unitary support structure, it is to be understood that a longitudinal partition 161 (or portions thereof) on the medial side 140 need not be, but may be, positioned longitudinally rearward of a longitudinal partition 161 on the lateral side 150 or vice versa.

By offsetting the positions of the terminal end points and/or longitudinal partitions either vertically, longitudinally or both vertically and longitudinally, a more ergonomically correct bending of the foot 600 may be facilitated. In addition, offsetting the terminal end points and/or longitudinal partitions may be desirable to effectuate the desired performance attributes by imparting an axis of relatively greater flexibility in the unitary support structure 110 at the desired region or orientation.

Thus, for example by positioning longitudinal partitions 161 and/or terminal end points 166 on the medial side in a different longitudinal position than longitudinal partitions 161 and/or terminal end point 166 on the lateral side of the unitary support structure 110 an axis of relatively greater flexibility may be imparted in the unitary support structure 110 that is not normal to the longitudinal length of the sole 115, but rather is obliquely angled thereto. Offsetting the terminal end points 166 and/or longitudinal partitions 161 in this manner may facilitate a more ergonomically correct or preferred bending of the foot 600 between the heel region 670 and the arch of the foot 650.

It is to be understood that the foregoing examples are not comprehensive but only representative of the how offsetting the terminal end points and/or longitudinal partitions on opposing sides may effectuate the desired performance. Thus it should be understood that it is contemplated that terminal end points 167, 168, 169, 181 and 182 on one side of the unitary support structure 110, to the extent that there are such terminal end points, may be offset both vertically and longitudinally from terminal end points 167, 168, 169, 181 and 182 on the opposing side of the unitary support structure 110. Similarly, it should be understood that it is contemplated that a longitudinal partition 162, 163, and 164 on one side of the unitary support structure 110, to the extent that there are such longitudinal partitions, may be offset both vertically and longitudinally from longitudinal partition 162, 163, and 164 on the opposing side of the unitary support structure 110.

The vertical and longitudinal location preferences are described in the following sections of this disclosure.

C. Vertical Location Preferences

It is generally preferable that the terminal end points and longitudinal partitions be configured on the unitary support 110 to reside below the ankle. It is even more preferable that the terminal end points and longitudinal partitions be configured on the unitary support structure 110 to reside at or below the top surface 690 of the foot 600 residing at the longitudinal center axis 687 of the foot 600 most proximate thereto. It is even more preferable that terminal end points and longitudinal partitions be configured on the unitary support structure 110 to reside at or below the point along the perimeter of the foot 600 most proximate thereto. It is even more preferable that the terminal end points and longitudinal partitions be configured on the unitary support structure 110 to reside at or below the vertical extent of the arch of the foot 650. It is even more preferable that terminal end points and longitudinal partitions be configured on the unitary support structure 110 to reside at or below the perimeter of the foot 600 at the ball of the foot 640 and/or the perimeter of the foot 600 at the lateral extent of the foot 645. Most preferably, the terminal end points 166 and longitudinal partitions should be configured to reside at or slightly above the top surface 130 of the sole 115 located most proximate thereto (e.g., 0.33 inches above the top surface 130 of the sole 115 located most proximate thereto) so as to facilitate maximum vertical separation between the side wall structures. It should be understood, however, that increasing the vertical distance of a terminal end point above the sole 115 would from a configuration standpoint decrease the flexibility of the unitary support structure 110 because the side walls residing there below would tend to structurally stiffen the unitary support structure 110.

D. Longitudinal Location Preferences

1. Preferred Longitudinal Positions

Longitudinally, the terminal end points and longitudinal partitions (or portions thereof) preferably reside on the unitary support structure 110 at locations that are configured to generally correspond or coincide longitudinally to defined positions on the foot 600. In addition, when the unitary support structure 110 is employed in an ice skate 10, such as that depicted in the drawings, the terminal end points and longitudinal partitions (or portions thereof) preferably reside on the unitary support structure 110 at locations that are configured to generally correspond or coincide longitudinally to defined positions on the blade holder 300 and/or blade 400.

Vis-à-vis the foot 600, the preferred longitudinal positions of the terminal end points and longitudinal partitions include: (a) the anterior end 651 of the heel region 670 of the foot 600, which corresponds to the posterior end of the arch of the foot 650, (b) the ball of the foot 640, and (c) the lateral extent of the foot 645. Vis-à-vis the blade holder 300, the preferred longitudinal positions of the terminal end points and longitudinal partitions include: (a) the anterior end of the rear support pedestal formed by back member 340 of the blade holder 300 and (b) the posterior end of the front support pedestal formed by front member 320 of the blade holder 300. And vis-à-vis the blade 400, the preferred longitudinal positions of the terminal end points and longitudinal partitions include points on the blade 400 that define an intersection between a portion of the blade 400 that is configured to be laterally unsupported by the blade holder 300 (whether laterally unsupported on the first or second sides 430, 440 of the blade 400, or both) and a portion of the blade 400 that is configured to be laterally supported by the blade holder 300. In the preferred implementations illustrated in FIGS. 5-24, such intersection points between laterally supported and unsupported regions of the blade 400 are identified by reference numerals 495 and 497 in FIGS. 5, 7, 10, 12, 15, 17, 20, and 22.

It should be understood that each of the foregoing preferred longitudinal positions constitutes an independent preference as previously discussed. The preferred longitudinal positions in relation to the particular terminal end points and longitudinal partitions illustrated in the representative implementations of FIGS. 5-24 are discussed in the following subsections.

a. Preferred Longitudinal Positions of Terminal End Points 166 and 182.

With respect to terminal end points 166 and 182 it is preferable that those terminal end points be located on the unitary support structure 110 at a longitudinal position that is configured to generally coincide with the anterior end 651 of the heel region 670. When the unitary support structure 110 is employed in an ice skate 10, such as that depicted in the drawings, it is also preferable for terminal end points 166 and 182 to be located on the unitary support structure 110 at a longitudinal position that is configured to generally coincide with the anterior end of the rear support pedestal formed by back member 340 and/or the intersection 495 between the laterally supported and unsupported region of the blade 400 in the rearward section of blade 400.

As to each of the three defined preferred longitudinal positions, it is further preferable that terminal end points 166 reside at or posterior to those preferred longitudinal positions and that terminal end point 182 reside at or anterior to those preferred longitudinal positions. Furthermore, when the unitary support structure 110 is employed as an ice skate 10, it should be understood that it is most preferable that terminal end points 166 and 182 reside at a position that correspond to each of the three preferred longitudinal positions in the manner described above. For example, in the preferred implementations of the ice skate 10, illustrated in FIGS. 5-24, the terminal end point 166 and longitudinal partitions 161 are positioned along the unitary support structure 110 so that they generally reside longitudinally above the anterior end of the back member 340 of the blade holder 300 as well as intersection 495 between the laterally supported and unsupported region of the blade 400 in the rearward section of blade 400. In this manner, the substructure of the unitary support structure, defined by opposing walls 160 and sole 115 extending therebetween, coincides in longitudinal position with the corresponding substructures of the blade holder 300 and blade 400. In the preferred implementations illustrated in FIGS. 5-24, the substructures of the blade holder 300 include (1) the front member 320, (2) center section 310 and (3) back member 340; where as the substructures of the blade 400 include (1) the laterally supported forward section 480, (2) the laterally unsupported section, and (3) the laterally supported portion of the rearward section 490.

However, it is contemplated that in some hockey skate implementations one or more of the foregoing preferred longitudinal positions may not coincide or for that matter exist. The manner and degree in which the blade holder 300 and blade 400 flex may as a result be impacted. In such alternative hockey skate implementations, it may be preferable for terminal end points 166 and 182 to be located on the unitary support structure 110 at a longitudinal position that is configured to generally coincide with any one of the three above-defined preferred longitudinal positions. It is even more preferable for terminal end points 166 and 182 to be located on the unitary support structure 110 at a longitudinal position that is configured to generally coincide with two of the three above-defined preferred longitudinal positions if possible. In addition it is contemplated that it may also be preferable for terminal end points 166 and 182 to be located on the unitary support structure 110 at a longitudinal position that is configured to reside between two of the three above-defined preferred longitudinal positions.

b. Preferred Longitudinal Positions of Terminal End Points 167 and 181.

With respect to terminal end points 167 and 181 it is preferable that those terminal end points be located on the unitary support structure 110 at a longitudinal position that is configured to generally coincide with either the ball of the foot 640 and/or the lateral extent of the foot 645. When the unitary support structure 110 is employed in an ice skate 10, such as that depicted in the drawings, it is also preferable for terminal end points 167 and 181 to be located on the unitary support structure 110 at a longitudinal position that is configured to generally coincide with the posterior end of the front support pedestal formed by front member 320 and/or the intersection 497 between the laterally supported and unsupported regions of the blade 400.

As to each of the three defined preferred longitudinal positions, it is further preferable that terminal end points 167 reside at or anterior to those preferred longitudinal positions and that terminal end points 181 reside at or posterior to those preferred longitudinal positions. Furthermore, it should be understood that it is most preferable that terminal end points 181 and 167 reside at a position that coincides with each of the four above-identified preferred longitudinal positions in the manner described above. In this manner, the substructure of the unitary support structure, defined by opposing walls 170 and sole 115 extending therebetween, coincides in longitudinal position with the corresponding substructures of the blade holder 300 (e.g., the substructure formed by the front member 320) and blade 400 (e.g., the substructure defined by the laterally supported forward region of the blade 400).

However, it is contemplated that in some implementations one or more of the foregoing preferred longitudinal positions may not coincide or for that matter exist. In such alternative implementations, it is preferable for terminal end points 167 and 181 to be located on the unitary support structure 110 at a longitudinal position that is configured to generally coincide with any one of the four above-identified longitudinal positions (i.e., the ball of the foot 640, the lateral extent of the foot 645, the posterior end of the front pedestal formed by front member 320 of the blade holder 300, and an intersection between a laterally supported and laterally unsupported region of the blade 400). It is even more preferable for terminal end points 167 and 181 to be located on the unitary support structure 110 at a longitudinal position that is configured to generally coincide with two of the four above-identified longitudinal positions if possible. It is even more preferable for terminal end points 167 and 181 to be located on the unitary support structure 110 at a longitudinal position that is configured to generally coincide with three of the four above-identified longitudinal positions if possible. In addition, it is contemplated that it may also be preferable for terminal end points 167 and 181 to be located on the unitary support structure 110 at a longitudinal position that is configured to reside between two of the four above-identified preferred longitudinal positions.

c. Preferred Longitudinal Positions of Terminal End Points 168 and 169.

In the representative implementation illustrated in FIGS. 5-9 each of walls 170 is formed on the medial and lateral side 140, 150 as two discrete wall components, an anterior wall portion and a posterior wall portion, which are longitudinally spaced apart by a third slot that is defined between the forward facing edge 177 of the posterior wall portion and the rearward facing edge 176 of the anterior wall portion. Forward facing edge 177 extends upward from terminal end point 169, while rearward facing edge 176 extends upward from terminal end point 168.

In this implementation of the unitary support structure 110, it is generally preferable that terminal end points 168 and 169 be located on the unitary support structure 110 at a longitudinal position that is configured to generally coincide to a location anterior to the ball of the foot 640 and/or lateral extent of the foot 645. It is presently contemplated that such preferred longitudinal positions, include locating terminal end points 168 and 169 on the unitary support structure 110 at a longitudinal position that is configured to generally coincide with: (a) a position on the foot 600 that is anterior of the posterior head of the first phalange bone of the foot 600, (b) a position on the foot 600 that is approximately midway between the anterior end 694 of the foot 600 and the ball of the foot 640, and/or (c) a position on the foot 600 that is at or posterior to the posterior end of the first distal phalange bone (i.e., at or behind the most posterior joint of the big toe) of the foot 600.

d. Preferred Longitudinal Positions of Longitudinal Partition 161.

The representative implementations illustrated in FIGS. 5-19 include longitudinal partitions 161, which extend longitudinally between forward facing edge 165 of each of side walls 160 and rearward facing edge 187 of each of side walls 180. It is preferable that a portion of one or more of the longitudinal partitions 161 be located on the unitary support structure 110 at a longitudinal position that is configured to generally coincide with the anterior end 651 of the heel region 670.

When the unitary support structure 110 is employed in an ice skate 10, such as that depicted in the drawings, it is also preferable that a portion of one or more of longitudinal partitions 161 be located on the unitary support structure 110 at a longitudinal position that is configured to generally coincide with the anterior end of the rear support pedestal formed by back member 340 and/or the intersection 495 between the laterally supported and unsupported region of the blade 400 in the rearward section of blade 400.

In the case where one or more of the three above-defined preferred longitudinal positions do not coincide or otherwise do not exist, it is preferable that a portion of at least one or more longitudinal partitions 161 be located on the unitary support structure 110 at a longitudinal position that is configured to generally coincide with any of the three above-defined preferred longitudinal positions. It is more preferable that a portion of at least one or more longitudinal partitions 161 be located on the unitary support structure 110 at a longitudinal position that is configured to generally coincide with two of the three above-defined preferred longitudinal positions. It is even more preferable that a portion of at least one or more longitudinal partitions 161 be located on the unitary support structure 110 at a longitudinal position that is configured to generally coincide with each of the three above-defined preferred longitudinal positions. Furthermore, it should be understood that is generally more preferable for fewer longitudinal partitions 161 to satisfy the forgoing preferences. Hence, for example, it is more preferable for a single longitudinal partition 161 to satisfy those preferences than for multiple longitudinal partitions 161 to satisfy those preferences.

e. Preferred Longitudinal Positions of Longitudinal Partition 162.

The representative implementations illustrated in FIGS. 5-19 include longitudinal partitions 162, which extend longitudinally between forward facing edge 185 of each of side walls 180 and rearward facing edge 175 of each of side walls 170. It is preferable that a portion of one or more of the longitudinal partitions 162 be located on the unitary support structure 110 at a longitudinal position that is configured to generally coincide with either the ball of the foot 640 and/or the lateral extent of the foot 645.

When the unitary support structure 110 is employed in an ice skate 10, such as that depicted in the drawings, it is also preferable that a portion of one or more of longitudinal partitions 162 be located on the unitary support structure 110 at a longitudinal position that is configured to generally coincide with the posterior end of the front support pedestal formed by front member 320 and/or the intersection 497 between the laterally supported and unsupported region of the blade 400.

In the case where one or more of the four above-defined preferred longitudinal positions do not coincide, it is preferable that a portion of at least one or more longitudinal partitions 162 be located on the unitary support structure 110 at a longitudinal position that is configured to generally coincide with any of the four above-defined preferred longitudinal positions (i.e., the ball of the foot 640, the lateral extent of the foot 645, the posterior end of the front pedestal formed by front member 320 of the blade holder 300, and an intersection between a laterally supported and laterally unsupported region of the blade 400). It is more preferable that a portion of at least one or more longitudinal partitions 162 be located on the unitary support structure 110 at a longitudinal position that is configured to generally coincide with two of the four above-defined preferred longitudinal positions. It is even more preferable that a portion of at least one or more longitudinal partitions 162 be located on the unitary support structure 110 at a longitudinal position that is configured to generally coincide with three of the four above-defined preferred longitudinal positions. It is even more preferable that a portion of at least one or more longitudinal partitions 162 be located on the unitary support structure 110 at a longitudinal position that is configured to generally coincide with each of the four above-defined preferred longitudinal positions. Furthermore, it should be understood that it is generally more preferable for a fewer number of longitudinal partitions 162 to satisfy the foregoing preferences. Hence, for example, its is more preferable for a single longitudinal partition 162 to satisfy those preferences than for multiple longitudinal partitions 162 to satisfy those preferences.

f. Preferred Longitudinal Position of Longitudinal Partition 164.

With respect to the longitudinal partitions 164 previously described in relation to the fourth representative implementations illustrated in FIGS. 20-24, it is preferable that a portion of one or more of the longitudinal partitions 164 be located on the unitary support structure 110 at a longitudinal position that is configured to generally coincide with each of the above-identified preferred longitudinal positions of longitudinal partitions 161 and 162. Hence, it is preferable that a portion of one or more of the longitudinal partitions 164 be located on the unitary support structure 110 at a longitudinal position that is configured to generally coincide with (a) the ball of the foot 640, (b) the lateral extent of the foot 645, and (c) the anterior end 651 of the heel region 670.

When the unitary support structure 110 is employed in an ice skate 10, such as that depicted in the drawings, it is also preferable that a portion of one or more of the longitudinal partitions 164 be located on the unitary support structure 110 at a longitudinal position that is configured to generally coincide with (a) the anterior end of the back support pedestal formed by back member 340, (b) the posterior end of the front support pedestal formed by front member 320, (c) the intersection 495 between the laterally supported and unsupported region of the blade 400 at the rearward section of the blade 400, and (d) the intersection 497 between the laterally supported and unsupported region of the blade 400.

Generally, it is preferable that a portion of at least one or more longitudinal partitions 164 be located on the unitary support structure 110 at a longitudinal position that is configured to generally coincide with any of the seven above-defined preferred longitudinal positions (i.e., the ball of the foot 640, the lateral extent of the foot 645, the anterior end 651 of the heel region, the posterior end of the front pedestal formed by front member 320 of the blade holder 300, the anterior end of the back pedestal formed by back member 340 of the blade holder 300, an intersection 495 between a laterally supported and unsupported rearward region of the blade 400, and an intersection 497 between a laterally supported and unsupported region of the blade 400). It is more preferable that a portion of at least one or more longitudinal partitions 164 be located on the unitary support structure 110 at a longitudinal position that is configured to generally coincide with two of the seven above-defined preferred longitudinal positions. It is even more preferable that a portion of at least one or more longitudinal partitions 164 be located on the unitary support structure 110 at a longitudinal position that is configured to generally coincide with three of the seven above-defined preferred longitudinal positions. It is even more preferable that a portion of at least one or more longitudinal partitions 164 be located on the unitary support structure 110 at a longitudinal position that is configured to generally coincide with four of the seven above-defined preferred longitudinal positions. It is even more preferable that a portion of at least one or more longitudinal partitions 164 be located on the unitary support structure 110 at a longitudinal position that is configured to generally coincide with five of the seven above-defined preferred longitudinal positions. It is even more preferable that a portion of at least one or more longitudinal partitions 164 be located on the unitary support structure 110 at a longitudinal position that is configured to generally coincide with six of the seven above-defined preferred longitudinal positions. It is even more preferable that a portion of at least one or more longitudinal partitions 164 be located on the unitary support structure 110 at a longitudinal position that is configured to generally coincide with each of the seven above-defined preferred longitudinal positions. Furthermore, it should be understood that it is generally more preferable for a fewer number of longitudinal partitions 164 to satisfy the foregoing preferences. Hence, for example, its is more preferable for a single longitudinal partition 164 to satisfy those preferences than for multiple longitudinal partitions 164 to satisfy those preferences.

g. Preferred Longitudinal Position of Longitudinal Partition 163.

With respect to the longitudinal partitions 163 previously described in relation to the first representative implementations illustrated in FIGS. 5-9; it is generally preferable that a portion of one or more of the longitudinal partitions 163 be located on the unitary support structure 110 at a longitudinal position that is configured to generally coincide with a position on the foot 600 that is anterior to the ball of the foot 640 and/or lateral extent of the foot 645. It is presently contemplated that such preferred longitudinal positions, include locating a portion of one or more of the longitudinal partitions 163 on the unitary support structure 110 at a longitudinal position that is configured to generally coincide with: (a) a position on the foot 600 that is anterior of the posterior head of the first phalange bone of the foot 600, (b) a position on the foot 600 that is approximately midway between the anterior end 694 of the foot 600 and the ball of the foot 640, and/or (c) a position on the foot 600 that is at or posterior to the posterior end of the first distal phalange bone (i.e., at or behind the most posterior joint of the big toe) of the foot 600.

2. Preferred Longitudinal Ranges

In addition, the terminal end points and/or longitudinal partitions may be preferably positioned to reside longitudinally along unitary support structure 110 within preferred ranges of the above-defined preferred longitudinal positions of the foot 600 using one of the preferred longitudinal range location formulas (1) through (3) set forth below:

$$PLR = +/- \tfrac{1}{2}\{0.6 \times (L\text{-}HB)\} \quad (1)$$

$$MPLR = +/- \tfrac{1}{4}\{0.6 \times L\text{-}HB)\} \quad (2)$$

$$EMPLR = +/- \tfrac{1}{8}\{0.6 \times L\text{-}HB)\} \quad (3)$$

Where:
PLR: Stands for Preferred Longitudinal Range. It represents the preferred range of the longitudinal position of the terminal end points and/or longitudinal partitions relative to the three above-defined preferred longitudinal positions of the foot 600. Thus, the range defined by the PLR is centered relative to a position on the unitary support structure 110 that is configured to coincide longitudinally with any one of the following three preferred longitudinal positions: (a) the anterior end 651 of the heel region 670, (b) the ball of the foot 640, and (c) the lateral extent of the foot 645.
MPLR: Stands for More Preferred Longitudinal Range. It represents a more preferred range of the PLR.
EMPLR: Stands for Even More Preferred Longitudinal Range. It represents an even more preferred range of the PLR.
L-HB: Stands for the longitudinal Length between the back of the Heel and the Ball of the foot 640. Vis-à-vis the foot 600, L-HB is the longitudinal distance between the posterior end 695 of the heel region 670 and the ball of the foot 640. L-HB is identified in relation to the foot 600 by reference numeral 688 in FIG. 4. Hence, vis-à-vis the sole 115 of the article of footwear, L-HB is the longitudinal distance between the most posterior end of the rear end region 125 of the sole 115 that is configured to underlie the heel region 670 of the foot 600 and the longitudinal position of the sole 115 that is configured to coincide with the ball of the foot 640. Thus, L-HB may be measured vis-à-vis an article of footwear by measuring the distance from the most rearward end of the bottom of the internal foot cavity defined by the article of footwear to the widest part of the bottom of the footwear cavity on the medial side that is configured to reside at the ball of the foot 640. L-HB is identified in relation to the sole 115 in FIG. 26.

The foregoing formulas (1) through (3) are based on the inventors determination that the heel region 670 typically defines approximately forty (40) percent of the longitudinal length between the posterior end 695 of the heel region 670 and the ball of the foot 640. Example calculations of the above formulas are set forth in the following table:

| L-HB | PLR | MPLR | EMPLR |
|---|---|---|---|
| 4 inches | +/−1.2 inches | +/−0.6 inches | +/−0.3 inches |
| 6 inches | +/−1.8 inches | +/−0.9 inches | +/−0.45 inches |
| 8 inches | +/−2.4 inches | +/−1.2 inches | +/−0.6 inches |
| 10 inches | +/−3.0 inches | +/−1.5 inches | +/−0.75 inches |

It should be understood that each of the foregoing preferred longitudinal ranges constitutes an independent range preference as previously discussed. Hence, it should be understood that the preferred location range formulas may define the preferred location of a particular longitudinal partition on one side, while another or the same longitudinal location formula may define the preferred location of a terminal end point or different longitudinal partition on the same or other side of the unitary support structure 110. The preferred longitudinal ranges in relation to the particular terminal end points and longitudinal partitions illustrated in the representative implementations of FIGS. 5-24 are discussed in more detail in the following subsections.

a. Preferred Longitudinal Range Location of Terminal End Points 166 and 182 and Longitudinal Partitions 161.

With respect to terminal end points 166 and 182 it is preferable that those terminal end points be located on the unitary support structure 110 at a longitudinal position configured to coincide within the PLR, MPLR, and EMPLR ranges vis-à-vis the anterior end 651 of the heel region 670. Similarly, it is preferable that a portion of one or more of the longitudinal partitions 161 be located on the unitary support structure 110 at a longitudinal position that is configured to coincide with the PLR, MPLR, and EMPLR ranges vis-à-vis the anterior end 651 of the heel region 670. An example of how formulas (1) through (3) may be applied to define the preferred location of terminal end points 166 and/or 182 and longitudinal partition 161, whether they reside on the lateral side, medial side, or both sides of the unitary support structure 110 relative to the anterior end 651 of the heel region 670 is set forth below in Example Application No. 1.

Example Application No. 1 of Formulas (1) through (3)

Suppose that L-HB measures eight (8) inches then the PLR, MPLR, and EMPLR according to formulas (1) through (3), as previously set forth, are:

| L-HB | PLR | MPLR | EMPLR |
|---|---|---|---|
| 8 inches | +/−2.4 inches | +/−1.2 inches | +/−0.6 inches |

Vis-à-vis terminal end points 166 and 182 and longitudinal partitions 161, each of those preferred longitudinal location ranges is centered at the anterior end 651 of the heel region 670. Accordingly, taking the longitudinal length of heel region 670 as constituting 40% of the L-HB then the anterior end 651 of the heel region 670 would be located 3.2 inches (40% of 8 inches) anterior from the back of the heel region 670. The preferred longitudinal location of terminal end point 166 and 182 and longitudinal partitions 161 would thus be:

| Anterior End of<br>Heel +/− PLR | Anterior End of<br>Heel +/− MPLR | Anterior End of<br>Heel +/− EMPLR |
|---|---|---|
| 3.2 inches +/− 2.4 inches | 3.2 inches +/− 1.2 inches | 3.2 inches +/− 0.6 inches |

In order to further illustrate the foregoing exemplary calculation, reference is made to FIG. 26, which is an illustration of the top plan view of the top surface 130 of the sole 115 of the unitary support structure 110 depicted in FIGS. 5-24. About the internal perimeter of the sole 115 is a reference rectangle 689 that is defined by a medial side 682, lateral side 683, anterior side 685, and posterior side 686, which together form a rectangular perimeter about the perimeter of the top surface 130 of the sole 115. As previously noted, the reference rectangle 689 is dimensioned so that the area defined by its perimeter is sufficient to surround the top plan view of the sole 115 without defining an area that is greater than necessary to do so. A longitudinal center axis 687' of the sole 115 partitions, in equal lengths, the anterior and posterior sides 685, 686 of the reference rectangle 689. The shaded portions indicate the area of the top surface 130 of the sole 115 that in a preferred implementation is vaulted to have conformity with the arch of the foot 650. The portion of the sole 115 that is configured to coincide with the longitudinal arch of the foot 650 is identified by reference numeral 650'. The portion of the sole 115 that is configured to coincide with the ball of the foot 640 is identified by reference numeral 640'. The portion of the sole 115 that is configured to coincide with the lateral extent of the foot 645 is identified by reference numeral 645'. Notably, the sole 115 in FIG. 26 is depicted such that the areas configured to coincide with the medial and lateral extents of the foot 640', 645' reside along a common horizontal axis line 1110. Similarly, the area of the sole 115 that is configured to coincide with the anterior end of the heel region 670 on the medial and lateral sides of the sole 115 and the area of the sole 115 that is configured to coincide with the posterior end of the arch of the foot 650' on the medial side reside along a common horizontal axis line 1100. Thus, horizontal axis lines 1100 and 1110 generally represent partitions between areas of the sole 115 that are configured to underlie the heel region 670, the toe region 660 and the mid-region 680 of the foot 600. Consequently, horizontal axis line 1100 also serves as the longitudinal center of the ranges PLR, MPLR, and EMPLR on the medial and lateral sides 140, 150 of the sole 115 vis-à-vis the anterior end 651 of the heel region 670. While horizontal axis line 1110 serves as the longitudinal center of the ranges PLR, MPLR, and EMPLR on the medial and lateral sides 140, 150 of the sole 115 vis-à-vis the ball of the foot 640 and the lateral extent of the foot 645. The application of PLR, MPLR and EMPLR vis-à-vis the ball of the foot 640 and the lateral extent of the foot 645 are discussed in more detail in relation to terminal end points 167, 181 and longitudinal partition 162 in the subsequent subsection.

As previously noted, the PLR, MPLR, and EMPLR define preferred location ranges of the longitudinal position of the terminal end points independently of the longitudinal position of the longitudinal partitions. Thus, in the foregoing example (i.e., L-HB=8 inches), suppose, for example, that the terminal end point 166 on the lateral side is located 2.5 inches rearward from the position on the unitary support structure 110 that is configured to coincide with the anterior end of the heel region 670. Because 2.5 inches is a distance greater than the 2.4 inches, the preferred location range defined by PLR, that terminal end point 166 would fall outside the preferred range location defined by PLR. However, further suppose that a longitudinal partition 161 (or a portion thereof) between forward facing edge 165 and rearward facing edge 187 is located 2 inches anterior or forward of the longitudinal position of the terminal end point 166—because, for example: (a) the longitudinal partition 161 extends forward longitudinally a sufficient distance from forward facing edge 165 so that at least a portion of the longitudinal partition is located 2 inches forward of the longitudinal position of the terminal end point 166 or (b) the contour of forward facing edge 165 extends forward longitudinally, relative to terminal point 166, so as to position a portion of the longitudinal partition extending forward therefrom a distance of 2 inches forward relative to terminal end point 166. In either scenario, the longitudinal partition 161 would fall within the preferred range defined by PLR because a portion of the longitudinal partition 161 is located 0.5 inches (i.e., 2 inches forward from the longitudinal position of the terminal end point) from the anterior end of the heel region 670 and therefore falls within the +/−2.4 inches defined by PLR. Had no portion of longitudinal partition 161 extended forward of terminal end point 166 (either in breadth and/or by virtue of the contour of the forward facing edge of wall 165) beyond 0.1 inches; then the longitudinal partition 161 would also have fallen outside the preferred location range defined by PLR. Hence, it is to be understood that longitudinal partition 161 is considered to be located within a preferred location range if any portion of the longitudinal partition extends into the specified preferred location range.

When the unitary support structure 110 is employed in an ice skate 10, such as that depicted in the drawings, it is also preferable for: (a) the anterior end of the back member 340 of the blade holder 300 and/or (b) the intersection 495 between the laterally supported and unsupported region of the blade 400 in the rearward section of blade 400 to fall within the specified preferred location range (e.g., PLR, MPLR, EMPLR). Hence, with respect to the foregoing example (i.e., L-HB=8 inches) it is preferable that each of those positions on the blade holder 300 and blade 400 fall within 2.4 inches of the anterior end 651 of the heel region 670. It is more preferable that each of those positions on the blade holder 300 and blade 400 fall within 1.2 inches of the anterior end 651 of the heel region 670. It is even more preferable that each of those positions on the blade holder 300 and blade 400 fall within 0.6 inches of the anterior end 651 of the heel region 670.

b. Preferred Longitudinal Range Location of Terminal End Points 167 and 181 and Longitudinal Partitions 162.

With respect to terminal end points 167 and 181 it is preferable that those terminal end points be located on the unitary support structure 110 at a longitudinal position configured to coincide within the PLR, MPLR, and EMPLR ranges vis-à-vis (a) the ball of the foot 640 and/or (b) the lateral extent of the foot 645. Similarly, it is preferable that a portion of one or more of the longitudinal partitions 162 be located on the unitary support structure 110 at a longitudinal position that is configured to coincide with the PLR, MPLR, and EMPLR ranges vis-à-vis (a) the ball of the foot 640 and/or (b) the lateral extent of the foot 645. An example of how formulas (1) through (3) would be applied to define the preferred location of the terminal end points 167, 181 and longitudinal partition 162, whether on the lateral, side medial side, or both sides of the unitary support structure 110 relative to the ball of the foot 640 is set forth below in Example Application No. 2. It should be understood that, when the lateral extent 645 and the ball 640 of the foot 600 reside longitudinally in different locations, the following example is equally applicable to defining the preferred location ranges relative to the lateral extent of the foot 645. It is noted, however, that in the representative implementations illustrated in the drawings, the lateral extent of the foot 645 and ball of the foot 640 are depicted as residing generally along a common horizontal axis 1110 as previously noted and illustrated in FIGS. 4 and 26.

Example Application No. 2 of Formulas (1) through (3)

Suppose again that L-HB measures eight (8) inches. The PLR, MPLR, and EMPLR, according to formulas (1) through (3), would thus be the same as previously set forth in Example Application No. 1. The preferred longitudinal location of terminal end points 167 and 181 and longitudinal partitions 162 vis-à-vis the ball of the foot 640 would thus be:

| Ball of the Foot +/− PLR | Ball of the Foot +/− MPLR | Ball of the Foot +/− EMPLR |
|---|---|---|
| 8 inches +/− 2.4 inches | 8 inches +/− 1.2 inches | 8 inches +/− 0.6 inches |

With reference to FIG. 26 the longitudinal center of the ranges PLR, MPLR, and EMPLR on the medial and lateral sides 140, 150 of the sole 115 would be centered on horizontal axis line 1110, which as previously described corresponds with the ball of the foot 640 and the lateral extent of the foot 645. Accordingly, by way of example, if terminal end point 167 or 181 is located on the unitary support structure 110 between 5.6 inches and 10.4 inches from the rearward end of the top surface 130 of the sole 115 then that terminal end point falls within the PLR vis-à-vis the ball of the foot 640; similarly if a longitudinal partition 162 or portion thereof is located between 5.6 inches and 10.4 inches from the back end of the sole 115 then that longitudinal partition 162 falls within the PLR vis-à-vis the ball of the foot 640. FIG. 26 graphically illustrates the locations of PLR, MPLR, and EMPLR vis-à-vis the portion of the sole 115 configured to reside at the ball of the foot 640' and the lateral extent of the foot 645'.

When the unitary support structure 110 is employed in an ice skate 10, such as that depicted in the drawings, it is also preferable for: (a) the posterior end of the front member 320 of the blade holder 300 and/or (b) the intersection 497 between the laterally supported and unsupported region of the blade to fall within the specified preferred location range (e.g., PLR, MPLR, EMPLR). Hence, with respect to the foregoing example (i.e., L-HB=8 inches) it is preferable that each of those positions on the blade holder 300 and blade 400 fall within 2.4 inches of the ball of the foot 640. It is more preferable that each of those positions on the blade holder 300 and blade 400 fall within 1.2 inches of the ball of the foot 640. It is even more preferable that each of those positions on the blade holder 300 and blade 400 fall within 0.6 inches of the ball of the foot 640.

c. Preferred Longitudinal Range Location of Longitudinal Partitions 164.

With respect to longitudinal partitions 164, it is preferable that a portion of longitudinal partition fall within the specified preferred location range vis-à-vis the anterior end 651 of the heel region 670. It is also preferable that a portion of longitudinal partition 164 fall within the specified preferred location range vis-à-vis (a) the ball of the foot 640 and/or (b) the lateral extent of the foot 645.

Formulas (1) through (3) may be applied to define the preferred location of longitudinal partition 164, whether on the lateral side, medial side, or both sides of the unitary support structure 110 relative to the (a) ball of the foot 640 and/or lateral extent of the foot 645 in the same manner as that described above with respect to longitudinal partition 162. Similarly, formulas (1) through (3) may be applied to define the preferred location of longitudinal partition 164, whether on the lateral side, medial side, or both sides of the unitary support structure 110 relative to the anterior end 651 of the heel region 670 in the same manner as that described above with respect to longitudinal partition 161.

Various additional aspects, such as configuration, construction, and functional and physical properties, of the component elements of the boot 100 including the sole 115 and side walls 160, 170, and 180 of the unitary support structure 110 are further described in greater detail below with reference to the drawings.

E. The Sole

The sole 115, in the preferred implementations illustrated in FIGS. 5-24 (also illustrated in FIG. 26), extends longitudinally from a first or front end region 120 to a second or rear end region 125, with a mid-region 127 of the sole 115 being disposed therebetween. The sole 115 forms a generally "planar" wall structure that defines an upper or top surface 130, a generally opposing lower or bottom surface 135, a medial side 140, and a lateral side 150. In the preferred implementations illustrated in FIGS. 5-24, the front end region 120 of the sole 115 is configured to underlie the toe region 660 of the foot 600, the rear end region 125 is configured to underlie the heel region 670 of the foot 600, and the mid-region 127 of the sole 115 is configured to underlie the mid-region 680 of the foot 600.

The sole 115 may be formed to include variations in stiffness or flexibility relative to one or more of the other areas of sole 115 or side walls that extend therefrom. It is generally preferable, however, that the sole 115 be formed with sufficient stiffness so that it is capable of efficiently transferring or communicating force along its length, preferably from end to end, and along its width, preferably from side to side, while also providing firm support to the bottom surface 691 of the foot 600.

It may be preferable, although not necessary, that the sole 115 be formed generally uniformly throughout. Such a uniform sole 115 formation may serve to simplify the engineering or design of the desired flexibility or stiffness about one or more defined axes of interest traversing the sole 115 as well as simplify the construction process. Notwithstanding, it is to be understood that provision is made for a non-uniform sole 115 formation. That is, provision is made for a non-uniform construction, configuration or both construction and configuration of the sole 115. In this regard, it is contemplated that non-uniform formations of the sole 115 may be employed to facilitate or augment the desired functionality of the unitary support structure 110 in accordance with one or more of the principles disclosed herein. It is presently contemplated, for example, that the sole 115 may be made less stiff (or more flexible) or more stiff (or less flexible) at selected regions and/or in selected directions to facilitate the desired flexibility of the unitary support structure 110 about one or more transverse axes traversing those regions. Examples of such sole formations include:

Example 1: the sole 115 may be formed with greater flexibility at a region or along a transverse axis (or portion thereof) that resides between or adjacent to one or more of the longitudinal partitions extending between side walls 160, 170, 180 or one or more of the terminal end points 166, 167, 168, 169, 181, 182.

Example 2: the sole 115 may be formed with greater flexibility at a region or along a transverse axis (or portion thereof) that resides between the front end region 120 and the mid-region 127 of the sole or between the rear end region 125 and the mid-region 127 of the sole 115.

Example 3: the sole may be formed with greater flexibility at a region or along a transverse axis (or portion thereof) that is configured to reside between the heel region 670 and the mid-region 680 of the foot 600 or between the mid-region 680 and the toe region 660 of the foot 600.

Example 4: the sole may be formed with greater flexibility at a region or along a transverse axis (or portion thereof) that is configured to reside between the front member 320 and the center section 310 of the blade holder 300 or between the back member 340 and the center section 310 of the blade holder 300.

Example 5: the sole may be formed with greater flexibility at a region or along a transverse axis (or portion thereof) that is configured to reside between a laterally unsupported region of the blade 400 and a laterally supported region of the blade 400.

Example 6: the sole may be formed with greater flexibility along its perimeter or portion thereof.

Example 7: the sole may be formed with decreased flexibility at any one of the foregoing regions described in examples 1-6.

Example 8: the sole may be formed with the relative flexibility described in one or more of the foregoing examples 1-8 in any combination thereof. Hence, any combination of the foregoing locations of areas of increased or decreased flexibility is contemplated.

Thus, it is to be understood that non-uniform formations of the sole 115 may be employed in connection with various implementations and component structures disclosed herein. The increase or decrease in flexibility is measured relative to adjacent and preferably, although not necessarily, longitudinally displaced regions in the sole 115. In addition, it is contemplated that the increases or decreases in flexibility may be derived from either the construction and/or the configuration of the sole 115.

Further, and in connection with the foregoing, it is noted that the sole 115 is described as comprising a generally "planar" structure. It is to be understood, however, that the sole 115, as previously noted, may have curvature and/or varying thickness, particularly at its medial and lateral sides 140, 150 and underneath the arch of the foot 650. In addition, it is noted that the sole 115 illustrated in the preferred implementations undulates along its length, so that the region of the sole 115 that is configured to underlie the heel region 670 of the foot 600 is slightly elevated relative to anterior regions of the sole 115, such as the region of the sole 115 that is configured to underlie the toe region 660. In the preferred implementations the upper or top surface 130 of the sole 115 is formed generally flat with the horizontal plane at the regions configured to underlie the heel and toe regions 670, 660 of the foot 600 respectively, while the region of the sole 115 configured to underlie the mid-region 680 of the foot 600 has a slight curvature as it extends between the adjacent sole 115 regions.

For the purposes of this disclosure, the sole 115 is generally defined as the area of the unitary support structure 110 that is configured to reside below the foot 600 and those portions of the unitary support structure 110 extending from those underlying regions at an angle of 45 degrees or less relative to the horizontal plane. In this manner, the portion of the unitary structure 110 that forms the sole 115 is structurally distinguishable from the side walls (e.g., 160, 170, and 180) extending from the sole 115, even when the sole 115 is non-planar or has varying thickness or curvature about its perimeter regions (such as in the regions of the sole 115 that merge with the side walls) or its interior regions, for example the mid-region 127 of the sole 115 may be curved upward or made thicker to reflect the curvature of the bottom surface 691 of the foot 600 (e.g., the arch of the foot 650).

It is also contemplated that the sole 115 may include one or more holes or apertures extending though the sole 115 from the top surface 130 to the bottom surface 135 to allow for heat dissipation or cooling of the foot 600. In a preferred implementation, not illustrated herein, the mid-region 127 of the sole 115 includes a small gradual depression that extends longitudinally. For example, the depression may have the following dimensions: (a) a length of 2.0 inches, (b) a width of 1.0 inch, and (c) a depth of 0.33 inches. The depression is preferably positioned generally midway between the lateral and medial sides of the sole 115 and opens upwardly toward the bottom of the foot 600 so as to form a concave surface in the top surface 130 of the sole 115 and a corresponding convex surface in the bottom surface 135 of the sole 115. An aperture is located at the base of the depression to allow for heat dissipation and a porous metallic or polymer mesh or screen is positioned over the aperture. One or more apertures in the foot bed 800, preferably configured to reside over the aperture in the sole 115, may be included to allow heat and air to move more freely from the foot 600 into the depression and out the sole aperture. The depression is preferably configured not to extend across the width of the sole 115 but rather configured to reside within the width of the sole 115 so that the regions of the sole 115 surrounding the perimeter of the depression may provide the needed support to the mid-region 680 of the foot 600.

Furthermore, as previously discussed the sole 115 is preferably formed as a unitary molded component with the side walls. It is contemplated, however, that regions (e.g., 120, 125, 127) of the sole 115 together with the side walls extending therefrom may be formed as discrete molded components and connected to one another with discrete structural elements or materials that are not molded to the molded regions of the sole 115. For example, it is contemplated that the front end region 120 and the mid-region 127 and/or the rear end region 125 and the mid-region 127 of the sole 115 may be connected via a suitable adhesive, such as an elastomer, or perhaps connected via a discrete structural component (formed of a resilient metal, plastic, or other suitable material) that is glued via a suitable adhesive and/or mechanically secured to the molded regions or section of the sole 115.

F. Walls Extending from the Rear End Region of the Sole

As previously described above, each of the representative implementations illustrated in FIGS. 5-24 include a first set of generally opposing walls 160 that extend from the medial and lateral sides 140, 150 of the rear end region 125 of the sole 115 to provide lateral and medial support to the heel region 670 of the foot 600. Each of opposing walls 160 is comprised of a forward facing edge 165 that defines the anterior edge of the wall and a generally upwardly facing edge 169. The forward facing edge 165 extends upwardly from terminal end point 166. In the first, second, and third preferred implementations illustrated in FIGS. 5-19, the forward facing edge 165 defines the posterior edge of longitudinal partitions 161 that are defined between walls 160 and 180. Whereas in the fourth preferred implementation illustrated in FIGS. 20-24, the forward facing edge 165 defines the posterior edge of longitudinal partitions 164 that are defined between walls 160 and 170. The preferred locations of the terminal end points 166 and longitudinal partitions 161 and 164 have been previously described.

In each of the four preferred implementations, illustrated in FIGS. 5-24, each of side walls 160 on the medial or lateral side is comprised of a heel counter portion 250, an ankle counter portion 230 including a concave (semi-spherical) ankle pocket 235 configured to overlie the ankle region of the intended wearer, and a tendon guard portion 240. The heel counter portion 250 extends upwardly from the sole 115 and provides support and protection to the lower regions of the foot 600 around the heel bone 635. The ankle counter portion 230 extends upwardly from the heel counter portion 250 to provide support and protection to the ankle and regions of the foot 600 and leg surrounding the ankle. The tendon guard portion 240 extends generally at the back end 210 of the unitary support structure 110 upwardly from the upper regions of heel counter portion 250 to provide protection to the tendons (e.g., the Achilles tendon) at the back of the foot and leg and support to the back of the foot and leg.

In the first and second preferred implementations illustrated in FIGS. 5-19, each of side walls 160 on the medial and lateral sides further comprises a lower leg support portion 270, which is configured to reside above the ankle and extend forward from the back end 210 of the unitary support structure 110 to partially wrap around the front region of the leg of the intended wearer. In the preferred implementations illustrated in FIGS. 5-19 slots 271 and 273 partition the lower leg support portion 270 vertically from the lower regions of wall 160 and longitudinally from the tendon guard portion 240 thereby facilitating greater structural and functional independence between those portions. With respect to the fourth preferred implementation illustrated in FIGS. 20-24, slot 272 vertically partitions the ankle counter portion 230 through the ankle pocket 235 thereby forming a vertically partitioned ankle counter portion 230 and a vertically partitioned ankle pocket 235.

Employment of slots, such as slots 271, 272, and 273, to partition discrete portions of walls 160 from one another is capable of providing improvements in fit and performance because relative movement between discrete regions of the foot 600 may be facilitated. In addition, the partitioned regions of walls 160 may be secured to the foot 600 more independently. For example, with respect to the fourth preferred implementation illustrated in FIGS. 20-24, the ankle counter 230 is vertically partitioned into two parts (identified by reference numerals 233 and 234) via slot 272, which extends generally rearward and slightly downward toward the back end 210 of the unitary support structure 110 from the anterior edge of walls 160. At the rearward or posterior end of vertical partition/slot 272, the upper and lower parts of the ankle counter 230 merge into one another as they approach the back end portion 210 of the support structure 110. As such, the upper part 234 of ankle counter 230 extends generally only from the back end portion 210 of the unitary support structure 110 and hence is more capable of pivoting up and down with the movements or bending at the ankle. Hence, ankle movement may be better accommodated without significant detriment to the protection and support of the ankle and heel region 680. As for the first and second preferred implementations illustrated in FIGS. 5-14, slots 271 and 273 vertically and longitudinally partition the lower leg support portion 270 from the tendon guard portion 240 and the lower regions of walls 160. The lower leg support portion 270 is thus anchored to the remaining portions of the unitary support structure 110 only toward the back end portion 210. Thus, twisting about the ankle joint as well as flex or bending of the lower leg in the lateral and medial direction is capable of being better accommodated. In addition, because the anterior end region of the lower leg support portion 270 is not directly joined to the underlying regions of walls 160, the upper laces 1000 of the boot 100 are more capable of securing the lower leg support portion 270 to the foot 600 and leg more independently, thereby improving fit. Moreover, it is contemplated that the flexibility in the lower leg support portion 270 or upper portion 234 of the ankle counter portion may be increased or decreased to further facilitate an improved fit and/or performance. Accordingly, it is contemplated that the lower leg support extensions 270 may be formed with greater flexibility in the lateral and/or vertical directions by: (a) decreasing the thickness of the wall in one or more regions of the lower leg support portion 270, (b) decreasing the dimension that joins the lower leg support portion 270 to the remainder of walls 160, and/or (c) employing more flexible construction materials in the anterior regions of the lower leg support portion 270 and/or at or around the region where the lower leg support portion 270 joins the remaining portions of walls 160. Similarly, vis-à-vis the fourth implementation illustrated in FIGS. 20-24, it is contemplated that the upper portion 234 of the ankle counter 230 may be formed with greater flexibility in the lateral and/or vertical directions by: (a) decreasing the thickness of the wall in one or more regions of the upper portion 234, (b) decreasing the dimension that joins the upper portion 234 to the remainder of walls 160, and/or (c) employing more flexible construction materials in the anterior regions of the upper portion 234 and/or at or around the region where the upper portion 234 joins the remaining portions of walls 160.

Generally, the walls of the unitary support structure (e.g., sole 115 and side walls 160, 170 and 180) are preferably configured and/or constructed with greater load carrying capacity along their planar formation than in a direction normal thereto. Vis-à-vis configuration, in the preferred implementations the walls are thin relative to their longitudinal and vertical dimensions and hence would, from the stand point of configuration, have greater load carrying capacity along their plane than normal to their plane. Vis-à-vis construction, the walls of the unitary support structure 110 are preferably constructed of non-isotropic materials, which also independently contribute to the wall's capability to carry load along and normal to their planar formation. More particularly, a preferred construction employs substantially continuous fibers oriented along the plane of the wall and disposed within a hardened resin matrix such that the elastic modulus when measured in a direction generally normal to the planar formation of the wall is smaller than when measured in one or more directions along the plane of the wall (e.g., vertical). Hence, both construction and configuration may effect the load carrying capacity of the wall in any given direction.

Although, the walls of the unitary support structure 110 are preferably formed to have a greater load carrying capacity along their plane than normal to their plane, it should be understood that the walls may be constructed (e.g., orientation of the fibers) and/or configured (e.g., making the walls thicker) with areas of relatively increased flexibility or load carrying capacity in one or more directions or orientations to: (a) provide additional protection to sensitive regions, such as the ankle, tendon, toes, and lower regions of the mid-region of the foot 600, (b) provide stiffer support to corresponding regions of the foot 600, and/or (c) effectuate the desired flexibility or flexural rigidity.

In the preferred implementations illustrated in the drawings, the areas of the unitary support structure 110 having increased load carrying capacity are shaded as illustrated in FIGS. 6-9, 7-14, 16-19, 20-24 of the first, second, third, and fourth preferred implementations, respectively. As depicted in those figures, the areas of increased load carrying capacity include the heel counter portion 250, the tendon guard portion 240, and the ankle pocket 235. As to each of these portions, it is preferable that the increased load carrying capacity be in a direction that is normal to their planar formation and/or parallel to their planar formation.

By forming the heel counter portion 250 and the tendon guard portion 240 (at the back end 210 of the unitary support structure 110) with increased load carrying capacity in a direction that is normal to their planar formations, those portions are capable of having increased resistance to bending away or over the sole 115 when stressed in a direction normal to their planar formation. In addition, by forming the heel counter portion 250 and the tendon guard portion 240 with increased load carrying capacity along their planar formation, those portions are capable of having increased resistance to bending when stressed in the vertical and/or longitudinal directions. Hence, the lower regions and back regions of wall 160 would be better anchored to the sole 115. In other words, the lower regions and back regions of the walls 160 would be more capable of maintaining their molded unstressed position relative to the portion of the sole 115 from which it extends when stressed. The remaining portions of walls 160 that generally surround the ankle pocket 235 and reside above the heel counter portion 250 are formed with relatively less load carrying capacity and hence are more amenable to flexing or bending upon application of stress. Furthermore, with respect to the ankle pocket 235 (which is generally contoured to reflect the exterior protrusion of the ankle) it is preferable that it be formed with increased load carrying capacity (illustrated in shading) in a direction that is normal to its planar formation and along its planar formation and more preferably in multiple directions along its planar formation so as to provide sufficient strength to resist collapsing when impacted regardless of the direction of the impact (e.g., from the top, bottom, front, back, side or somewhere in between) thereby providing multi-directional isolation or protection to the ankle. Thus, one aspect of the disclosure relates to forming the walls of the unitary support structure 110 either via construction or configuration with areas of greater or lesser load carrying capacity in one or more defined orientations (e.g., normal, longitudinal, vertical).

Furthermore, it should be understood that the side walls (e.g., side walls 160, 170 and 180) are preferably configured, or otherwise amenable to conforming, to the contour of the outer formation of the foot 600 of the intended wearer thereby facilitating an improved fit, which in turn facilitates improved communication of forces between the walls and the foot, and hence improved performance. In addition, by contouring the walls to reflect the outer formation of the foot 600, the flexural rigidity of the side walls may vary with the location and direction of the applied stress commensurate with the curvature of the wall at and around the point of stress. With respect to walls 160 of the preferred implementations, the heel counter portion 250, ankle counter portion 230, tendon guard portion 240, and lower leg support portion 270 are each contoured to include a concavity commensurate with the outer expression of the heel region 670, the ankle region, and the foot and leg. As a result, a greater degree of inward lateral flexibility than outward lateral flexibility may be imparted to the wall. Thus, one aspect of the disclosure relates to configuring walls of the unitary support structure 110 with greater lateral flexibility inwardly than outwardly.

An example of how the contour and variations in load carrying capacity may effect the manner by which the unitary support structure 110 bends is described with reference to the first preferred implementation illustrated in FIGS. 5-9. Suppose that the heel counter portion 250, the tendon guard portion 240 and the ankle pocket portion 235 of the first preferred implementation are formed with relatively greater load carrying capacity in a direction generally normal to their planar formation. Further suppose that wall 160 is subjected to a force or pressure directed laterally inwardly at the ankle pocket 235 (e.g., perhaps due to an external impact from the environment at the ankle pocket 235) sufficient to bend wall 160. Deformation in the ankle pocket 235 would be resisted due to the increased load carrying capacity in that pocket 235 as well as from the semi-spherical concave configuration embodied by the ankle pocket 235. Consequently, the forces would tend to be communicated along the planar formation of wall 160 to the other areas of wall 160 with limited absorption of the force to the underlying ankle. In such a scenario, bending of walls 160 would be greater in the areas formed with lesser load carrying capacity. Hence bending would generally be greater at regions above the heel counter portion 250 and forward of the back end region 210 and tendon guard portion 240 because those regions are formed with less load carrying capacity. In contrast, when one of walls 160 is subjected to outwardly directed force or pressure, perhaps due to forces from the foot 600, the wall would tend to bend or flex in the same regions previously noted (with respect to the foregoing discussion relating to the inwardly directed force), but to a lesser degree because the concave configuration of wall would impart additional resistance to outward deflection.

When walls 160 are so configured they are capable of providing greater support to the foot 600 in the lower and/or rearward extremities while also being capable of providing or facilitating the desired bending from side to side. Improved conformity of the boot 100 to the foot 600 is also capable in those walls 160 making them more receptive or amenable to inward deflection over or about the exterior formation of the foot 600 when the boot 100 is laced or otherwise secured to the foot 600.

Hence, in the embodiments of walls 160 illustrated in the drawings, it is therefore contemplated that wall 160 be adapted to provide relatively firm support to the foot 600 at the back of the foot 600 and around the lower extremities of the heel region 670. With respect to the upper regions of the foot 600 and leg for example the ankle region and lower leg, it is contemplated that those regions be less firmly supported to accommodate bending and lateral flexibility. The combination of firm support about the lower extremities of defined regions of the foot 600 and greater flexibility thereabove is capable of firmly planting the bottom of the foot 600 to the sole 115 while also accommodating movement of the upper regions of the foot and leg. A good fit and hence improved performance is thus capable of being achieved.

In sum, an independent substructure of the unitary support structure 110 is formed by one or both of walls 160, on the medial and/or lateral side, together with the rear end region 125 of the sole 115 from which each of walls 160 extend. That substructure is distinguished from the remaining structure of the unitary support structure 110, positioned anterior thereto, by the longitudinal partitions 161 or 164, which are defined at their posterior end by the forward facing edge 165 that extends from terminal end point 166. By partitioning the unitary support structure 110 in this manner, each substructure becomes more structurally independent from the other. Forces in each of walls 160 are capable of being transmitted more directly to the portion of the sole 115 from which the walls extend as opposed to being communicated along the fulllength of the sides of sole 115, as would be the case without partitioning. Flexibility of unitary support structure 110 at or about defined regions of the sole 115 may be engineered to reside between the discrete substructures or in locations coinciding therewith. When substructures of the unitary support structure 110 correspond to the natural regions (or preferred ranges relative thereto) of the foot 600 such as at the heel, toe, and mid regions 670, 660, and 680; the desired natural movement of the foot 600 may also be accommodated to enhance or facilitate the desired performance of the article of footwear 1. Thus, when the substructure formed by each or both of walls 160 is partitioned at a location configured to reside generally between the heel and mid regions 670, 680 of the foot 600, the desired relative movement between those regions may be facilitated because the partition would facilitate flex in the unitary support structure 110 between those regions. Similarly, when those partitioned substructures correspond to flexural positions or substructures of the blade holder 300 and/or blade 400, the desired flexibility or flex of the blade and blade holder components may also be facilitated or otherwise controlled. By configuring or otherwise constructing walls 160 to be relatively stiff along their plane (e.g., in the longitudinal and vertical directions), forces along the plane of the walls are capable of being efficiently transferred to the sole 115. In addition, by forming walls 160 to include regions of relatively increased and decreased load carrying capacity in a direction normal to their planar formation, lateral support to the foot 600 may be varied, which may further accommodate or control lateral flex in the foot 600 by creating regions of greater lateral flexibility in the unitary support structure 110. The portions of the walls 160 formed with increased load carrying capacity in a direction normal to their planar formation are capable of providing: (a) a more efficient transfer of forces to the sole 115, (b) greater strength to anchor the wall relative to the portion of the sole 115 from which it extends, and (c) greater strength at the ankle region to protect the ankle region from injurious impact and to provide support to the ankle region. The portions of walls 160, such as at and around the ankle, formed with relatively decreased load carrying capacity in a direction normal to their planar formation are capable of facilitating greater lateral flexibility thereby improving the dynamic fit of the unitary support structure 110 to the foot 600. By also forming each of walls 160 to include an ankle pocket 235 with increased load carrying capacity in multiple directions along its planar formation, greater protection and isolation of the ankle may be achieved. By configuring walls 160 of the unitary support structure 110 to include concave surfaces that generally open inwardly to the foot cavity 111 defined thereby, the walls are capable of having a greater degree of flexibility inwardly than outwardly. Moreover, by partitioning the lower leg support portion 270 and upper portion 234 of the ankle counter portion 230 from the remaining portion of walls 160, additional independence between those partitioned regions of the unitary support structure 110 may be achieved, which may further improve fit and performance of the article of footwear 1 as described above.

Additional aspects relating to configuration and construction of the unitary support structure 110 are discussed in further detail below.

G. Walls Extending from the Front End Region of the Sole

As previously described above, each of the representative implementations illustrated in FIGS. 5-24 include a second set of generally opposing walls 170 that extend from the medial and lateral sides 140, 150 of the front end region 120 of the sole 115 to provide support and protection to the toe region 660 of the foot 600. In each of the preferred implementations, walls 170 on the medial and lateral sides are depicted as merging with one another as they extend forwardly to the front end portion 215 of the unitary support structure 110 and as they extend inwardly above the sole 115 to form a toe cap portion 200. It should be understood, however, that in other implementations it is contemplated that walls 170 not form a toe cap portion 200 and/or not merge with one another at the front end portion 215.

In the second, third, and fourth preferred implementations illustrated in FIGS. 10-24, each opposing wall 170 is comprised of a rearward facing edge 175, which extends from terminal end point 167 and merges with the horizontal rearward facing edge 178 of the toe cap portion 200. With respect to the first preferred implementation illustrated in FIGS. 5-9, an anterior portion of each opposing wall 170 is partitioned from the posterior portion thereof. Accordingly, as to the first preferred implementation illustrated in FIGS. 5-9, the posterior portion of each opposing wall 170 is defined: (a) at its posterior end by rearward facing edge 175, which extends upwardly from terminal end point 167, (b) at its anterior end by forward facing edge 177, which extends upwardly from terminal end point 169, and (c) at its vertical extent by upwardly facing edge 179. While the anterior portion of each opposing wall 170 is defined at its posterior end by rearward facing edge 176, which extends upwardly from terminal end point 168 to merge into horizontal rearward facing edge 178 of the toe cap 200.

In the first, second and third preferred implementations illustrated in FIGS. 5-19, rearward facing edge 175 defines the anterior edge of longitudinal partitions 162 that are defined between wall 170 and wall 180; while in the fourth preferred implementation illustrated in FIGS. 20-24, rearward facing edge 175 defines the anterior edge of longitudinal partitions 164 that are defined between wall 170 and wall 160. In addition, with respect to the first preferred implementation illustrated in FIGS. 5-9, the forward facing edge 177 of the posterior portion of wall 170 defines the anterior edge of longitudinal partitions 163 while rearward facing edge 176 of the anterior portion of wall 170 defines the anterior edge of longitudinal partitions 163. The preferred locations of terminal end points 167, 168, 169, and 181 as well as longitudinal partitions 162, 163 and 164 have been previously described.

In each of the preferred implementations illustrated in FIGS. 5-24, side each opposing side wall 170, on the lateral and medial sides, is comprised of a toe counter portion 260, which includes medial or lateral extent counter portion 261, and a toe cap portion 200. The toe counter portion 260 extends upwardly from the sole 115 and provides support and protection to the lower regions of the foot 600 around the toes. The medial and lateral extent counter portions 261 are located at the posterior part of the toe counter portions 260 and provide support and protection to the region of the toes that form the ball of the foot 640 and the lateral extent of the foot 645, respectively. The toe cap portion 200 extends inwardly from the toe counter portion 260 and traverses over the sole 115 to provide protection to the top of the toes. Hence, in the preferred implementations, the toe counter portion 260, the toe cap portion 200 and the sole 115 portion underlying the toe cap portion 200 effectively create a toe box that encapsulates the toes.

In the first preferred implementation illustrated in FIGS. 5-9, the medial and lateral extent counter portions 261 are partitioned from the remaining portions of the toe counter portion 260 by a slot that extends generally upwardly from or slightly above the sole 115 and separates (via longitudinal partitions 163) the forward facing edge 177 of the posterior portion of wall 170 from the rearward facing edge 176 of the anterior portion of wall 170.

As previously noted, walls 170 may include regions or areas of increased load carrying capacity (which are generally indicated in FIGS. 5-24 by shading) in one or more defined directions to provide additional protection and support to the toe region 660 and/or to provide the desired stiffness or strength for efficient communication of forces to the sole 115. Hence, it is contemplated that upper portions of the toe counter portion 260 and/or the upper portions of the lateral and medial extent counter portions 261 of walls 170 may be formed with relatively less load carrying capacity in a direction generally normal to the planar formation of those wall portions. In addition, it is contemplated that upper portions of walls 170 are formed with increased load carrying capacity in one or more directions parallel to the planar formation of wall 170 (e.g., generally vertically and/or longitudinally).

In the preferred implementations illustrated in FIGS. 5-24, the toe counter portions 260 extending from rearward facing edge 175 forward to the front end portion 215 (including preferably the lower portions of the lateral and medial extent counter portions 261) and the toe cap portion 200 are formed with increased load carrying capacity in a direction that is normal to the planar formation of those wall portions. In addition, it is further contemplated that those wall portions be formed with increased load carrying capacity in a direction that is parallel to the planar formation of those wall portions. The increased stiffness and strength in the lower portions of each of walls 170 is capable of: (a) providing additional protection to the coinciding adjacent regions of the foot 600, (b) more efficient transfer of forces between side wall and the sole 115 from which it extends, and (c) better anchoring of side wall to the sole 115, thereby reinforcing the relative position of side wall to the sole 115. The increased stiffness and strength in the toe cap portion 200 also provides greater protection from injurious impact to the underlying toes of the foot 600.

As previously noted, it is generally preferable that the boot 100 be configured to be in good communication with the foot 600 to facilitate efficient transfer of force. Accordingly, it is generally preferable that the unitary support structure 110 be configured or otherwise amenable to conform to the external formation of the foot 600. However, it may be preferable in some footwear for regions of the boot 100 to be configured with less conformity or capability to conform to the foot 600.

For example, in the ice skate illustrated in FIGS. 5-24, the toe counter portion 260 (or anterior portion thereof), the toe cap portion 210, and the underlying portion of the sole 115 are preferably formed as a rigidly defined toe enclosure or toe box substructure, which maintains its shape and resists flex. In other words the toe box substructure is not adapted to be amenable to conforming about the foot 600 when stressed. Moreover, it may be preferable for the toe box substructure to be spaced apart from the toes in certain regions, such as above and/or in front of the perimeter of the toes. Such a spatial separation is capable of providing additional protection to the toes as well as facilitate movement of the toes more freely to avoid restricting blood circulation in the toes. In contrast, it is preferable that the regions of the unitary support structure 110 that are configured to coincide with the ball of the foot 640 and/or lateral extend of the foot 645 be formed to have relatively greater conformance or conforming capability so as to facilitate efficient communication between those regions of the foot 600 and the unitary support structure 110. Both of these design criteria are capable of being accomplished by the preferred implementations illustrated in the drawings.

In the second and third preferred implementations illustrated in FIGS. 10-19, the rearward facing edge 175 is slanted rearwards as it extends downward to the sole 115. The anterior extensions or portions of the third set of opposing walls 180 (described more fully below) reside vertically above the slanted portion of the rearward facing edges 175 of walls 170 and hence are not joined to the underlying sides of the sole 115 residing directly there below. Furthermore, the upper portions of walls 180 are preferably configured and/or constructed with greater lateral flex capability than the underlying portions of side walls 170. Hence, when the laces 1000, which are directly secured via the upper 500 to the overlying anterior extensions of walls 180, are tightened the anterior and upper portions of walls 180 are capable of flexing inwardly to conform about the underlying foot 600, including the ball of the foot 640 and the lateral extent of the foot 645, without being restricted by the more rigidly formed toe box substructure. Notably, however, the forces, or components thereof, that are communicated from the ball of the foot 640 and lateral extent of the foot 645 to those anterior extensions of side walls 180 have a tendency to be transmitted to the mid-region 127 of the sole 115—in that each opposing side wall 180 is effectively a unitary extensions of the mid-region 127 of the sole 115. In certain circumstances, such communication may be less than desirable to effectuate optimal performance.

The configuration of walls 170 in the first preferred implementation illustrated in FIGS. 5-9 provides an alternative configuration that is capable of limiting the transmission or communication of such forces to the mid-region 127 of the sole 115. Each opposing wall 170, as previously noted in the first preferred implementation is configured, on the medial and lateral side 140, 150, as two discrete wall structures, an anterior and posterior portion, each of which are longitudinally spaced apart via longitudinal partitions 163 by a slot defined by the rearward facing edge 176 of the anterior portion and the forward facing edge 177 of the posterior portion. The unitary support structure 110 is thus configured with relatively increased flexibility about an axis that traverses the slot between the anterior and posterior portions of walls 170. Direct communication of forces between the anterior and posterior portions of walls 170 is minimized commensurate with the degree of the partitioning therebetween. The anterior portion of the wall that forms the toe box substructure may be formed more rigidly or stiffly and configured to be spaced from the toes to allow freedom of movement of the toes between the phalanges 610; while the posterior portion of the wall (or portions thereof) may be formed less stiffly to allow greater lateral flexibility. Furthermore, because the posterior and anterior portions of walls 170 are longitudinally partitioned, flexibility of the posterior portion would not be restricted by the rigidity of the toe box substructure formed by the anterior portion of the wall. Accordingly, the posterior portion of wall 170 is configured with greater capability of lateral flex and hence may conform (with lacing) to the exterior formation of the ball of the foot 640 or the lateral extent of the foot 645, which in turn facilitates improved communication therebetween. Forces from the ball of the foot 640 and the lateral extent of the foot 645 would be transferred via the posterior portion of each of opposing wall 170 directly to the underlying region of the sole 115 from which the posterior portion of the wall extends rather than being communicated to the more posterior regions of the sole 115 via walls 180 as was the case in the second and third preferred implementations illustrated in FIGS. 10-19 and described above. Furthermore, by forming the posterior portion of wall 170 with relatively greater load carrying capacity in the longitudinal and vertical directions (relative to the lateral direction), especially at the lower extremities of the posterior component, forces generated by flexing between the toe and mid regions 660, 680 of the foot 600 may still be efficiently communicated to the sole 115 via the posterior portion of walls 170. In addition, by forming the lower portion of the posterior portion of walls 170 with relatively greater load carrying capacity in a direction normal it is planar formation (e.g., laterally) relative to regions of the posterior portion of walls 170 extending thereabove—the unitary support structure 110 is capable of providing firm support about the perimeter of the foot 600.

In sum, an independent substructure of the unitary support structure 110 is formed by one or both of walls 170, on the medial and/or lateral side, together with the front end region of the sole 115 from which each of walls 170 extends. That substructure is distinguished from the remaining posterior portions of the unitary support structure 110, positioned posterior thereto, by the longitudinal separation or partitions 162 or 164, which are defined at their anterior end by the rearward facing edge 175 that extends from terminal end point 167. By partitioning the unitary support structure 110 in this manner, each substructure becomes more structurally and functionally independent of the other. Forces in each of walls 170 are capable of being transmitted more directly to the portion of the sole 115 from which the walls extend as opposed to being communicated along the full length of the sides of sole 115, as would be the case without partitioning. Flexibility of unitary support structure 110 at or about defined regions of the sole 115 may be engineered to reside between the discrete substructures or in locations coinciding therewith. When substructures of the unitary support structure 110 correspond to the natural partitioned regions (or preferred ranges relative thereto) of the foot 600 such as at the heel, toe, and mid regions 670, 660, and 680; the desired natural movement of the foot 600 may also be accommodated to enhance or facilitate the desired performance of the article of footwear 1. Thus, when the substructure formed by each or both of walls 170 is partitioned at a location configured to generally reside between the toe and mid regions 660, 680 of the foot 600, the desired relative movement between those regions may be facilitated because the partition would facilitate flex in the unitary support structure 110 between those regions. Similarly, when those partitioned regions or substructures of the unitary support structure 110 correspond to flexural positions or substructures of the blade holder 300 and/or blade 400, the desired flexibility or flex of those components may also be facilitated or otherwise controlled. By configuring or otherwise constructing walls 170 to be relatively stiff along their plane (e.g., in the longitudinal and perpendicular directions), forces along the plane of the walls are capable of being efficiently transferred to the sole 115. In addition, by forming walls 170 or portions thereof with areas of increased load carrying capacity in a direction generally normal to their planar formation, lateral support to the foot 600 may be varied, which may further accommodate or control lateral flex in the foot 600 by facilitating areas of greater lateral flexibility in the unitary support structure 110. The portions of walls 170 formed with increased load carrying capacity are also capable of (a) providing more efficient transfer of forces to the regions along the side of sole 115 from which the wall extends, (b) reinforcing the position of the wall relative to the sole 115 (i.e., anchoring the walls to the sole), and (c) providing greater protection to sensitive regions of the toes, the ball of the foot 640 and the lateral extent of foot 645. Areas of relatively lesser load carrying capacity, for example in the upper regions of posterior portion wall 170 of the first preferred implementation, illustrated in FIGS. 5-9, may provide or facilitate greater lateral flex in the wall, thereby making it more amenable to conforming to the upper regions of the foot 600, allowing the wall to bend over the top of the ball of the foot 640 or lateral extent of the foot 645. By configuring the posterior portion of walls 170 of the unitary support structure 110 to include a concavity that generally opens inwardly to the foot cavity 111 defined thereby, a greater degree of flexural rigidity in the outward direction versus the inward direction may be imparted. Moreover, by internally partitioning walls 170 into discrete anterior and posterior portions via longitudinal partitions 163, additional independence between the partitioned regions of the wall may be achieved, which may further improve fit and performance of the article of footwear 1, as described in more detail above.

Additional aspects relating to the configuration and construction of the unitary support structure 110 are described in further detail below.

H. Walls Extending Between the Front and Rear End Regions of the Sole

With respect to the first, second, and third preferred implementations of the unitary support structure 110 illustrated in FIGS. 5-19, extending from the mid-region 127 of the medial and lateral sides of the sole 115, as previously noted, is a third set of generally opposing walls 180, which form the lateral medial vamp portions of the unitary support structure 110 and support and protect the mid-region 680 of the foot 600. Each opposing wall 180 includes a forward facing edge 185, an upwardly facing edge 189, and a rearward facing edge 187. The forward facing edge 185 extends upwardly from terminal end point 181 to define the posterior edge of longitudinal partitions 162 that extend between walls 180 and 170; whereas the rearward facing edge 187 extends upwardly from terminal end point 182 to define the anterior edge of longitudinal partitions 161 that extend between walls 180 and 160. The preferred locations of terminal end points 181 and 182 and longitudinal partitions 161 and 162 have been previously described.

Walls 180, as previously noted, are preferably configured to contour the outer formation of foot the 600 regions proximate thereto thereby improving fit and communication between the wall and the adjacent regions of the foot 600. In the preferred implementations illustrated in FIGS. 5-19, walls 180 are configured with a generally longitudinally extending concave surface, which extends at its upper regions inwardly over the sole 115 so as to generally reflect the curvature of the upper surface 690 of the mid-region 680 of the foot 600. The concave surface of walls 180 tends to impart greater inward lateral flexibility than outward lateral flexibility in the upper portions of walls 180. Consequently, the upper portion of walls 180, being more flexible inwardly, are thus more amenable to conforming about the girth of mid-region 680 of the foot 600 when laces 1000 are tightened. Yet, because walls 180 are configured with less flexibility outwardly, they are less amenable to outward flex with the exertion of lateral force from the mid-region 680 of foot 600.

Walls 180, as previously noted, are also preferably formed with regions or areas of increased load carrying capacity (illustrated by shading) in one or more preferred directions/orientations to further strengthen and stiffen those regions. Additional protection to the sensitive soft tissue regions of the mid-region 680 of foot 600 may thus be provided. In addition, the areas of increased load carrying capacity may also serve to effectuate the desired bending or flexibility of walls 180; for example by creating a tendency in the walls to flex in areas having lesser load carrying capacity. In the preferred implementations illustrated in FIGS. 5-19, the lower regions of walls 180 are formed with increased load carrying capacity in a direction that is generally normal to their planar formation (e.g., generally in the lateral direction), relative to their upper regions. Accordingly, those regions are formed with greater flexural rigidity in the lateral direction than regions in walls 180 located thereabove. The greater lateral flexural rigidity is capable of better anchoring walls 180 relative to the sole 115, thereby reinforcing the relative position of walls 180 to the position of the underlying unitarily conjoined portions of the sole 115. Moreover, the greater lateral flexural rigidity in those regions also reinforces those regions to resist buckling or bending laterally inwardly over the sole 115 or outwardly beyond the sides 140, 150 of the sole 115. Further, the lower portions of walls 180 may be preferably formed with additional load carrying capacity in one or more directions along their planar formation; for example in the longitudinal and/or vertical directions. When walls 180 are so formed, forces generated from the mid-region 680 of the foot 600 are capable of being more efficiently transferred via walls 180 to the sole 115. Thus, increasing the relative load carrying capacity in the lateral direction is capable of provides greater lateral support about the lower extremities of the foot 600, while also providing a relatively greater degree of lateral flexibility in the upper regions of walls 180. Increasing the load carrying capacity in the longitudinal and/or vertical direction of walls 180, on the other hand, provides even more efficient transfer of forces to the sole 115.

In addition, although not illustrated in the drawings, it is contemplated that wall 180, on the lateral or medial side or both sides of the unitary support structure 110, may include one or more internal longitudinal slots. Such slots may reside (a) within the areas of the wall having increased load carrying capacity, for example at a location generally corresponding to the perimeter of the foot 600; (b) outside the areas of the wall formed with increased load carrying capacity; and/or (c) at a juncture between the areas of lesser and greater load carrying capacity. Such internal slots may augment the lateral flexibility of the wall as well as provide a means to dissipate heat or to allow air to flow in and out to cool or dry the article of footwear 1.

In sum, an independent substructure of the unitary support structure 10 is formed by one or both of walls 180, on the medial and/or lateral side, together with the mid-region 127 of the sole 115 from which each of walls 180 extends. That substructure is distinguished from the remaining portions of the unitary support structure 110, positioned posterior and anterior thereto, by the longitudinal separation or partitions 161 and 162, which are defined by rearward and forward facing edge 187 and 185 that extend from terminal end points 182 and 181, respectively. By partitioning the unitary support structure 110 in this manner each substructure becomes more structurally and functionally independent from the other. Forces in each of walls 180 are capable of being transmitted more directly to the portion of the sole 115 from which the walls extend as opposed to being communicated along the full-length of the sides of sole 115. Flexibility of unitary support structure 110 at or about defined regions of the sole 115 may be engineered to reside between the discrete substructures or in locations coinciding therewith. When substructures of the unitary support structure 110 correspond to the natural partitioned regions (or preferred ranges thereof) of the foot 600 such as at the heel, toe, and mid regions 670, 660, and 680; the desired natural movement of the foot 600 may also be accommodated to enhance or facilitate the desired performance of the article of footwear 1. Thus, when the substructure formed by each or both of walls 180 is partitioned at locations configured to reside generally between the toe and mid regions 660, 680 of the foot 600 and between the heel and mid regions 670, 680 of the foot, the desired relative movement between those regions may be facilitated because the partitions would facilitate flex in the unitary support structure 110 between those regions. Similarly, when those partitioned substructures correspond to flexural points or substructures of the blade holder 300 and/or blade 400, the desired flexibility or flex of those components may also be facilitated or otherwise controlled. By configuring or otherwise constructing walls 180 to be relatively stiff along their plane (e.g., in the longitudinal and perpendicular directions), forces along the plane of the walls are capable of being efficiently transferred to the sole 115. In addition, by forming walls 180 to include regions of relatively increased load carrying capacity in a direction generally normal to their planar formation, lateral support to the foot may be varied, which may further accommodate or control lateral flex in the foot 600 by creating regions of greater lateral flexibility in the unitary support structure 110. The portions of walls 180 formed with increased load carrying capacity in a direction generally normal to their planar formation are capable of providing: (a) greater strength to anchor the wall relative to the underlying area of the sole 115 from which it extends, (b) greater protection to sensitive regions of the foot 600 such as about the sides of the metatarsal bones and the arch of the foot 650, and (c) improved efficiency in transmitting the forces to the sole 115. Areas of relatively lesser load carrying capacity, for example in an upper region of walls 180, may provide or facilitate greater lateral flex thereto (i.e., flex that is generally normal to the plane of the wall) and hence be more amenable to conforming about the top surface of the mid region 680 of the foot 600 when secured thereto. Moreover, by configuring walls 180 to include a longitudinally extending concavity having an upper region that extends inwardly over the sole 115, each of walls 180 is capable of having a greater degree of flexibility inwardly than outwardly, which may further improve fit and performance of the article of footwear 1.

I. Upper Portion, Foot Bed and Heel Cushion

Once the unitary support structure 110 is formed, the upper portion 500, which is preferably constructed with multiple layers of generally pliable materials, is positioned on the unitary support structure 110 and attached thereto so as to generally conform to the inner and outer surfaces of the unitary support structure 110 to provide comfort, fit and protection to the foot 600 similar to that of a lasted article of footwear. In addition, the upper portion 500 in the preferred implementations is configured to extend beyond the perimeter of the side wall structures (e.g., 160, 170, and 180) that form the unitary support structure 110 so as to further encapsulate the foot 600 and provide means for lacing or securing the boot 100 to: the foot 600. Thus, the upper portion 500 not only serves to provide fit, comfort and protection but also serves to further encapsulate the foot 600 and provide a means for lacing or securing the boot 100 to the foot 600, thereby creating a hybrid footwear construction; employing on the one hand a generally rigidly formed although flexible molded unitary support structure 110 and on the other hand an upper portion 500, which is effectively molded or formed about the unitary support structure 110 to provide or augment the structural functionality of the unitary support structure 110 thereby making it more similar in feel, comfort and performance to that of a lasted article footwear. Once the upper portion 500 is secured to the unitary support structure 110, the heel cushion 850 and foot bed 800 are inserted, one on top of the other, to reside over the sole 115.

As illustrated in the drawings of the preferred implementations, particularly the exploded diagrams of FIGS. 6, 11, 16, 21, and 27, the upper portion 500 generally comprises: (1) an internal liner 505, which may be comprised of one or more internal liner panels or components, (2) an external trim facing 510, which also may be comprised of one or more external trim facing panels or components, (3) a tongue component 515, and (4) eyelets 520 that extend through the internal liner and the external trim facing 505, 510 to facilitate lacing 1000 of the boot 100 to the foot 600. A more detailed discussion of each of these components is set forth in the following subsections.

A. Internal Liner

In the preferred implementations illustrated in FIGS. 5-24, 27, the internal liner 505 is comprised of generally two internal liner panel components or regions—an ankle region panel and a foot region cavity panel. The ankle region panel is generally configured to reside at and around the ankle on the medial and lateral sides of the foot 600 so as to generally correspond to the ankle counter 230 portion of walls 160; as illustrated in FIGS. 6, 11, 16, and 21. In the preferred implementations illustrated in FIGS. 5-24 and more particularly in FIGS. 6, 11, 16, and 21, the foot region cavity panel is configured to extend, on the medial and lateral sides, rearwardly from the posterior regions of the toe cap formed by walls 170 to the back end 210 the unitary support structure 110 formed by walls 160 such that the upper extent of the posterior end region of the foot region cavity panel merges with the lower extent of the ankle region panel on the medial and lateral sides to form the totality of internal liner 505. In contrast, in the preferred implementation illustrated in FIG. 27, the foot region cavity panel component of the internal liner 505—although also configured to extend, on the medial and lateral sides, rearwardly from the posterior regions of the toe cap formed by walls 170 to the back end 210 of the unitary support structure 110 formed by walls 160—is configured to overlie (or alternatively incorporate) the ankle region panel (shown in FIGS. 6, 11, 16, 21), rather than merging therewith. Hence, in the construction illustrated in FIG. 27 wherein the foot region cavity panel is configured to overlie the ankle region panel; the foot region cavity panel would be nearer the wearer than the ankle region panel, which would reside nearer to the unitary support structure 110. Further, as previously noted, the internal liner panels 505 are preferably configured to extend beyond the upwardly facing edges 169, 189, and 179 of walls 160, 180, and 170, respectively, so that they may overlie, in some amount, additional areas of the upper surface 690 of the foot 600 that are not directly covered by the unitary support structure 110. In essence, when attached to the unitary support structure 110, the internal liner 505 preferably forms extensions of the walls 160, 180 and 170 that serve to further encapsulate the foot 600 of the intended wearer.

Figure 27:
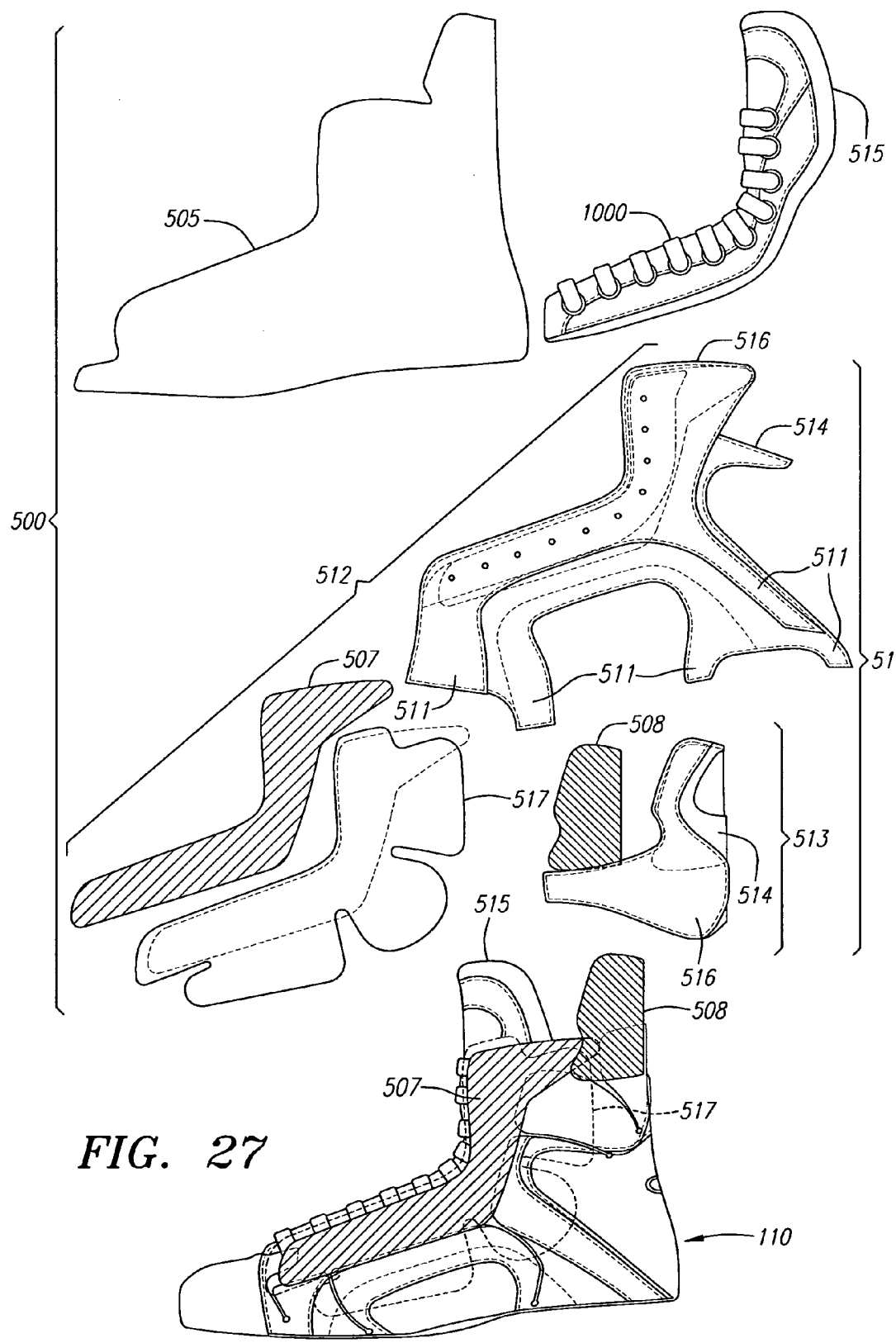
FIG. 27 is a diagram of an exploded lateral side view of an article of footwear similar to that illustrated in FIGS. 5-9, revealing in more detail a presently preferred configuration and construction of the upper portion 500 of the article of footwear vis-à-vis the unitary support structure illustrated in FIGS. 5-9.

Additionally, it should be understood that although the internal liner 505 in the preferred implementations depicted in FIGS. 5-24 is formed as a multi-part construction comprising a medial foot cavity panel, a lateral foot cavity panel and an ankle region panel that extends from the medial and lateral sides to cover the ankle region of the foot 600; the internal liner 505 may be formed as a single unit similar in configuration to the internal liner component 505 illustrated in FIG. 27. Such an internal liner 505 may simplify attachment to the unitary support structure 110 by facilitating the insertion and attachment to the unitary support structure 110 as a single unit. Moreover, it is contemplated that the internal liner 505 may be configured in the form of a detachable or unattached foot covering or sock that is adapted to being placed over the foot 600 prior to the foot entering the boot 100—as opposed to being attached in a more permanent manner to the unitary support structure 110 and the external trim panels 510. In such a configuration, it may or may not be preferable for the internal liner 505 to include eyelets 520

With respect to the construction materials of the internal liner 505, it is generally preferable that the internal liner 505 be constructed of foam or other cushioning material(s) covered by one or more layers of synthetic or natural textile materials. The thickness and density of the foam or cushioning material may be varied to provide additional cushioning or to reflect the contour of the foot 600 in certain regions. For example, the ankle region panel may be formed with additional or relatively thicker cushioning material and may be configured to reflect the contour of the ankle and/or ankle pocket 235 that is formed in walls 160 of the unitary support structure 110; while the remaining regions of the internal liner 505 may be formed with relatively less or thinner cushioning material. It is contemplated, however, that the internal liner 505 may include heat or pressure formable materials that are capable of conforming to the foot of the wearer with use, or heat and/or pressure. Moreover, it is contemplated that air cavities or bladders may be formed internally or external to the internal liner 505. Such heat or pressure forming materials and/or air bladders or cavities may be configured to be positioned around the ankle, between the ankle and the lower portions of the heel region 670, along the medial and/or lateral sides of the foot 600, above the upper and/or lower surfaces of the mid-region 680 of the foot 600, or on the sides or above or below the toe region 660 of the foot 600, or in any combination of the foregoing.

Hence, the internal liner 505 is preferably configured to contour or otherwise be amenable to conforming to the internal side wall surfaces 160, 180, and 170 of the unitary support structure 110 to provide comfort and additional cushioning and protection to the foot 600. In addition, the internal liner 505 may be configured to: (a) further encapsulates the foot 600 by extending beyond the outer perimeter of the side walls (e.g., 160, 170, and 180) that comprise the unitary support structure 110, and (b) provide or otherwise facilitate securing the boot 100 to the foot 600.

B. External Trim

The external trim facing 510 in the preferred implementations is comprised of a an anterior-substructure 512 and a posterior substructure 513. The anterior and posterior substructures may be preferably comprised of first and second panels 514 and 516 (illustrated in FIG. 27), which may be preferably formed of a durable although generally pliable woven or non-woven synthetic and/or natural textile material such as those formed of polyurethane or leather. In addition, each substructure 512 and 513 may also include one or more rigid members or panels (e.g., 507, 508 illustrated in FIG. 27). Facing reinforcement panels 507, 508 may be interposed: (a) within or between the other panels that comprise the external trim facing 510, (b) within or between the external trim facing 510 and the internal liner 505, and/or (c) between the panels that form the internal liner 505. In addition the external trim facing 510 may include a relatively thin tear resistant panel 517 (illustrated in FIG. 27).

The panels of the external trim facing 510, in the preferred implementations, are generally co-extensive in configuration with one another at their upper and forward facing edges and with the internal liner 505 as they extend from the front to the rear portions of the unitary support structure 110, on the medial and lateral sides, beyond the perimeter of the side walls (e.g., 160, 170, and 180) that comprise the unitary support structure. It is noted, however, that in the preferred implementations the external trim facings 510 are not configured to uniformly extend to and along the perimeter of the sole 115. Rather, the external trim facings 510 in the preferred implementations are configured to extend to the sole 115 at discrete locations via external trim facing extensions 511, which in the preferred implementations extend from the one or more panels that form the anterior substructure 512 of the trim facing 510. The external trim facing 510 is preferably configured to extend over and cover the partitions and slots (e.g., 161, 162, 163, 164, 271, 272, and 273) that are formed between and within walls 160, 170, and 180, thereby accenting the partitioned configuration of the unitary support structure 110 and its preferred composite structure. It is contemplated, however, that one or more of the partitions or slots (e.g., 161, 162, 163, 164, 271, 272, and 273) or portions thereof may not be covered externally or internally by the external trim facing 510 and/or the internal liner 505. Such a configuration is capable of accentuating the partitions in a manner that may be preferable aesthetically and/or functionally in that the consumer may be able to directly view the partitions. The lower ends of the external trim facing extensions 511 may be, but do not need to be, dimensioned so that they can be wrapped over the bottom perimeter of the sole 115 and sandwiched between the blade holder 300 and bottom of the sole 115.

Thus, in a preferred implementations, the external trim facing 510 and internal liner 505 are generally pliable components that conform to the external and internal configuration of the unitary support structure 110 and that are configured to extend beyond the upper edges of the unitary support structure 110 generally co-extensively with one another to form discrete wall structures that serve to further encapsulate and secure the foot 600.

C. Eyelets

In the preferred implementations, eyelet holes 520 are formed to extend through the panels that comprise the internal liner 505 and external trim facing 510 generally around their perimeter upper and forward facing edge regions to facilitate lacing 1000. Other mechanical securing means, such as buckles or the like are also contemplated. It is noted, however, that while the preferred implementations are configured such that eyelets 520 are formed in the upper portion 500 as opposed to being formed in the unitary support structure 110; it should be understood that the eyelets 520 or other securing means may be formed, in whole or in part, through or directly in the unitary support structure 110. Hence, it is contemplated that side walls 160, 180, and/or 170 of the unitary support structure 110 may include eyelets or other securing means. In order to facilitate placement of the eyelets 520 or other securing means, one or more of the side wall structures (e.g., 160, 170, and 180) may be configured to extended further around the foot and/or leg to facilitate the desired positioning of the eyelets 520 or securing means in one or more of those wall structures.

D. Tongue Component

The preferred implementations, as previously noted, also include a tongue component 515 that is attached at its anterior end to the toe cap portion 200 and is also preferably formed of cushioning materials. In the preferred implementations the tongue 515 may be contoured to reflect the upper surface of the foot 690 so as to provide a low profile fit over the underlying foot 600.

E. An Exemplary Preferred Construction and Configuration of the Upper Portion

FIG. 27 is an exploded view diagram of a presently preferred and exemplary construction and configuration of the upper portion 500. Illustrated in FIG. 27 are the following components of the upper portion 500:

| Reference Numeral | Component | Presently Preferred Construction Material |
| --- | --- | --- |
| 505 | Internal Liner | Cushioning materials in one or more discrete regions of the unitary support structure such as the regions configured to cover the ankle and to a lesser amount around the remaining portion of the foot covered or laminated on the side most proximate to the foot with layers of pliable synthetic or natural textile or fabric materials. The pliable textile exterior preferably has a thickness of 0.75 to 1.5 millimeters; the cushioning material is preferably formed of a foam or similar material and preferably has a thickness of 1 to 1.5 millimeters; whereas the cushioning material that forms the ankle region component of the internal liner is preferably formed of molded or die cut latex foam that contours the ankle and the internal configuration of wall 160 and having a varying thickness approximately between 3 to 13 millimeters. |
| 510 | External Trim Facing | See description of the relevant sub-elements described below. |
| 512 | Anterior Substructure of External Trim Facing 510 | See description of the relevant sub-elements described below. |
| 513 | Posterior Substructure of External Trim Facing 510 | See description of the sub-elements described below. |
| 514, 516 | Second and First Panels of the Anterior and Posterior Substructures of the External Trim Facing 510 | The first and second panels of the anterior and posterior substructures are preferably constructed of a non-woven micro-fiber synthetic pliable textile or fabric having a thickness of approximately 1.0 to 2.25 millimeters and having a polyurethane outer coating or film that is texturized or embossed to look similar to leather or other desirable look. Such materials are commonly employed in the industry as a synthetic replacement for leather and are generally more consistently formed than leather in that they are not formed of animal skins. Abrasion resistance is similar to or better than leather.<br>It is preferable that each of the first and second panels is backed, via heat press lamination or other appropriate means, with a polymer sheet that generally resides on the opposing side of the panel from that of the polyurethane outer coating |

-continued

| Reference Numeral | Component | Presently Preferred Construction Material |
|---|---|---|
| | | or film and that comprises a heat activated adhesive. Such a backing material is manufactured by Texon International of the United Kingdom under the name Tufflex E-518. |
| 517 | External Trim Facing Tear Resistant Panel of the Anterior Substructure of the External Trim Facing 510 | A thin pliable loosely woven tear resistant textile or fabric material substrate having a thin "vinyl" or "rubber" type exterior coating or film on both the interior and exterior sides thereof and a total thickness of approximately 0.5 millimeter, such as that presently sold by J. Ennis Fabric, Toronto, Canada under the name Sampson IV-72. |
| 507 | Facing Reinforcement Panel Member of the Anterior Substructure of the External Trim Facing 510 | A thin relatively rigidly formed, although heat formable, sheet of non-woven synthetic material or materials having a thickness of approximately 1.25 millimeters with a film or external layer of heat activated adhesive; such as that sold by Texon International of the United Kingdom under the name Formo-500 with a heat activated adhesive on one side. |
| 508 | Facing Reinforcement Panel Member of the Posterior Substructure of the External Trim Facing 510 | Same as facing reinforcement panel member 507 of the anterior substructure of the external trim facing 510 described above. |
| 515, 1000 | Tongue and Laces | Tongue formed of cushioning materials covered by one or more layers of pliable synthetic or natural textiles or fabrics. Laces may be formed of commonly known materials. |

In construction, the first and second panels 514, 516 of the anterior and posterior substructures 512, 513 of the external trim facing 510 are stitched and/or glued together at their upward regions so that they are generally left free from mechanically attachment to each other at their lower regions. The outer surface of the facing reinforcement panel member 507 is then adhesively and/or mechanically attached to the first and second panels 514, 516 of the anterior substructure 512. In the preferred implementation the facing reinforcement panel member 507 is adhesively attached to the first and second panels 514, 516 of the anterior substructure 512 via a heat press process that activates the heat activated film on the facing reinforcement panel member 507. The external trim facing tear resistant panel 517 of the anterior substructure 512 of the external trim facing 510 is then glued and/or mechanically attached to the reinforcement panel member 507 generally around its perimeter and/or to the upper regions of the first and second panels 514, 516 of the anterior substructure 512. The first and second panels 514, 516 of the anterior substructure 512 together with reinforcement panel member 507 and the external trim facing tear resistant panel 517 are fitted over the unitary support structure 110 at the desired location so that: (a) the first and second panels 514, 516 and reinforcement panel member 507 reside over the exterior formation of the wall structures that form the unitary support structure 110, (b) the external trim facing tear resistant panel 517, on the other hand is fitted so that resides over the interior formation of the of the wall structures that form the unitary support structure 110 and (c) the lower regions of the facing reinforcement panel member 507 is fitted so that it slightly overlaps the adjacent upper perimeters of the wall structures that form the unitary support structure 110. Once positioned the anterior substructure 512 panels are glued and/or mechanically secured to the unitary support structure 110.

The facing reinforcement panel member 508 is adhesively and or mechanically attached to the first and second external trim panels 514, 516 of the posterior substructure 513 of the external trim facing 510 via adhesive and/or mechanical means. In the preferred implementation, the facing reinforcement panel member 508 is adhesively attached to the first and second panels 514, 516 of the posterior substructure 512 via a heat press process that activates the heat activated film on the facing reinforcement panel member 508. The posterior substructure 513 of external trim facing 510 comprising the first and second panels 514, 516 of the posterior substructure 513 together with the facing reinforcement panel member 508 are then positioned about the rearward region of the unitary support structure 110 so that an anterior portion of facing reinforcement panel 508 overlaps the posterior portion of the facing reinforcement panel 507 as illustrated in FIG. 27. Once positioned, the posterior substructure 513 and/or facing reinforcement panel member 508 are adhesively and/or mechanically attached to the unitary support structure 110.

The internal liner 505 together with any ankle region component is then inserted into the unitary support structure 110 and positioned in the desired location. The outer upward extensions of the internal liner 505 and external trim panels 510 and facing reinforcement panels 507, 508 are stitched to one another about their co-extensive outer perimeters and the tongue component 515 is attached to the exterior surface of the toe cap 200. In addition, eyelet holes 520 are formed in the internal liner 505 and external trim panels together with facing reinforcement panels 507 and 508 so that laces 1000 may pass therethrough to facilitate securing the boot 100 to the foot 600. Moreover, as previously noted, the lower extensions 511 of the external trim panels 510 may be wrapped about the bottom of the sole 115 and sandwiched between the pedestals formed by the blade holder 300 and the bottom of the sole 115 and secured thereto by one or more of the rivets 900 that secure the blade holder 300. Once the upper 500 is secured to the unitary support structure 110 the heel cushion 850 and the foot bed 800 are placed within the foot cavity. It should be understood from the above description that attachment of the upper portion 500 is preferably accomplished without mechanically impairing the integrity of the unitary support structure 110. Thus, stitching (whether employed before or after the upper portion 500 is fitted to the unitary support structure 110) is generally limited to stitches extending through the various components comprising the upper portion 500; whereas adhesive is generally employed to attach the upper portion 500 to the adjacent regions of the unitary support structure 110. In addition, it is presently contemplated that the toe box substructure of the unitary support structure 110 be covered with and abrasive resistant textile material about its sides and/or top portions to protect, in this high impact region, the underlying composite structure of the unitary support structure 110.

IV. Methods of Manufacture

Various methods may be employed to manufacture and construct the unitary support structure 110. Those methods together with the resultant product manufactured thereby constitute yet another aspect of the invention disclosure. Presently preferred methods are generally set forth in FIG. 25. Generally, the unitary support structure 110 is formed by overlaying one or more plies or layers of fibers in preferably one or more defined orientations and one or more preferred lay-ups over a three-dimensional male mold to form a pre-form of the unitary support structure; placing the pre-form in a female mold having the desired shape of the exterior walls of the desired form of the unitary support structure 110; curing the pre-form by application of heat and pressure; and removing, finishing and incorporating the cured pre-form as a unitary support structure in an article of footwear. A more detailed discussion of the steps of preferred methods is set forth below.

A. Three-Dimensional Male Mold

1. General Overview

A three-dimensional male mold is prepared having an external shape reflecting or otherwise capable of defining the desired internal shape of the cavity 111 defined by the wall structures (e.g., 115, 160, 170, and 180) that comprise the unitary support structure 110 (step 2000). Accordingly, it is preferable that the exterior shape of the three-dimensional male mold of step 2000 be configured to reflect the exterior or outer formation of the foot 600 of the intended wearer as well as defining the internal cavity 111 of the unitary support structure 110. In addition, the three-dimensional male mold may be formed of materials or otherwise configured so that it is capable of being reusable or may be formed or otherwise configured for single use applications. Furthermore, the three-dimensional male mold may itself comprise in whole or in part the heat expandable component that is placed into the pre-form prior to curing to facilitate curing and then removed after curing if necessary (steps 2050 and 2080). Accordingly, it should be understood that the three-dimensional male mold may be formed of materials or otherwise configured to be removed from the pre-form construct before or after the pre-form construct is cured. With the foregoing principles in mind, various preferred embodiments of the three-dimensional male mold are discussed by way of example.

2. Three-Dimensional Male Mold Comprising an Elastic Component

A first exemplary preferred embodiment of the three-dimensional male mold comprises a structure made (in whole or in part) of elastic material (step 2001) that is capable of being removed from the uncured pre-form construct (step 2030) of the unitary support structure 110 prior to curing (step 2060) thereof and preferably, although not necessarily, subsequent to stabilizing the uncured pre-form (step 2020). Furthermore, it is preferable, although not necessary, that the three-dimensional male mold be comprised of an elastic material having sufficient resiliency to maintain its initial externally configured shape after removal from the pre-form (e.g., step 2030) so that it may be reused without significant reconfiguring.

Generally, presently preferred elastic materials include silicone and rubber or any other material that is sufficiently pliable or shapeable to facilitate removal without significantly disrupting the shape of the pre-form construct prior to curing. More particularly, the following materials listed in the table below have been found suitable for forming an elastic three-dimensional male mold with sufficient resiliency and elasticity to be capable of: (a) defining the internal cavity of the unitary support structure, (b) being removed from the pre-from lay-up after stabilization of the uncured pre-form construct, and (c) being reused.

| Generic Name/ Description of Material | Name of Material | Manufacturer | Notable Material Properties |
| --- | --- | --- | --- |
| Cured molded Silicone | (a) Silicone RTV | (a) Circle K Products, Temecula, CA; | (a) 40 Shore A hardness, ASTM D412 Percent Elongation: 225 +/− 30% (after cure) |
| | (b) RTV Silicone | (b) Dow Corning, Midland, Michigan | (b) 56 Shore A hardness (after cure) |
| Polybutadiene Rubber preferably cross-linked with a an agent and peroxide to increase resiliency | Cariflex BR 1220 cross linked with a suitable cross-linking agent and peroxide to increase resiliency | H. Muehlstein & Company, Norwalk Connecticut, USA. | |

3. Three-Dimensional Male Mold Comprising A Heat Expandable Component

A second exemplary preferred embodiment of the three-dimensional male mold comprises a heat expandable component (step 2002) having suitable expansion characteristics to facilitate curing the pre-form (step 2070). Employment of a three-dimensional male mold that comprises a heat expandable component may obviate the need for steps 2030 and 2050 (i.e., removing the three-dimensional male mold from the pre-form and placing a heat expandable component within the interior walls of the of the pre-form, respectively) because the three-dimensional male mold itself would also be capable of being employed as the heat expandable component that is placed within the interior walls of the pre-form (step 2050)

prior to curing and which expands during curing (step 2060). Furthermore, it is contemplated that the heat expandable component that comprises the three-dimensional male mold may be reused or be employed in a single use application.

The heat expandable component may form all or a portion of the three-dimensional male mold. In a preferred construction, the expandable component may comprise an expandable bladder filled with a heat expandable fluid, gas, or solid. Alternatively, it may be formed of a heat expandable solid material with or without a bladder. Suitable heat expandable solid materials include, for example, expanding silicone previously described as well-as a heat expandable polyurethane foam. One advantage of employing a bladder, however, is that the material that forms the bladder wall may facilitate or otherwise aid in removal of the three-dimensional male mold from the uncured pre-form and/or the cured pre-form construct.

As noted above it should be understood that the heat expandable component should have suitable expansion characteristics. In this regard, it is preferable that the heat expandable component (whether it forms the three-dimensional male mold or not) be capable of expanding at least five percent (5%) at a temperature between 200 and 300 degrees Fahrenheit and one atmosphere of pressure; even more preferably be capable of expanding at least ten percent (10%) at a temperature between 200 and 300 degrees Fahrenheit and one atmosphere of pressure, and yet even more preferably be capable of expanding at least fifteen percent (15%) at a temperature between 200 and 300 degrees Fahrenheit and one atmosphere of pressure. The foregoing preferred expansions are calculated as percentages of increase in volume of the heat expandable component relative to the volume of the heat expandable component measured at 60 degrees Fahrenheit and one atmosphere of pressure.

Employment of a heat expandable component with appropriate expansion characteristics during curing is necessary in order to insure that the fibers and resin that form the walls of the pre-form construct, upon curing, are sufficiently compressed to conform to the walls of the female mold (step 2060). In addition, it is generally preferable that the heat expandable component (whether it forms the three-dimensional male mold or not) be capable of or otherwise adapted to expanding generally uniformly when heated so as to facilitate a more even distribution of the internal pressure that is generated by the heat expandable component during heating. It is noted, that providing a hollow within the component may facilitate the proper or desired expansion.

4. Three-Dimensional Male Mold Comprising A Multi-Part Assembly

A third exemplary preferred embodiment of the three-dimensional male mold comprises a multi-part assembly that is adapted to being disassembled in a manner that facilitates its removal from the pre-form construct of the unitary support structure 110, preferably without significantly disrupting the shape of the pre-form construct prior to curing. Such a multi-part assembly may be formed of various materials including metals, coated metals (e.g., Teflon coated metal), woods, coated woods (such as woods coated or having a film overlay of lacquer or the like), plastics, foam, rubber, silcone, or a combination of one or more of the foregoing.

The multi-part assembly may be configured as a three-dimensional puzzle with or without hinges. For example, it is contemplated that the multi-part assembly be comprised of an inner block interposed between externally positioned blocks or members that form the desired external formation of the three-dimensional male mold. Removal of the inner block facilitates removal of the externally positioned blocks or wall members and hence removal of the three-dimensional male mold from the pre-form lay-up.

Alternatively, it is contemplated that the multi-part assembly be comprised of an internal cavity defined by multiple wall members that are movable relative to one another and that form the external formation of the three-dimensional male mold. The ability of one or more of the multiple wall members to move relative to one or more of the other wall members facilitates removal of the three-dimensional male mold from the pre-form lay-up.

5. Three-Dimensional Male Mold Comprising A Dissolvable Material

A fourth exemplary embodiment of a three-dimensional male mold comprises a construction that is formed in whole or in part of material that is dissolvable while disposed within the uncured or cured pre-form construct of the unitary support structure 110. The dissolving of the three-dimensional male mold, in whole or in part, facilitates removal of the mold from the pre-form construct. Notably, as may be surmised from the foregoing, it is to be understood that when a three-dimensional male mold comprises a dissolvable material, the step of removing the male mold via dissolving may occur before or after the step of curing 2060. When the step of removing the male mold via dissolving occurs after the step of curing 2060, the male mold is preferably not only comprised of a dissolvable material but also comprises a heat expandable component to facilitate curing of the pre-form.

Suitable dissolvable materials and solvents are set forth in the table below:

| Generic Name/ Description of Material | Name of Material | Manufacturer | Suitable Solvent |
| --- | --- | --- | --- |
| Polystyrene | Styrofoam | Dow Chemical Corp. | Acetone or the like |

In addition, it is contemplated that the male mold may be formed of a material that is phase transformable from solid to liquid by application of heat; for example, a male mold comprising in whole or in part of ice or wax, removal of which may be facilitated from the pre-form construct via application of heat, either before or during curing that melts the ice or wax.

Furthermore, when the three-dimensional male mold is formed only partially with dissolvable or heat transformable materials it is contemplated that the undissolved or un-transformed portion of the three-dimensional male mold be reused. For example, the three-dimensional male mold may be formed internally from a material that is resistant to dissolving and externally with a material that is less resistant to dissolving. When the outer or external portion of the three-dimensional male mold is dissolved the internal component of the three-dimensional male mold may be removed and reconditioned by overlaying it with the dissolvable external layer. In this manner the internal portion of the three-dimensional male mold may be reused.

6. Additional Remarks Regarding the Three-Dimensional Male Mold

Thus, broadly speaking the three-dimensional male mold is preferably made of materials that are suitable to providing a sufficiently firm external surface that is configured to define the desired shape of the internal cavity 111 that is formed by the unitary support structure 110 while at the same time being configured or otherwise formed so that it may be removed from the pre-form construct, whether before or after curing.

In the preferred embodiments, the three-dimensional male mold may be configured or constructed so that it may be reused as a three-dimensional male mold. In addition, the three-dimensional male mold may be employed as the heat expandable component that resides within the inner walls of the pre-form to facilitate curing. When so employed, it is preferable that the three-dimensional male mold meet the previously noted expansion characteristics. The manufacturing process employed together with the configuration of the pre-form of the unitary support structure are also factors that may affect the desirability of employing any given three-dimensional male mold construction or configuration. For example, if the pre-form of the unitary support structure 110 is formed with a sufficiently large opening so that the three-dimensional male mold may be removed without either deformation or disassembly of the three-dimensional male mold, then a three-dimensional male mold comprising either an elastic component or multi-part assembly may be less desirable or necessary. Should, for example, the process employed include the step of removing the three-dimensional male mold prior to curing, then it may be preferable for the three-dimensional male mold to be formed or configured so that it is removable from the pre-cured pre-form without significant deformation of the pre-form—hence an elastic component or multi-part assembly or other removable three-dimensional male mold construction or configuration may be preferred. If, for example, the three-dimensional male mold is employed to provide the internal pressure to the pre-form during curing, then it may be preferable for the three-dimensional male mold to be formed or otherwise configured to function as a suitable expandable component—hence it may be preferable for the three-dimensional male mold be formed as an expandable bladder or formed of expandable components or materials, preferably having the above-noted preferred expansion characteristics.

B. Overlaying the Three-Dimensional Male Mold with Fibers To Create A Pre-Form of the Unitary Support Structure Once the three-dimensional male mold is prepared (step 2000), one or more plies of fibers, preferably comprising substantially continuous fibers, are overlaid in the desired orientation over the three-dimensional male mold to create an uncured pre-form construct of the unitary support structure (step 2010). For the purposes of this disclosure, a fiber having a length that is over 10 times its diameter is considered to be a "substantially continuous fiber." It is preferable, however, that the fibers have a length that is over 15 times their diameter, it is even more preferable that the fibers have a length that is over 20 times their diameter; it is yet even more preferable that the fibers have a length that is over 25 times their diameter; it is yet even more preferable that the fibers have a length that is over 30 times their diameter. Thus, as a general proposition, it is more preferable to employ fibers having a larger length/diameter ratio than fibers having a smaller length/diameter ratio. In addition it is preferable that the fiber have a diameter of less than 0.25 millimeters.

Suitable fibers that may be employed include carbon fiber, aramid (such as Kevlar™ manufactured by Dupont Corporation), glass, polyethylene (such as Spectra™ manufactured by Allied Signal Corporation), ceramic (such as Nextel™ manufactured by 3m Corporation), boron, quartz, polyester or any other fiber that may provide individually or in combination with other fibers the desired strength or physical attributes.

In the preferred construction, the fibers are preferably not randomly oriented in the ply. Rather it is preferred that the plies be formed of groups of fibers aligned with one another in defined orientations so that control may be exercised during manufacturing over the orientation of the fibers. It is thus contemplated that a ply may be formed of uni-directional fibers oriented generally parallel to one another. In addition, it is contemplated that a ply may be formed of a first group of fibers oriented in a first defined direction and a second group of fibers oriented in a second defined direction that is different than the first defined direction. Such plies are commonly referred to as bi-directional and include for example woven or stitched groups of fibers oriented at zero and ninety degrees relative to one another. Furthermore, it is contemplated that a ply may be formed of groups of fibers oriented in greater than two defined directions relative to each other. Such plies are commonly referred to as multi-directional and include for example woven or stitched groups of fibers oriented at zero, ninety, and forty-five degrees. Thus, it should be understood that the plies may be woven with various weaves, including plain, basket, twill, satin, and/or leno weaves. Furthermore, it should be understood that the plies may be comprised of twisted or untwisted yarn or filaments of fibers.

Moreover, one or more plies of fibers may be in the form of a sheet, mat, fabric or a tape. When in the form of a tape, the ply may be pre-impregnated with a suitable resin matrix. Applicants have found that a suitable material includes uni-directional carbon fiber tape pre-impregnated with an epoxy resin. Such pre-impregnated fiber tapes are manufactured by Hexcel Corporation of Salt Lake City, Utah and S & P Systems of San Diego, Calif. Another suitable material includes unidirectional glass fiber tape pre-impregnated with epoxy, also manufactured by Hexcel Corporation. Yet another suitable material includes uni-directional Kevlar™ (aramid) fiber tape pre-impregnated with epoxy, also manufactured by Hexcel Corporation. In each of these tapes, the resin that is pre-impregnated in the plies comprises the adhesive that forms the ply into a tape.

The resin matrix may be a thermoset or thermoplastic material. Furthermore, it may comprise in part or in whole polymers of: (a) polyester, (b) vinyl, (c) ester, (d) epoxy, or (e) polycyanate; or any other suitable material known in the art to be capable of encapsulating the employed fiber or fibers in a hardened matrix when cured so that load may be transferred between the fibers via the hardened resin matrix.

In the preferred implementations, the construction of the unitary support structure 110 of FIGS. 5-24 comprises fibers (or plies comprising groups of aligned fibers) laid over the three-dimensional male mold in one or more defined orientations within a hardened resin matrix. The strength, rigidity, and flexibility in any given direction, of any given region of the unitary support structure 110, may thus be controlled via the wall construction of the unitary support structure 110. Because the load carrying capacity of a given wall structure is directly affected by the orientation of the fibers forming the wall structure; the greatest load carrying capacity of a wall structure constructed of aligned fibers is in the same direction as the orientation of the fibers. Accordingly, a vertically oriented fiber will generally carry the greatest load in the vertical direction; while a longitudinally oriented fiber will generally carry the greatest load in the longitudinal direction. Moreover, a fiber that is angled will generally be capable of carrying a pro-rated load commensurate with its relative angle. For example, if the fiber is angled at +/−45 degrees relative to the longitudinal and vertical directions it will generally be capable of carrying approximately the same load in the longitudinal direction as the vertical direction. A fiber angled at +/−60 degrees from the longitudinal direction (or +/−30 degrees from the vertical direction) will generally be capable of carrying a greater load in the vertical direction than the longitudinal direction. The load may be approximated by pro-rating the relative angle of the fiber into its vertical and longitudinal components. Hence, in the foregoing example of the 60 degree oriented fiber, the fiber would be capable of carrying approximately a 33 percent ((60-45)/45) greater load in the vertical direction than the longitudinal direction relative to what the fiber would have been capable of carrying when oriented at 45 degrees. Thus, it is contemplated that the orientation of the fibers in a given region of the unitary support structure 110 may provide or otherwise adjust or control the material and functional properties of the wall structure region.

In addition, the orientation of the fibers in a given planar region of the unitary support structure 110 also affects the ability of the unitary support structure 110 to resist forces generally normal to the planar formation of that region. The following example provides further explanation. Suppose a wall structure is formed as a square wall component having a longitudinal length (L) that is equal to its height (H) and a width (W) that is much smaller than its height (i.e., L=H; H and L>>W). Hence, the wall structure is a generally planar structure that is defined at its perimeter by its length (L) and Height (H). Further suppose that: (a) the planar wall was formed of unidirectional fibers (disposed within a hardened resin matrix) oriented along the plane of the wall in a direction that is generally parallel to the longitudinal length (L) of the wall, (b) that wall structure is firmly secured or clamped along its length, and (c) a force is applied in a direction generally normal to its plane. In addition, suppose that, in a second scenario, that same wall structure is firmly secured or clamped along its height (rather than being clamped along its length) and the same force was applied in the same position and direction (i.e., in a direction normal to its plane). The flexural rigidity (i.e., force/displacement of a clamped beam) of the wall structure would be greater in the latter scenario than in the former scenario. In other words the wall would bend more per unit force in the first scenario than the second scenario. This is so because the forces would be transmitted along the length of the fibers in the second scenario; whereas a greater amount of the forces would be transferred between fibers via the hardened resin matrix in the first scenario, which would tend to negate the additional strength of the structure that is imparted by the fibers.

Additional fibers or plies of fibers may be laid in discrete regions of the unitary support structure 110 to provide greater load carrying capacity in one or more directions. For example, in the preferred implementations depicted in FIGS. 5-24, additional plies of fibers may be laid in the reinforced areas (indicated by the shaded areas) on the side walls 160, 170, and 180 and the sole 115, so as to provide additional stiffness, strength or rigidity thereto. Adding additional plies of fibers as a general proposition increases the load carrying capacity of the wall structure not only along the wall's planar formation (e.g., longitudinal and vertical directions commensurate with the orientation of the fibers), but also in a direction generally normal to the planar formation of the wall, as previously described. The relative amount of increase in the load carrying capacity of the wall structure is dependent, as previously described, on the orientation of the fibers that are added to the wall structure.

Thus, it is contemplated that increased lateral flexibility in the unitary support structure 110 at any given or relative region of the unitary support structure 110 may be achieved by configuration and/or construction of the wall—for example by: (a) reducing the thickness of the wall by reducing the number of plies that form that region of the wall, decreasing the number of fibers, and/or decreasing the volume occupied by the fibers cross-sectional area and/or (b) orienting the fibers more parallel to the desired axis over which a greater amount of flexibility is desired. Thus, for example, to increase the lateral rigidity of walls 180 in a given region thereof, the fibers in that region may be oriented more vertically or alternatively additional plies of fibers may be laid in that region. In contrast, to effectuate a greater increase in lateral flexibility of walls 180 or a given region thereof the fibers in that region may be oriented more horizontally or alternatively fewer plies of fibers may be laid in that region. Hence, it is contemplated that both orientation of the fibers and/or the addition or subtraction of fibers may be combined in any given region to obtain the desired functional flexural rigidity of a wall region.

With the foregoing in mind, a more detailed discussion of presently preferred lay-up constructions of the unitary support structure 110 is set forth. As previously noted, certain areas or regions of the unitary support structure 110 are preferably formed or constructed with additional load carrying capacity in one or more directions in order to provide increased strength, stiffness or rigidity in the unitary support structure 110. Those areas or regions are depicted by shading in the preferred implementations depicted in FIGS. 5-24. The additional load carrying capacity may be achieved by variations in configuration or construction, such as employment of additional plies of fibers and/or by orientation of the fibers.

In a preferred construction of the unitary support structure 110, the three-dimensional male mold is overlaid along its sides and lower portions with fibers oriented at or between zero and ninety degrees relative to the longitudinal length of the unitary support structure 110 to form the side walls and sole 115 of the unitary support structure 110. Preferably, one or more plies of fibers is oriented at an angle less than +/−90 degrees relative to the longitudinal length of the unitary support structure 110, yet even more preferable, one or more plies of fibers is oriented at an angle less than +/−60 degrees relative to the longitudinal length of the unitary support structure 110, and even more preferably, one or more plies of fibers is oriented at an angle less than +/−45 degrees relative to the longitudinal length of the unitary support structure 110. It is to be understood that any given side wall or sole region of the unitary support structure 110 may be comprised of multiple plies of fibers that are oriented in the same or in one or more different directions.

The lower portions (i.e., vertically displaced lower regions) of the side walls 160, 170, and 180 and the sole 115 of the unitary support structure 110 may be preferably formed with additional fibers or plies of fibers so that those regions have an increased load carrying capacity relative to non-reinforced regions (e.g., the areas having less load carrying capacity). As previously noted it is preferable that those regions be constructed to have an increased load carrying capacity in both the longitudinal and vertical directions (or in the case of the sole 115 in both the longitudinal and lateral directions) relative to surrounding or adjacent regions (e.g., regions on the side wall residing above the increased load carrying regions) of the unitary support structure 110. The additional plies of fibers may be oriented at the same or different angles as the fibers in adjacent plies. In a preferred construction, for example, the additional plies in the lower regions of walls 160, 170, and 180 and the sole 115 of the unitary support structure 110 comprise fibers oriented at an angle of approximately +/−45 degrees. The non-reinforced regions of the unitary support structure 110 would therefore be relatively more amenable to lateral flex than the reinforced regions. Thus, it is to be understood that one aspect of the disclosure relates to one or more of the side walls 160, 170, and 180 and/or sole 115 being comprised of fibers disposed in a hardened resin matrix wherein a first section or region of the side wall or sole comprises a greater quantity or volume of fibers than a second section of the side wall or sole that is displaced or adjacent to the first section.

As previously generally described, lateral flex (or flex that is normal to the planar formation of the wall structure) in one or more regions of the side walls (e.g., 160, 170, and 180) or the sole 115 of the unitary support structure 110 (for example in the areas in the upper portions of the side walls 160, 170, and 180) may be achieved, in whole or in part, by orientation of the fibers in those regions to achieve greater flexibility. Hence, with regard to the previous example, those regions may comprise one or more plies of fibers oriented at +/−30, +/−15, or 0 (i.e., parallel) degrees relative to the longitudinal length of the unitary support structure 110. Such a construction is capable of increasing the lateral flexibility of that region, as previously described. Thus, it is to be understood that one aspect of the disclosure relates to one or more of the side walls 160, 170, and 180 and/or sole 115 having a first and a second section being comprised of fibers disposed in a hardened resin matrix, wherein the fibers in a first section are oriented at a different angle relative to fibers in a second section. In addition, another aspect of the disclosure relates to one or more of the side walls 160, 170, and 180 and/or sole 115 being comprised of a first and second portion comprising fibers disposed in a hardened resin matrix, wherein the second portion is adjacent or displaced either vertically or longitudinally (or laterally vis-à-vis the sole and the end regions of the side walls 160 and 170) from the first portion and wherein said first portion (or the fibers that comprise the first portion) is constructed of materials that have an elastic modulus normal to the plane of the wall that is less than the elastic modulus normal to the plane of the wall that is formed by the second portion.

In addition, in the preferred implementations the back end portion 210 together with the region extending upwardly therefrom to form the tendon guard 240 may be configured to have relatively less flex, inwardly or outwardly from the sole 115, so as to provide firm support to the back of the foot 600. Accordingly, additional plies of fibers may be added to those regions similar to the lower portions of walls 160, 170, and 180 as previously described. In addition, back end portion 210 and tendon guard 240 may be formed with a greater percentage of vertically oriented fibers than displaced or adjacent portions of wall 160. For example, one or more plies in those regions may be oriented at approximately 90 degrees relative to longitudinal length and the sole 115 of the unitary support structure 110. Thus, it is to be understood that one aspect of the disclosure relates to one or more of the walls of the unitary support structure 110 being comprised of a first and second portion comprising fibers disposed in a hardened resin matrix, wherein the first portion is adjacent or displaced from the second portion and wherein the vertical component of the fibers comprising the first portion (or the fibers that comprise the first portion) is greater than the vertical component of the fibers comprising the second portion.

Moreover, certain regions such as those in the ankle pocket 235 and toe cap 200 may also be constructed with additional plies of fibers. However, it is presently preferred that those regions be formed with fibers oriented in numerous directions so that those regions are more capable of resisting forces in all directions to a greater degree than adjacent or displaced regions in the unitary support structure 110. Thus, it is to be understood that one aspect of the disclosure relates to one or more of the walls of the unitary support structure 110 being comprised of a first and second portion or region comprising fibers disposed in a hardened resin matrix, wherein the first portion is adjacent or displaced from the second portion and wherein the direction of the groups of aligned fibers comprising the first portion (or the fibers that comprise the first portion) is more varied than the direction of the groups of aligned fibers comprising the second portion.

Furthermore, it is presently contemplated that the most exterior ply of the unitary support structure 110 be comprised of uni-directional fibers or groups of fibers oriented in a first direction that are woven with unidirectional fibers or groups of fibers that are oriented in a second direction that is different than the first direction. Employment of a woven ply on the exterior may be more aesthetically pleasing to the consumer as well as provide resistance to fraying. In a presently preferred implementation, for example, an exterior ply, such as the most exterior ply, is comprised of carbon fibers woven at 0 and 90 degrees relative to the longitudinal axis of the unitary support structure. Hence, it is to be understood that one aspect of the disclosure relates to the employment of woven fiber plies in one or more of walls 160, 170, and 180 and sole 115 laid adjacent, and preferably exterior, to one or more non-woven plies of uni-directional fibers.

In sum, the unitary support structure 110 may be formed with regions of increased or decreased flexibility or flexural rigidity. The relative increase or decrease in flexibility may be derived from an increase in the number of fibers, for example by: (a) adding plies of fibers in those regions, (b) increasing the concentration of fibers in those regions or by selective orientation of one or more aligned groups of fibers. Moreover, it is contemplated employment of a woven fiber ply or cloth on the exterior of the unitary support structure 110 may provide a more aesthetically pleasing appearance to the consumer while also providing resistance to fraying. One or more of the plies may be preferably pre-impregnated with resin prior to being overlaid and may be in the form of a tape type material. Hence, it is contemplated that in the preferred construction a first internal ply or layer may be comprised of fibers in a first defined direction; a second ply or layer, residing external to the first ply or layer, may be comprised of fibers in second defined direction or orientation that is different from the first; and a third ply or layer, residing externally relative to the first and second plies or layers, may be bi-directional or multi-direction and/or comprised of a woven or stitched fibers. Employment of one or more plies of fibers pre-impregnated with resin may facilitate more accurate inter-positioning of the plies and easier handling of the uncured pre-form construct thereby improving the consistency of lay-up of the uncured pre-form construct of the unitary support structure 110. In this regard it is contemplated that one or more or all of the plies of fibers that form the unitary support structure be layered in their desired position relative to one another and then positioned over the three-dimensional male mold. Further, it is contemplated that the layering of the plies may be facilitated by the adhesive properties of the plies, for example by the adhesiveness derived from the resin pre-impregnated in one or more plies.

C. Stabilizing the Pre-Form Construct Prior to Curing

Once the plies of fibers are laid in the desired orientation over the three-dimensional male mold to form the uncured pre-form construct of the unitary support structure 110, the uncured pre-form construct may then be stabilized by appropriate means (step 2020) if deemed necessary. Thus, for example if a thermoset or thermoplastic resin is employed, the assembly may be stabilized by subjecting it to cooling. Alternatively, if a light curable resin is employed, such as ultraviolet apoxy resin, the assembly may be stabilized by applying light in the ultraviolet wavelength range.

The step of stabilizing the pre-form construct of the unitary support structure 110 may facilitate both storage of the pre-form as well as removal of the three-dimensional male mold from the uncured pre-form construct prior to curing. Accordingly, if the three-dimensional male mold is configured or formed such that removal is not necessary then the step of stabilizing the pre-form construct (step 2020) may not be necessary inasmuch as it is employed to facilitate removal of the three-dimensional male mold from the uncured pre-form construct of the unitary support structure 110.

D. Removing the Male Mold From the Pre-Form

Once the pre-form of the unitary support structure has been stabilized (step 2020), the three-dimensional male mold is then removed from the uncured pre-form construct of the unitary support structure 110 (step 2030). The step of removing the three-dimensional male mold from the pre-form construct of the unitary support structure 110 facilitates the placement of a heat expandable component in the pre-form construct (step 2050). Accordingly, if the three-dimensional male mold is configured and/or constructed such that removal is not necessary, for example because the three-dimensional male mold itself comprises the heat expandable component, then the step of removing the three-dimensional male mold from the uncured pre-form construct (step 2030) is not necessary.

E. Placing the Pre-Form Construct into the Female Mold; Placing A Heat Expandable Component Into the Pre-Form Construct, Curing the Pre-Form Construct, Removing the Cured Pre-Form Construct and Heat Expandable Component The uncured pre-form construct of the unitary support structure 110 is placed in a female mold having a shape of the desired exterior configuration of the unitary support structure 110 (step 2040) and a heat expandable component, or other pressurizing means, is placed (if not already in the pre-form construct) within the interior walls of the uncured pre-form construct (step 2050) to provide the needed outward pressure to ensure the desired formation of the wall structures during curing. The female mold is then closed about the uncured pre-form construct of the unitary support structure 110 with the heat expandable component residing therein. Heat is applied at a suitable temperature and duration to cure the pre-form construct in the female mold (step 2060). The application of heat in addition to heating the female mold and pre-form construct also heats the heat expandable component, which when heated generates outward force on the internal cavity walls of the pre-form construct to facilitate curing (step 2060).

Once cured, the pre-form construct of the unitary support structure 110 is removed from the female mold (step 2070) and the heat expandable component is removed (step 2080) by suitable means, such as those previously described, from the cured pre-form of the unitary support structure 110. The unitary support structure 110 may then be finished to the desired configuration (step 2090).

Figure 43:
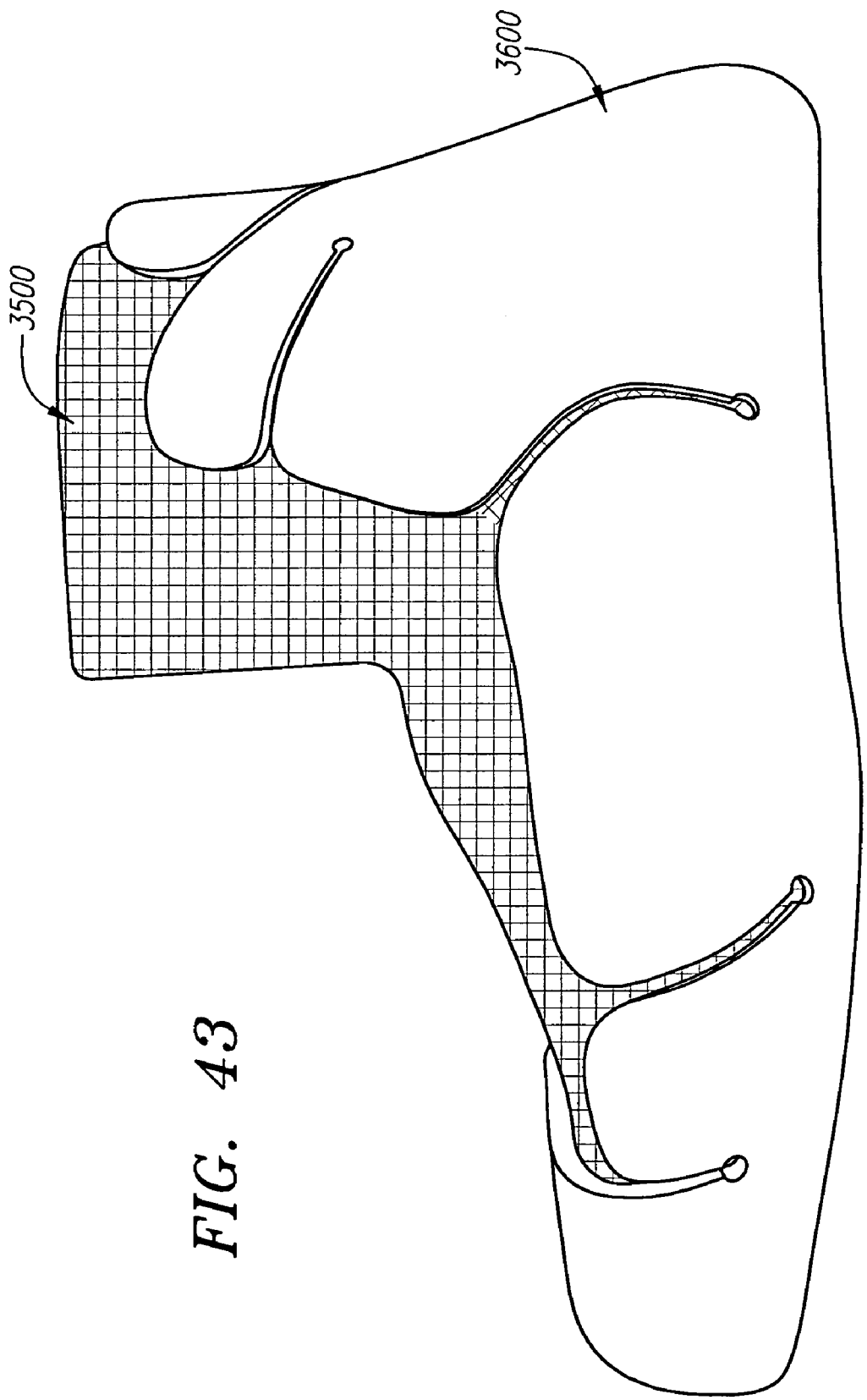
FIG. 43 is an illustration of a jig or template employed to facilitate the finishing described in connection with the manufacturing process of FIG. 25.

F. Finishing the Cured Pre-Form Construct and Incorporating It Into an Article of Footwear Depending on the configuration of the unitary support structure 110 after curing, finishing may require edging, trimming or partitioning of the cured pre-form construct of the unitary support structure 110. For example, it is presently contemplated that the partitions and/or slots in the side walls (e.g., 161, 162, 163, 164, 271, 272, and 273) may be formed in the unitary support structure 110 after curing by employment of suitable mechanical means, such as a rotary cutting device or other suitable device. When such mechanical means are employed to finish the cured unitary support structure 110 a jig or template (such as that illustrated in FIG. 43 ref. numeral 3600) may be affixed in the desired position and orientation relative to the cured unitary support structure 110 to ensure accuracy in the finishing process.

Alternatively, it is noted that markings imparted by the female mold may be employed to define areas for finishing or further mechanical processing. For example, it is contemplated that the female mold include inwardly extending ridges or marking lines that mark the outer formation of the cured unitary support structure along its desired perimeter or along regions of the slots or partitions. Moreover, it is contemplated that the molding process may be sufficiently refined so that the cured unitary support structure 110 requires minimum or no finishing. For example the plies of fibers may be laid in a manner over the three-dimensional male mold so that the partitions are formed during curing within the female mold. Alternatively, the female mold may be configured in such a manner so as to impart the partitions in the unitary support structure 110 or otherwise impart finished edges to the unitary support structure 110 during curing.

Figure 28:
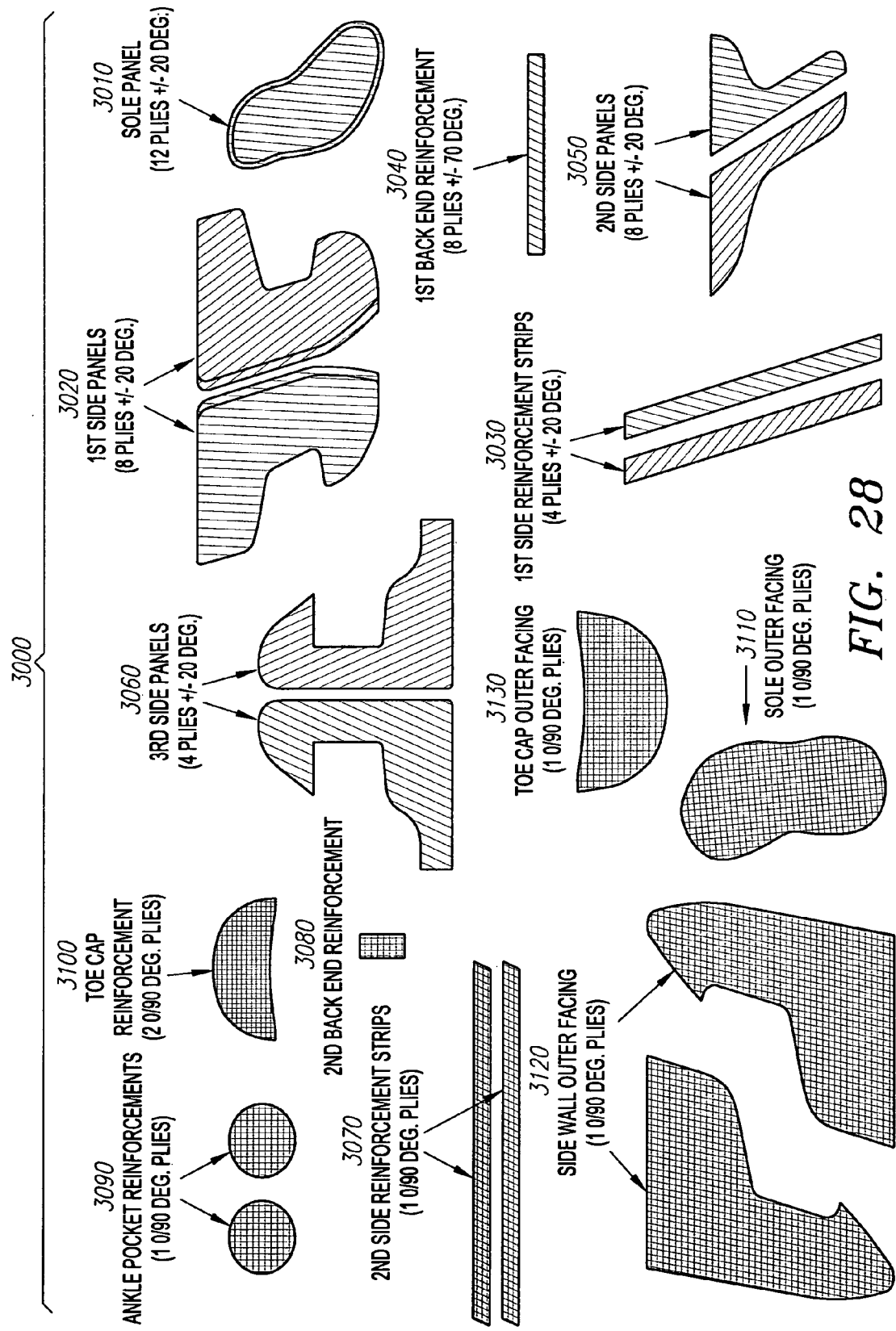
FIG. 28 is a perspective view diagram illustrating a preferred implementation of pre-form kit comprising exemplary pre-form lay-up substructure components employed in the manufacture of a unitary support structure, such as the unitary support structure implementation depicted in FIGS. 5-9.

G. Exemplary Manufacture of the Unitary Support Structure Employing a Unitary Support Structure Pre-form Kit FIGS. 28-43 are diagrams representing a presently preferred exemplary construction and configuration of the unitary support structure 110, such as that disclosed in the preferred implementation illustrated in FIGS. 5-9. FIG. 28 illustrates a unitary support structure 110 pre-form kit 3000 comprising the components set forth below in the table below. It is to be understood that each pre-form kit 3000 represents construction components of a single right or left foot unitary support structure 110. Thus, a pair of left and right unitary support structures 110 would require two pre-form kits 3000.

| Ref. Numeral | Pre-form Lay-up Substructure Component ("PLSC") | Number of Components in Pre-Form Kit |
|---|---|---|
| 3010 | Sole Panel | 1 |
| | Description | |

The sole panel PLSC 3010 is comprised of one or more plies of fibers dimensioned to generally reflect the perimeter dimensions of the sole 115 of the unitary support structure 110. In the preferred implementation illustrated in FIG. 28 each ply is formed of unidirectional fibers oriented at approximately +/−20 degrees relative to the defined longitudinal axis with adjacent plies being oriented in opposing +/−20 degree orientations.
A preferred lay-up of the sole panel PLSC 3010 comprises 12 plies oriented at +/−20 degrees relative to the defined longitudinal axis, laid one on top of the other, with the inner plies having slightly greater perimeter dimensions to accommodate overlapping outer plies of the first side panel PLSC 3020. Plies that are slightly greater in dimension are noted by an "*". Ply No. 1 is the most internal ply of the lay-up substructure (i.e., closest to the foot 600).

Ply No. 1*: −20 deg.  Ply No. 7: −20 deg.
Ply No. 2*: +20 deg.  Ply No. 8: +20 deg.

-continued

|  |  |
|---|---|
| Ply No. 3*: −20 deg. | Ply No. 9: −20 deg. |
| Ply No. 4*: +20 deg. | Ply No. 10: +20 deg. |
| Ply No. 5: −20 deg. | Ply No. 11: −20 deg |
| Ply No. 6: +20 deg. | Ply No. 12: +20 deg. |

In the preferred lay-up, each ply is comprised of pre-impregnated uni-directional carbon fiber tape, such as Carbon 70 FAW (36% +/− 2% resin) manufactured by Hexel Corporation of California.

| Ref. Numeral | Pre-form Lay-up Substructure Component ("PLSC") | Number of Components in Pre-Form Kit |
|---|---|---|
| 3020 | First side panel | 2 |

Description

Figure 29:
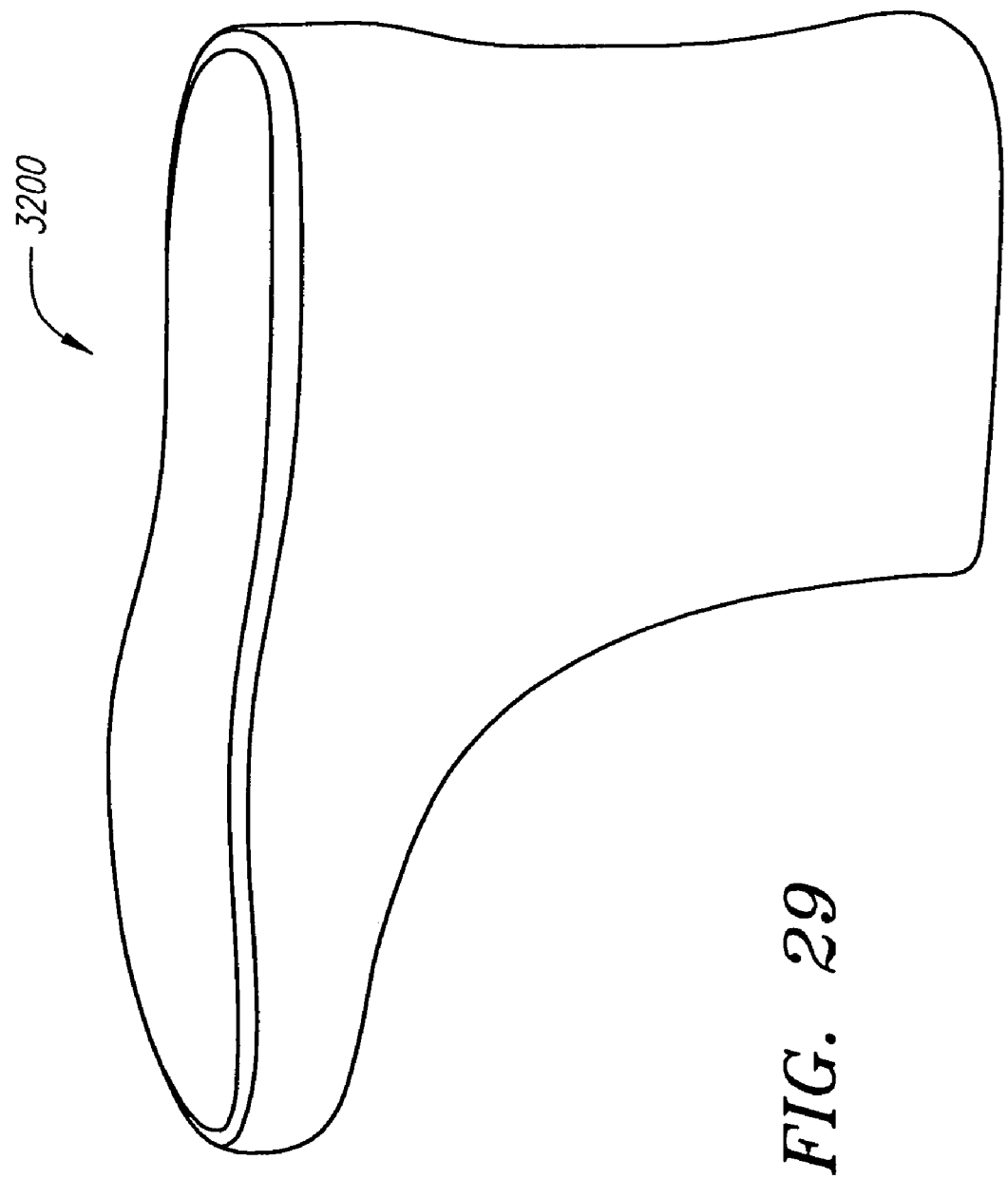
FIG. 29 is a lateral side perspective view diagram of a representative implementation of a three dimensional male mold employed in a preferred manufacturing implementation, such as that described in the preferred steps diagrammed in FIG. 25 and further illustrated in FIGS. 28-43.
Figure 30:
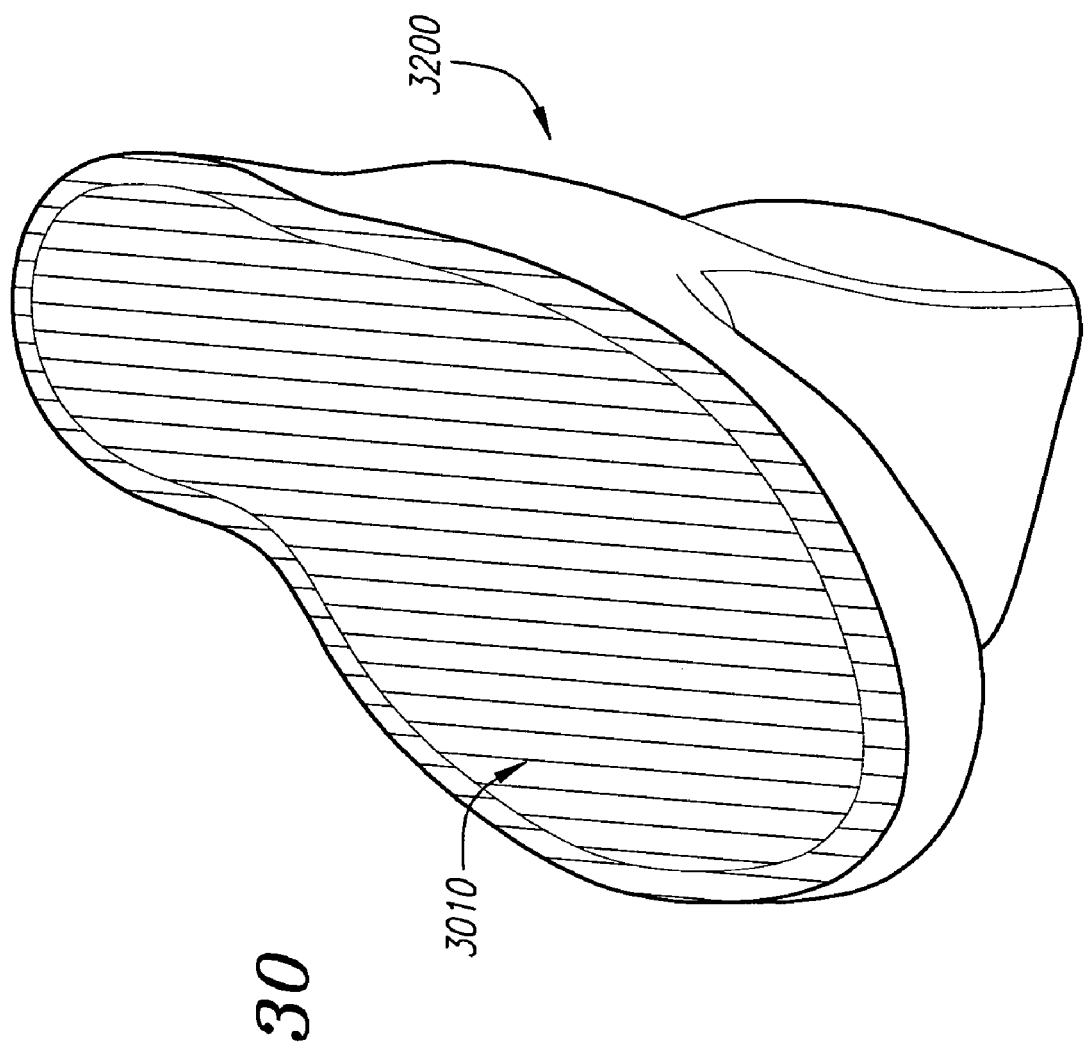
FIG. 30 is a bottom front perspective view diagram illustrating the positioning of the sole panel pre-form lay-up substructure component illustrated in the pre-form kit of FIG. 28 over the male mold illustrated in FIG. 29.
Figure 31:
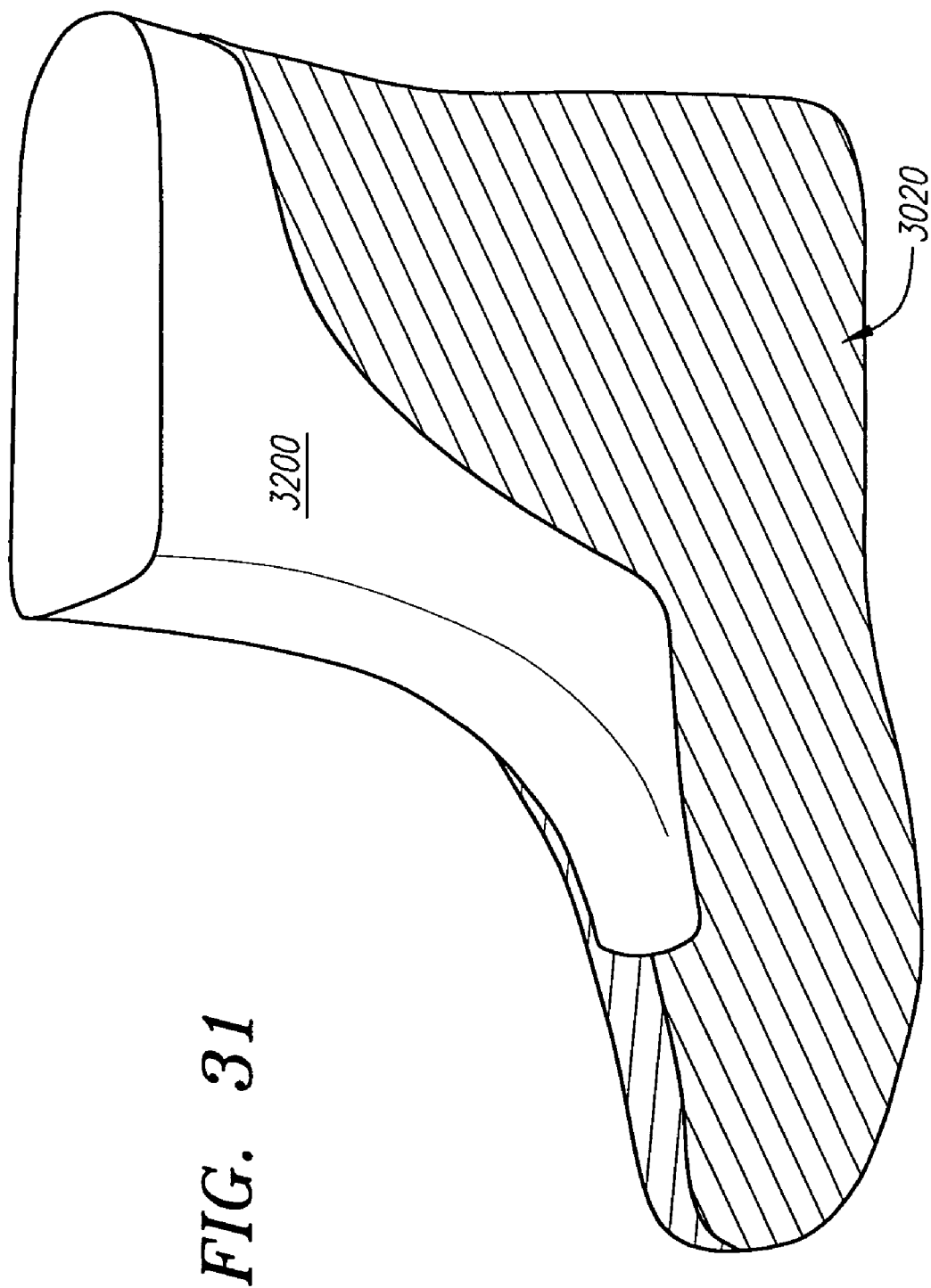
FIG. 31 is a medial side perspective view diagram illustrating the positioning of the side panel pre-form lay-up substructure components illustrated in the pre-form kit of FIG. 28 over the male mold illustrated in FIGS. 29-30.

Each first side panel PLSC 3020 is preferably comprised of multiple plies of fibers dimensioned to generally reflect the outer perimeter dimensions of the side walls 160, 170, and 180, on the lateral or medial sides, respectively, of the unitary support structure 110.
In the preferred implementation illustrated in FIG. 28, each ply is formed of uni-directional fibers oriented at approximately +/−20 degrees relative to the defined longitudinal axis with adjacent plies being oriented in opposing +/−20 degree orientations.
A preferred lay-up of the first side panel PLSC 3020 comprises 8 plies oriented at +/−20 degrees relative to the defined longitudinal axis, laid one on top of the other, with the outer plies having slightly greater perimeter dimensions around their lower extents to accommodate overlapping with the outer extents of the inner plies of the sole panel PLSC 3010. Thus Ply No. 5 of each first side panel PLSC is immediately adjacent to Ply No. 4 of the sole panel PLSC when placed on the male mold 3200 (as illustrated in FIGS. 29–31). Plies that are slightly greater in dimension are noted by an "*". Ply No. 1 is the most internal ply of the lay-up substructure (i.e., closest to the foot 600).

|  |  |
|---|---|
| Ply No. 1: −20 deg. | Ply No. 5*: −20 deg. |
| Ply No. 2: +20 deg. | Ply No. 6*: +20 deg. |
| Ply No. 3: −20 deg. | Ply No. 7*: −20 deg. |
| Ply No. 4: +20 deg. | Ply No. 8*: +20 deg. |

In the preferred lay-up, each ply is comprised of pre-impregnated uni-directional carbon fiber tape, such as Carbon 70 FAW (36% +/− 2% resin) manufactured by Hexel Corporation of California.

| Ref. Numeral | Pre-form Lay-up Substructure Component ("PLSC") | Number of Components in Pre-Form Kit |
|---|---|---|
| 3030 | First side reinforcement strip | 2 |

Description

Each first side reinforcement strip PLSC 3030 is preferably comprised of one or more plies of fibers dimensioned lengthwise to generally extend about the lateral or medial side of the unitary support structure 110 from the front end 215 to the back end 210 of the unitary support structure so as to further contribute to the formation and strength of the lower portions of side walls 160, 170, and 180. Each first side reinforcement strip PLSC 3030 is dimensioned vertically so as to generally correspond to the height of the arch of the foot 650 or to the perimeter of the foot 600 or slightly thereabove. Hence, the first side reinforcement strip PLSCs are meant to provide additional strength to the lower perimeters of the side walls and at the juncture between the side panels and sole panel PLSCs.
In the preferred implementation of the first side reinforcement strip PLSC illustrated in FIG. 28, each ply is formed of uni-directional fibers oriented at approximately +/−20 degrees relative to the defined longitudinal axis with adjacent plies being oriented in opposing +/−20 degree orientations.
A preferred lay-up of each of the first side reinforcement strip PLSC 3030 comprises 4 plies oriented at +/−20 degrees laid one on top of the other. Ply No. 1 is the most internal ply of the lay-up substructure (i.e., closest to the foot 600).

Ply No. 1: −20 deg.
Ply No. 2: +20 deg.
Ply No. 3: −20 deg.
Ply No. 4: +20 deg.

In the preferred lay-up, each ply is comprised of pre-impregnated uni-directional carbon fiber tape, such as Carbon 70 FAW (36% +/− 2% resin) manufactured by Hexel Corporation of California.

| Ref. Numeral | Pre-form Lay-up Substructure Component ("PLSC") | Number of Components in Pre-Form Kit |
|---|---|---|
| 3040 | First back end reinforcement strip | 1 |

Description

The first back-end reinforcement strip PLSC 3040 is comprised of multiple plies of fibers dimensioned to generally reflect the vertical dimension of the unitary support structure 110 extending from the sole 115 to the upper extent of side walls 160 at the back end region 210. It serves to provide additional rigidity or strength to the back end 210 of the unitary support structure 110 so that it may be better anchored to the sole 115.

In the preferred implementation illustrated in FIG. 28, each ply is formed of uni-
directional fibers oriented at approximately +/−70 degrees relative to the defined vertical axis of
the unitary support structure 110 (i.e., or approximately 20 degrees relative to the horizontal
axis) with adjacent plies being preferably oriented in opposing +/−70 degree (vertical)
orientations.
A preferred lay-up of the first back end reinforcement PLSC 3040 comprises 8 plies
oriented at +/−70 degrees to the vertical axis laid one on top of the other. Ply No. 1 is the most
internal ply of the lay-up substructure (i.e., closest to the foot 600).

Ply No. 1: −70 deg.    Ply No. 5: −70 deg.
    Ply No. 2: +70 deg.    Ply No. 6: +70 deg.
    Ply No. 3: −70 deg.    Ply No. 7: −70 deg.
    Ply No. 4: +70 deg.    Ply No. 8: +70 deg.

In the preferred lay-up, each ply is comprised of pre-impregnated uni-directional carbon
fiber tape, such as Carbon 70 FAW (36% +/− 2% resin) manufactured by Hexel Corporation of
California.

| Ref. Numeral | Pre-form Lay-up Substructure Component ("PLSC") | Number of Components in Pre-Form Kit |
|---|---|---|
| 3050 | Second side panel | 2 |

| Description |
|---|

Figure 34:
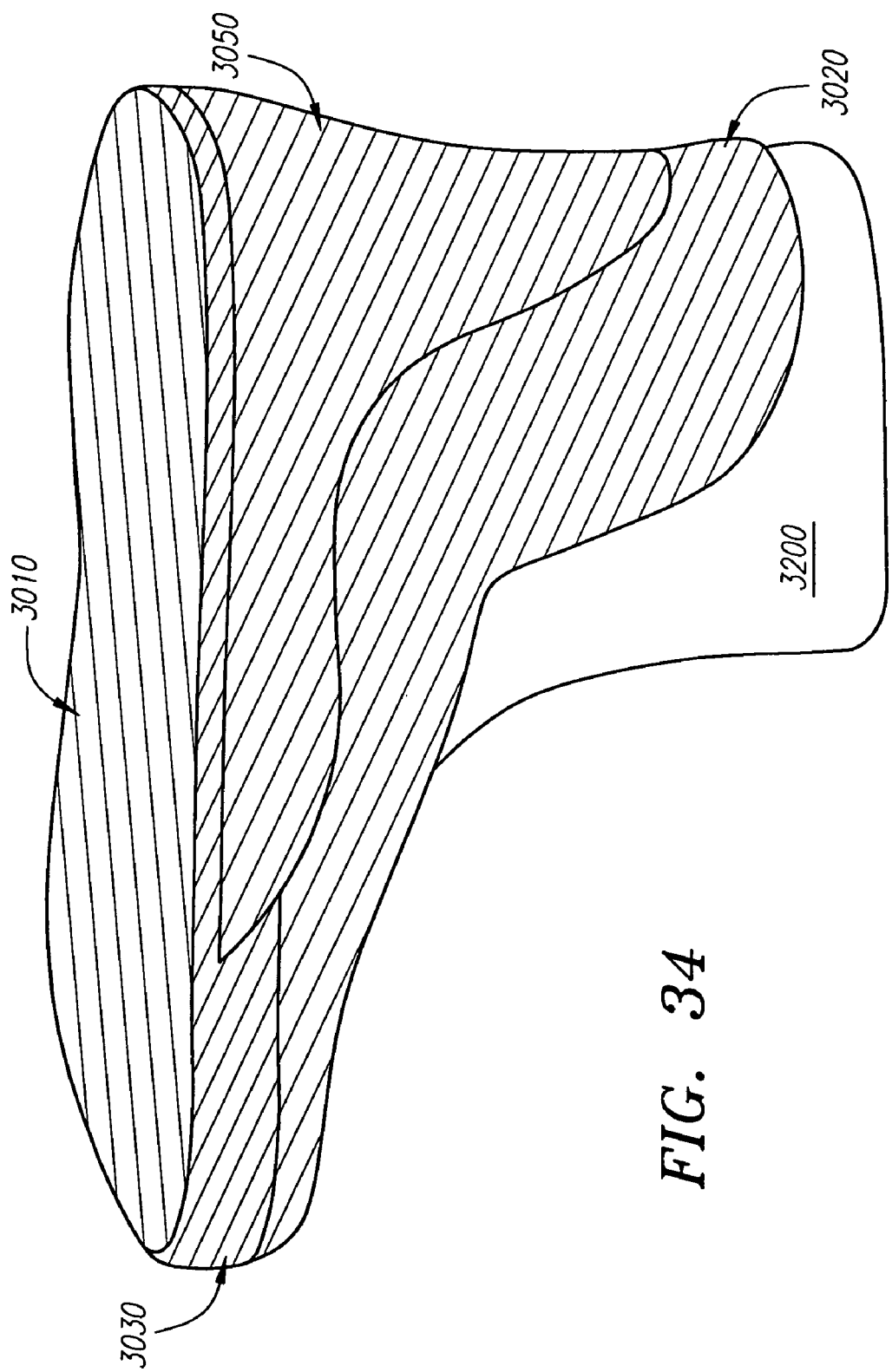
FIG. 34 is a lateral side perspective view diagram illustrating the positioning of the second side panel pre-form lay-up substructure components illustrated in the pre-form kit of FIG. 28 laid over the male mold illustrated in FIGS. 29-33.

Each second side panel PLSC component 3050 is preferably comprised of multiple plies
of fibers dimensioned to generally reflect the outer perimeter dimensions of the side walls 160
and 180, on the lateral or medial sides, of the unitary support structure 110. The dimensions,
however, are not coextensive with the first side panel PLSC 3020 in several respects. First the
lay-up does not extend to the front end 215 of the unitary support structure 110 but rather is
dimensioned to extend longitudinally only to the posterior portion of wall 170 or to the regions
of the unitary support structure 110 generally corresponding to the lateral and medial extents
645, 640 of the foot 600. In addition, the lay-up 3050 is configured to extend vertically a lesser
amount at the region corresponding to the mid-region 680 and the posterior portion of the toe
region 660 of the foot 600. Moreover, the lay-up is dimensioned so that it does not form the
forward region of the lower leg support portion 270. In other words, it is dimensioned so that it
does not extend forwardly beyond the heel pocket 235 of the ankle regions 230 of the unitary
support structure 110. In addition the lay-up is dimensioned so that it does not extend to the
lower perimeters of the first side reinforcement strip PLSCs 3030 but, rather is vertically
displaced upwardly therefrom (as best illustrated in FIG. 34).
In the preferred implementation illustrated in FIG. 28, each ply of the lay-up is formed
of uni-directional fibers oriented at approximately +/−20 degrees relative to the defined
longitudinal axis with adjacent plies being preferably oriented in opposing +/−20 degree
orientations.
A preferred lay-up of the second side panel PLSC 3050 comprises 8 co-extensively
dimensioned plies oriented at +/−20 degrees laid one on top of the other. Ply No. 1 is the most
internal ply of the lay-up substructure (i.e., closest to the foot 600).

Ply No. 1: −20 deg.    Ply No. 5: −20 deg.
    Ply No. 2: +20 deg.    Ply No. 6: +20 deg.
    Ply No. 3: −20 deg.    Ply No. 7: −20 deg.
    Ply No. 4: +20 deg.    Ply No. 8: +20 deg.

In the preferred lay-up, each ply is comprised of pre-impregnated uni-directional carbon
fiber tape, such as Carbon 70 FAW (36% +/− 2% resin) manufactured by Hexel Corporation of
California.

| Ref. Numeral | Pre-form Lay-up Substructure Component ("PLSC") | Number of Components in Pre-Form Kit |
|---|---|---|
| 3060 | Third side panel | 2 |

| Description |
|---|

Each third side panel PLSC 3060 is preferably comprised of multiple plies of fibers
dimensioned to generally reflect the outer perimeter dimensions of the side walls 160, 170, and
180, on the lateral or medial sides, of the unitary support structure 110. The dimensions of the
lay-up are greater than those of the second side panel PLSC 3050, which is dimensioned to
reside completely within the dimensions of the third side panel PLSC 3060. The dimensions,
however, are less than coextensive with the first side panel PLSC 3020 in several respects. First
the lay-up is configured to extend vertically a lesser amount at the region corresponding to the
mid-region 680 of the foot 600. Moreover, the lay-up is dimensioned so that it is not
coextensive with the totality of the lower leg support portion 270 at the forward and upward
most sub-regions thereof. Furthermore, the lay-up is dimensioned so that it does not extend
forwardly to full forward extent of the ankle region 230 of the unitary support structure 110, yet
cover the majority or totality of the ankle pocket 235.
In the preferred implementation illustrated in FIG. 28, each ply is formed of uni-
directional fibers oriented at approximately +/−20 degrees relative to the defined longitudinal
axis with adjacent plies being oriented in opposing +/−20 degree orientations.
In the preferred implementation illustrated in FIG. 28, each third side panel PLSC 3060
comprises 4 plies oriented at +/−20 degrees laid one on top of the other. Ply No. 1 is the most
internal ply of the lay-up substructure (i.e., closest to the foot 600).

Ply No. 1: −20 deg.
    Ply No. 2: +20 deg.

| | | |
|---|---|---|
| | Ply No. 3: −20 deg. | |
| | Ply No. 4: +20 deg. | |
| colspan="3" | In the preferred lay-up, each ply of the lay-up is comprised of pre-impregnated uni-directional carbon fiber tape, such as Carbon 70 FAW (36% +/− 2% resin) manufactured by Hexel Corporation of California. | |

| Ref. Numeral | Pre-form Lay-up Substructure Component ("PLSC") | Number of Components in Pre-Form Kit |
|---|---|---|
| 3070 | Second Side Reinforcement strip | 2 |
| colspan="3" | Description |

Each second side strip reinforcement PLSC 3070 is comprised of one or plies of fibers dimensioned to generally reflect the outer perimeter dimensions of the side walls 160, 170, and 180, on the lateral or medial sides, of the unitary support structure 110. Each of which is dimensioned approximately the same as the first side strip reinforcement PLSCs 3030, previously described. In the preferred implementation illustrated in FIGS. 29–43, however, the lay-up substructure is positioned so that its upper vertical extent resides below the corresponding first side strip reinforcement PLSCs 3030 and it lower vertical extent wraps about the perimeter of the underlying sole panel PLSC 3010.
In the preferred implementation illustrated in FIG. 28, each ply of the lay-up substructure is formed of a single ply of 0/90 deg. woven aramid fiber tape, such as Kevlar 1629 (42% +/− 2% resin) manufactured by E. I. du Pont de Nemours and Company of Delaware.

| Ref. Numeral | Pre-form Lay-up Substructure Component ("PLSC") | Number of Components in Pre-Form Kit |
|---|---|---|
| 3080 | Second back end Reinforcement strip | 1 |
| colspan="3" | Description |

The second back end reinforcement PLSC 3080 is preferably comprised of one or more plies of fibers dimensioned to generally extend vertically from the sole 115 of the unitary support structure 110 to midway up the back end region 210 to further provide strength and rigidity thereto as well as anchoring of the lower portion of the back end region 210 vis-à-vis the sole 115.
In the preferred implementation illustrated in FIG. 28, the lay-up substructure is formed of a single ply of 0/90 deg. pre-impregnated woven aramid fiber tape, such as Kevlar 1629 (42% +/− 2% resin) manufactured by E. I. du Pont de Nemours and Company of Delaware under the name Dupont.

| Ref. Numeral | Pre-form Lay-up Substructure Component ("PLSC") | Number of Components in Pre-Form Kit |
|---|---|---|
| 3090 | Ankle pocket reinforcement | 2 |
| colspan="3" | Description |

Each ankle pocket reinforcement PLSC 3080 is preferably comprised of one or more plies of fibers generally, oval or circular shaped, dimensioned to cover the ankle pocket 235 of the ankle regions 230 on the lateral or medial sides of the unitary support structure 110 to further provide strength and rigidity thereto so as to further protect the ankle.
In the preferred implementation illustrated in FIG. 28, the lay-up substructure is formed of a single ply of 0/90 deg., oriented relative to the longitudinal axis, pre-impregnated woven aramid fiber tape such as Kevlar 1629 (42% +/− 2% resin) manufactured by E. I. du Pont de Nemours and Company of Delaware.

| Ref. Numeral | Pre-form Lay-up Substructure Component ("PLSC") | Number of Components in Pre-Form Kit |
|---|---|---|
| 3100 | Toe cap reinforcement | 1 |
| colspan="3" | Description |

Each toe cap reinforcement PLSC 3100 is preferably comprised of one or more plies of fibers generally, semi-oval or circular shaped, dimensioned to cover the toe cap portion 200 formed by walls 170 over the toes of the wearer to further strengthen that regions to protect the toes of the wearer.
In the preferred implementation illustrated in FIG. 28, the lay-up substructure is formed of a single ply of 0/90 deg., oriented relative to the longitudinal axis, pre-impregnated woven aramid fiber tape such as Kevlar 1629 (42% +/− 2% resin) manufactured by E. I. du Pont de Nemours and Company of Delaware.

-continued

| Ref. Numeral | Pre-form Lay-up Substructure Component ("PLSC") | Number of Components in Pre-Form Kit |
|---|---|---|
| 3110 | Sole outer facing | 1 |

| Description |
|---|

The sole outer facing PLSC 3110 is preferably comprised of one or more plies of fibers dimensioned to generally reflect the perimeter dimensions of the sole 115 of the unitary support structure 110. It serves to further strengthen the sole 115 and provide an appealing exterior face thereto.
In the preferred implementation illustrated in FIG. 28, the lay-up substructure is formed of a single ply of 0/90 deg., oriented relative to the longitudinal axis, pre-impregnated woven carbon fibers such as woven carbon 282 (40% +/− 2% resin) manufactured by Hexel Corporation of California.

| Ref. Numeral | Pre-form Lay-up Substructure Component ("PLSC") | Number of Components in Pre-Form Kit |
|---|---|---|
| 3120 | Side wall outer facing | 2 |

| Description |
|---|

Each side wall outer facing PLSC 3120 is preferably comprised of one or more plies of fibers dimensioned to generally reflect the aggregate dimensions of the side walls 160, 170, and 180 of he unitary support structure 110. It serves to further strengthen the side walls and provide an appealing exterior face thereto.
In the preferred implementation illustrated in FIG. 28, each lay-up substructure is formed of a single ply of 0/90 deg., oriented relative to the longitudinal axis, pre-impregnated woven carbon fibers such as woven carbon 282 (40% +/− 2% resin) manufactured by Hexel Corporation of California.

| Ref. Numeral | Pre-form Lay-up Substructure Component ("PLSC") | Number of Components in Pre-Form Kit |
|---|---|---|
| 3130 | Toe cap outer facing | 1 |

| Description |
|---|

The toe cap outer facing PLSC 3130 is preferably comprised of one or more plies of fibers generally, semi-oval or circular shaped, dimensioned to cover the toe cap portion 200 formed by walls 170 over the toes of the wearer to further strengthen that regions to protect the toes of the wearer and provide an appealing exterior face thereto.
In the preferred implementation illustrated in FIG. 28, the lay-up substructure is formed of a single ply of 0/90 deg., oriented relative to the longitudinal axis, pre-impregnated woven carbon fibers such as woven carbon 282 (40% +/− 2% resin) manufactured by Hexel Corporation of California.

Each pre-form kits 3000 is adapted to correspond to a standard size of a particular article of footwear taking into consideration the various structural components of the foot 600 (e.g, the length, width, ball of the foot, medial extent of the foot, toe region, heel region, mid region, ankle protrusion, etc.) as well as other components of the footwear (e.g., blade, blade holder, upper) as previously discussed in the foregoing sections of this application. Thus, for example, a size 9 article of footwear would have a corresponding size 9 pre-form kit and a size 12 article of footwear would have a corresponding size 12 pre-form kit.

While particular pre-form lay-up substructure components ("PLSCs") are described and illustrated in FIGS. 28-43, it should be understood that the pre-form kit 3000 may be comprised in whole or in part of other pre-form lay-up substructures to facilitate the desired configuration and construction of the unitary support structure 110 of a particular article of footwear 1. Thus, one aspect of this invention relates to the manufacture of unitary support structures 110 for incorporation into articles of footwear 1 employing a process in which multiple pre-form lay-up substructures are provided as a kit, such as that illustrated in FIG. 28, corresponding to standard size of a particular article of footwear 1. FIG. 29 is a medial side perspective diagram of a representative implementation of a three dimensional male mold 3200, such as that referred to in relation to the process described in connection with FIG. 25. In this exemplary manufacture of a unitary support structure, the three dimensional male mold 3200 is made of a heat expandable silicone such as that previously described in connection with the process described in FIG. 25.

FIGS. 30-38 are diagrams illustrating how each of the PLSCs described in the foregoing table are laid over the three-dimensional male mold 3200 in the order they appear in the above table. In this regard it should be understood that each ply contributes to the strength and flexibility of the wall structure in which it forms in the manner previously described.

Figure 25:
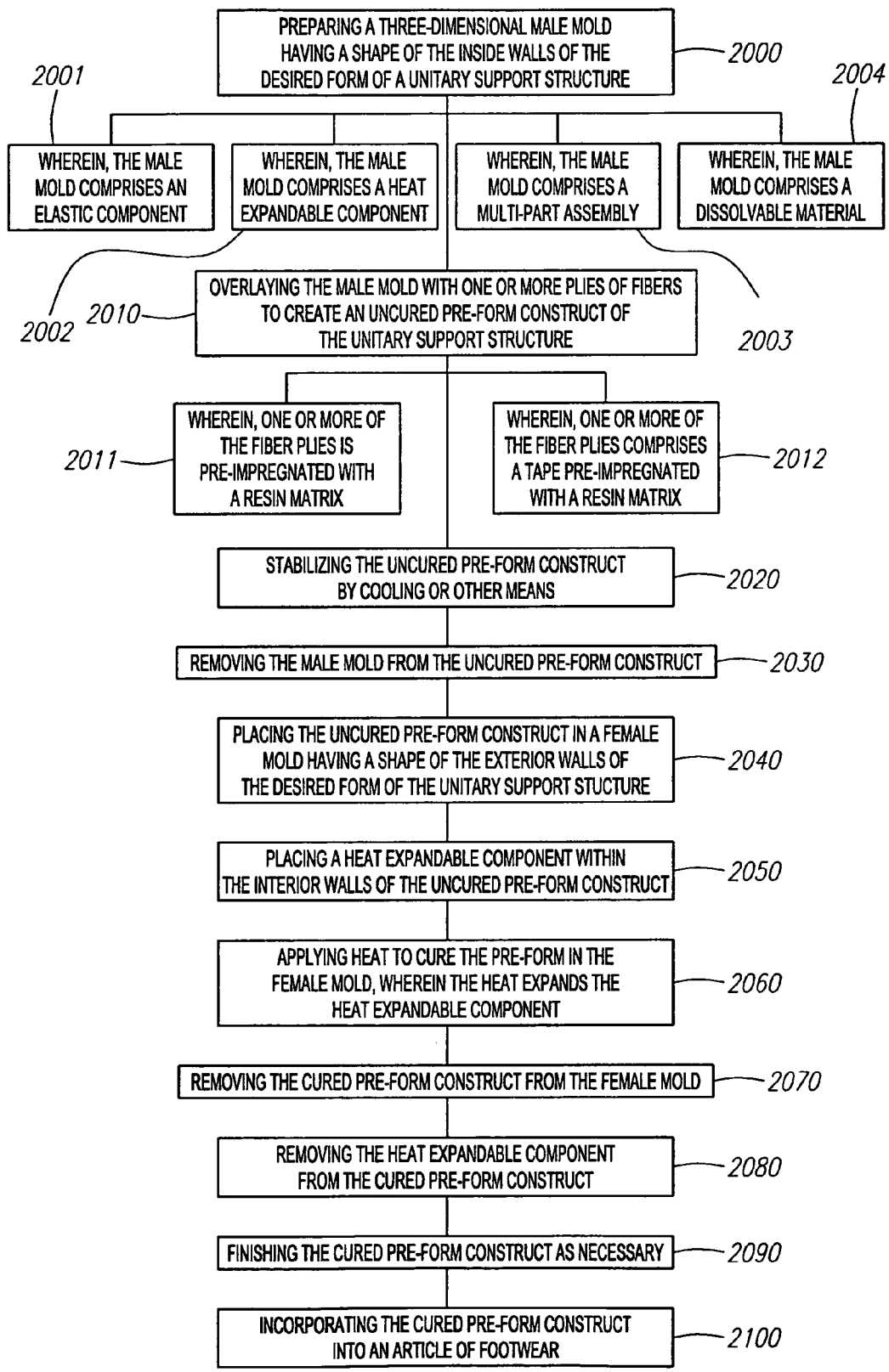
FIG. 25 is a diagram of preferred steps for constructing an article of footwear comprising the unitary support structure disclosed and illustrated herein.

FIG. 30 is a bottom lateral perspective diagram illustrating the positioning of the sole panel PLSC 3010 over the corresponding sole region of the male mold 3200 to begin the formation of the pre-form construct described in connection with step 2010 of FIG. 25. It is noted that throughout FIGS. 28, 30-38, 41-43, the cross-hatching on the PLSCs illustrated therein is meant to generally reflect the orientation of the fibers on the outer visible plies of the PLSC as they are laid over 2010 the three dimensional mold 3200 in accordance with the description in the foregoing table.

FIG. 31 is a lateral side perspective view diagram of the pre-form construct after the first side panel PLSCs 3020 are laid over the male mold 3200 and the outer edges of the sole panel PLSC 3010.

Figure 32:
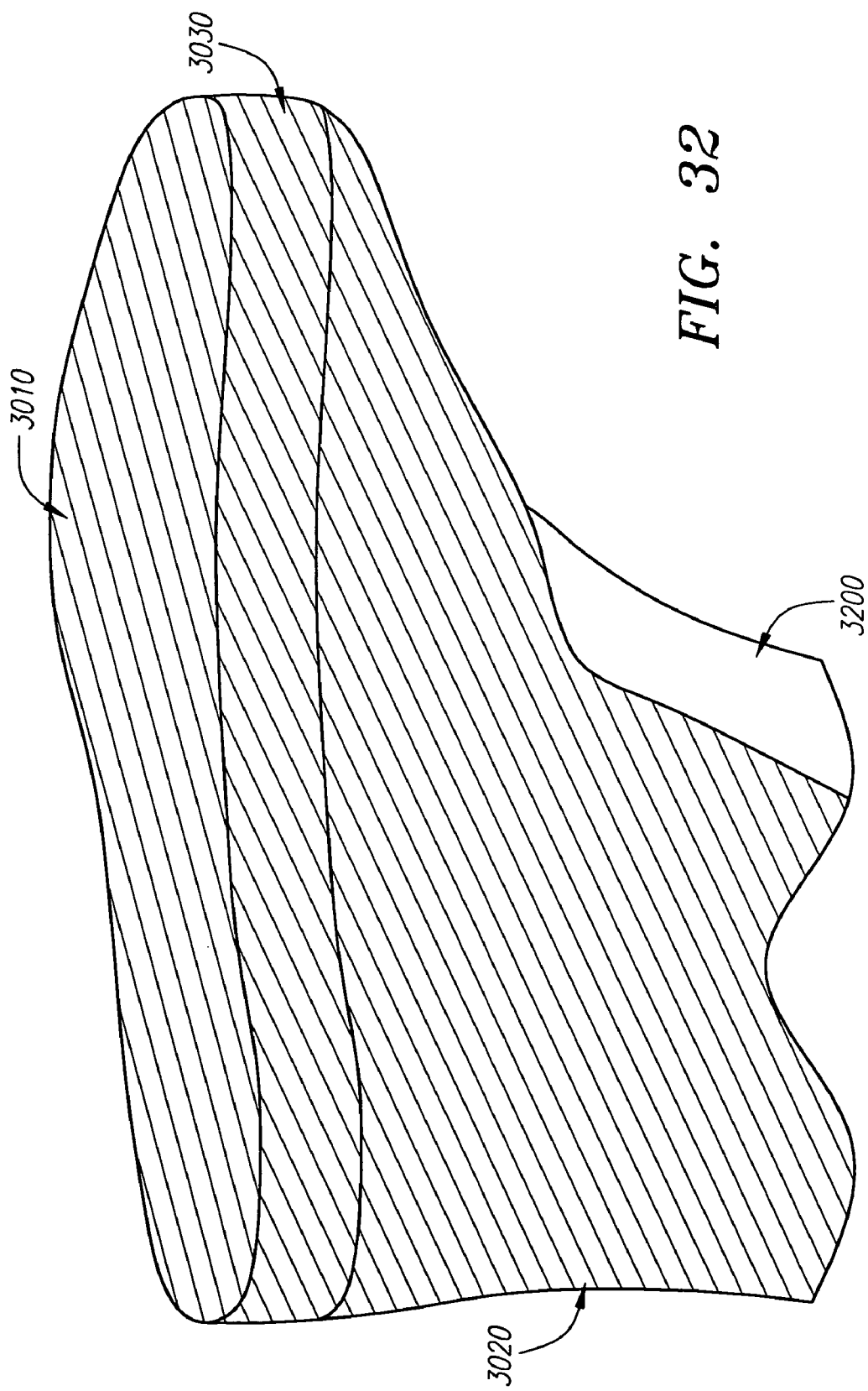
FIG. 32 is a medial side perspective view diagram illustrating the positioning of the first side reinforcement strip pre-form lay-up substructure components illustrated in the pre-form kit of FIG. 28 laid over the male mold illustrated in FIGS. 29-31

FIG. 32 is a medial side perspective view diagram of the pre-form construct after the first side reinforcement strip PLSCs 3030 are laid over the male mold 3200 on top of the first side panel PLSCs 3020.

Figure 33:
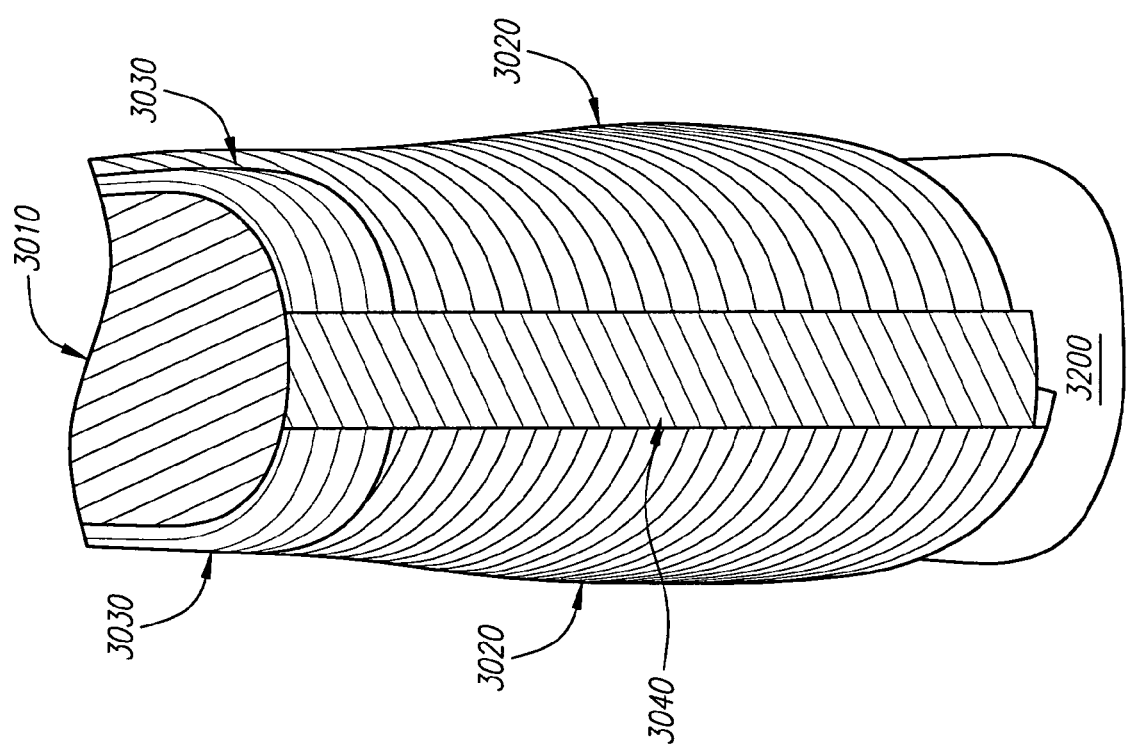
FIG. 33 is a rear bottom perspective view diagram illustrating the positioning of the first back end reinforcement strip pre-form lay-up substructure component illustrated in the pre-form kit of FIG. 28 laid over the male mold illustrated in FIGS. 29-32.

FIG. 33 is a rear bottom perspective view diagram of the pre-form construct after the first back end reinforcement strip PLSC 3040 is laid over the male mold 3200 on top of the first side panel PLSCs 3020 and the first side reinforcement strip PLSCs 3030.

FIG. 34 is a lateral side perspective view diagram of the pre-form construct after the second side panel PLSCs 3050 are laid over the male mold 3200 on top of the first side panel PLSCs 3020, the first side reinforcement strip PLSCs 3030, and the first back end reinforcement strip PLSC 3040.

Figure 35:
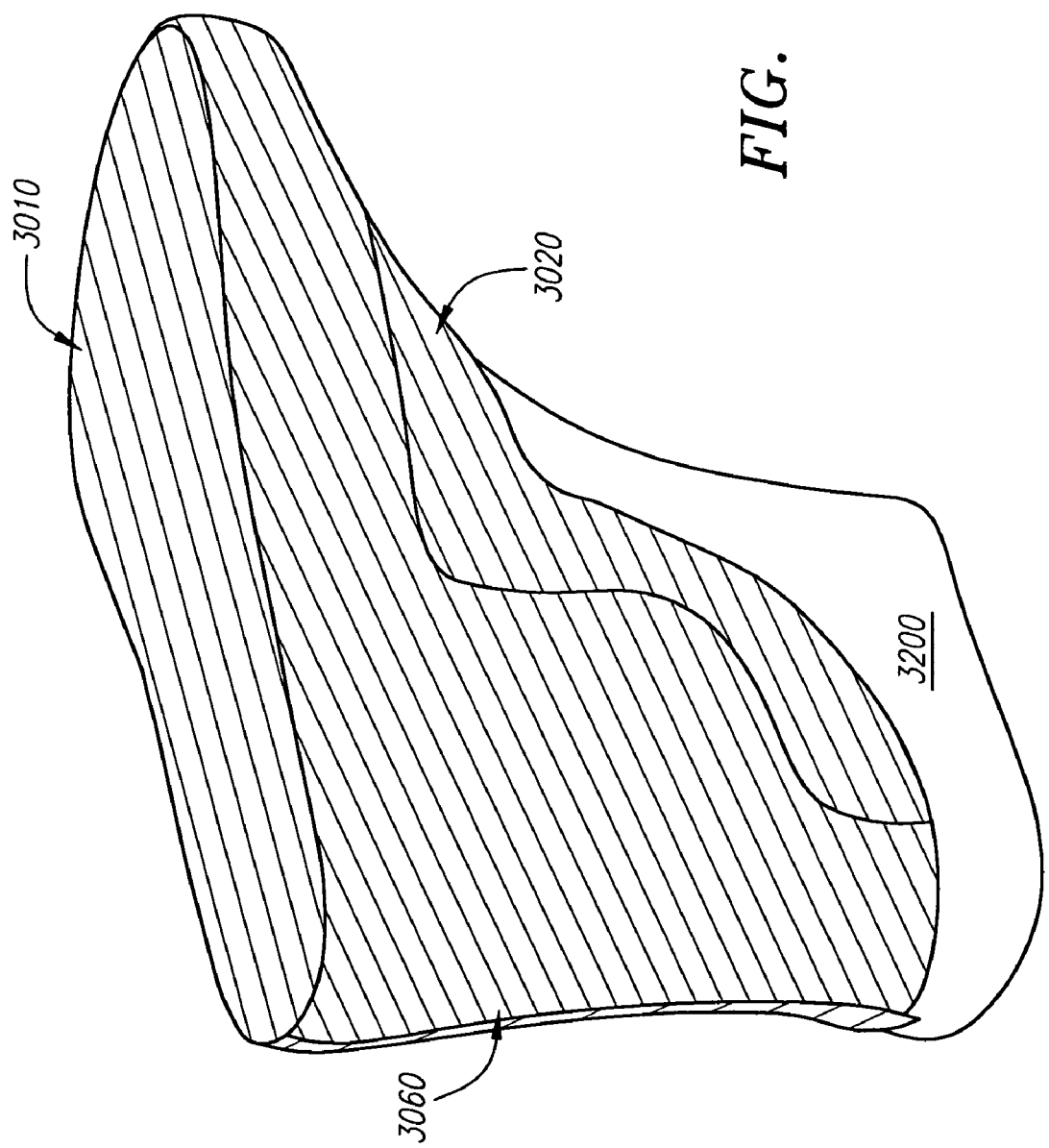
FIG. 35 is a medial side perspective view diagram illustrating the positioning of the third side panel pre-form lay-up substructure components illustrated in the pre-form kit of FIG. 28 laid over the male mold illustrated in FIGS. 29-34.

FIG. 35 is a medial side perspective view diagram of the pre-form construct after the third side panel PLSCs 3060 are laid over the male mold 3200 on top of the first side panel PLSCs 3020, the first side reinforcement strip PLSCs 3030, the first back end reinforcement strip PLSC 3040, and the second side panel PLSCs 3050.

Figure 36:
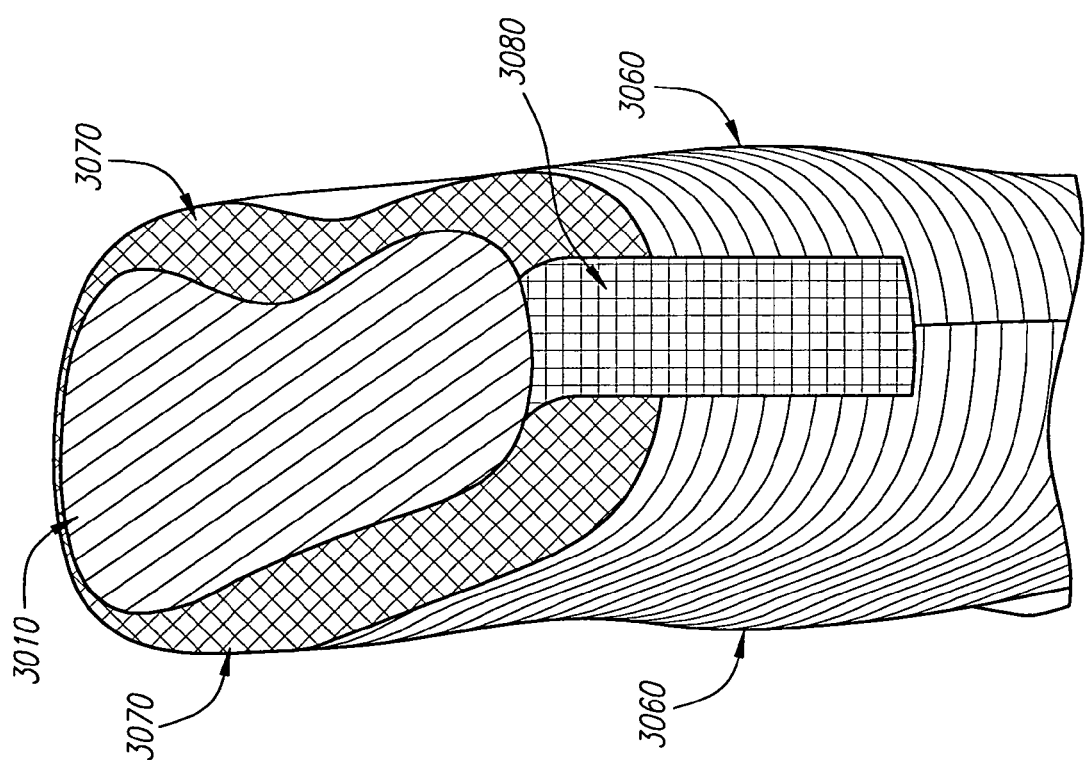
FIG. 36 is a rear bottom perspective view diagram illustrating the positioning of the second side reinforcement strip and the second back end reinforcement pre-form lay-up substructure components illustrated in the pre-form kit of FIG. 28 laid over the male mold illustrated in FIGS. 29-35

FIG. 36 is bottom rear perspective view diagram of the pre-form construct after the second side and back end reinforcement strip PLSCs 3070 and 3080 are laid over the male mold 3200 on top of the first side panel PLSCs 3020, the first side reinforcement strip PLSCs 3030, the first back end reinforcement strip PLSC 3040, the second side panel PLSCs 3050, and the third side panel PLSCs 3060. It is noted that the cross-hatching of the second side reinforcement strip PLSCs 3070 illustrated in FIG. 36 are not illustrative of the orientation of the fibers in this PLSC, but are only representative of the 0/90 degree weave of the ply comprising this PLSC or more accurate representation of the orientation of the fibers in this PLSC is depicted in the lateral side view of the pre-form construct illustrated in FIG. 37.

Figure 37:
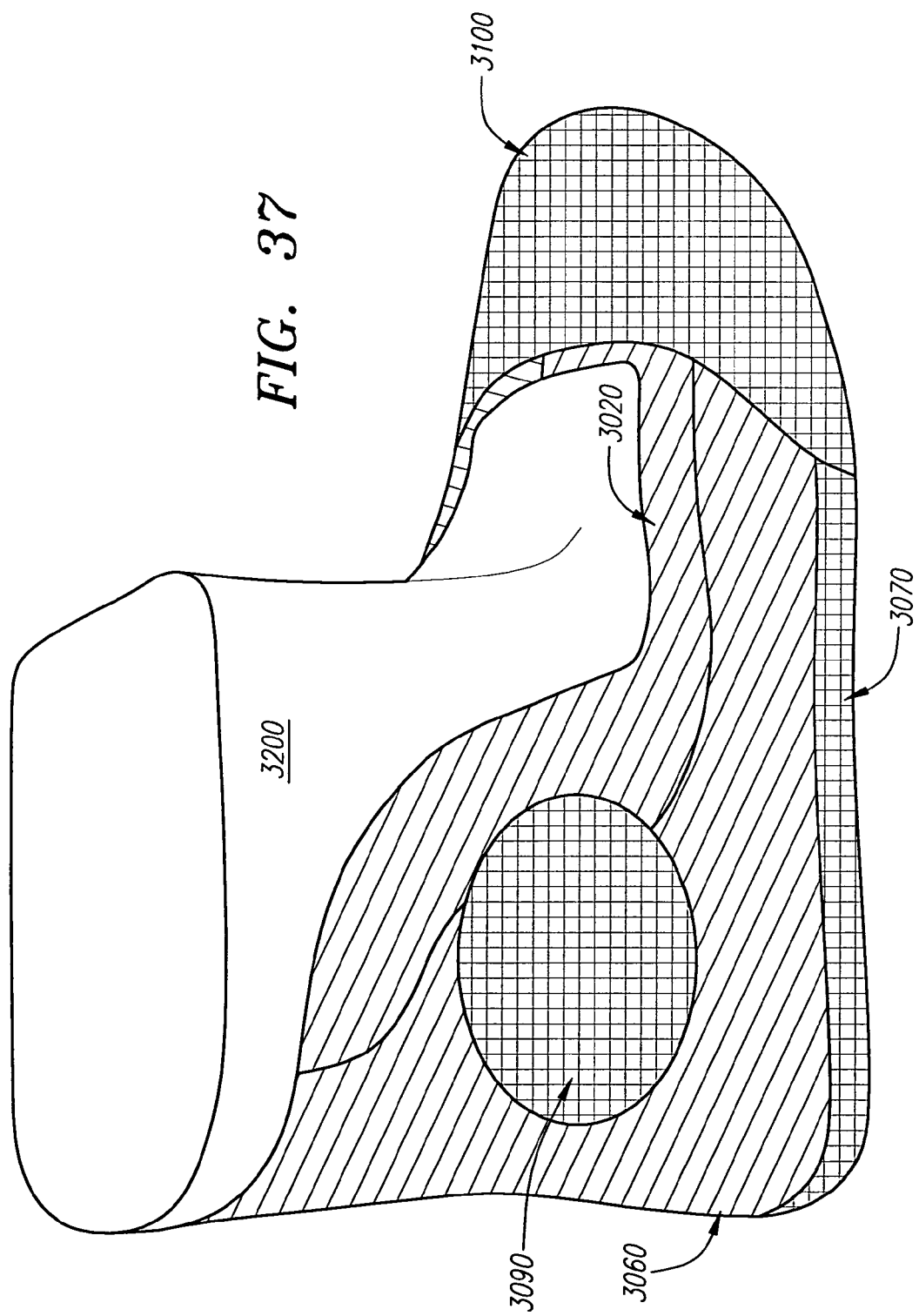
FIG. 37 is a lateral side perspective view diagram illustrating the positioning of the ankle pocket and toe cap reinforcement pre-form lay-up substructure components illustrated in the pre-form kit of FIG. 28 laid over the male mold illustrated in FIGS. 29-36.

FIG. 37 is a lateral side perspective view diagram of the pre-form construct after the ankle pocket and toe cap reinforcement PLSCs 3090 and 3100 are laid over the male mold 3200 on top of the first side panel PLSCs 3020, the first side reinforcement strip PLSCs 3030, the first back end reinforcement strip PLSC 3040, the second side panel PLSCs 3050, the third side panel PLSCs 3060, and second side and back end reinforcement strip PLSCs 3070 and 3080.

Figure 38:
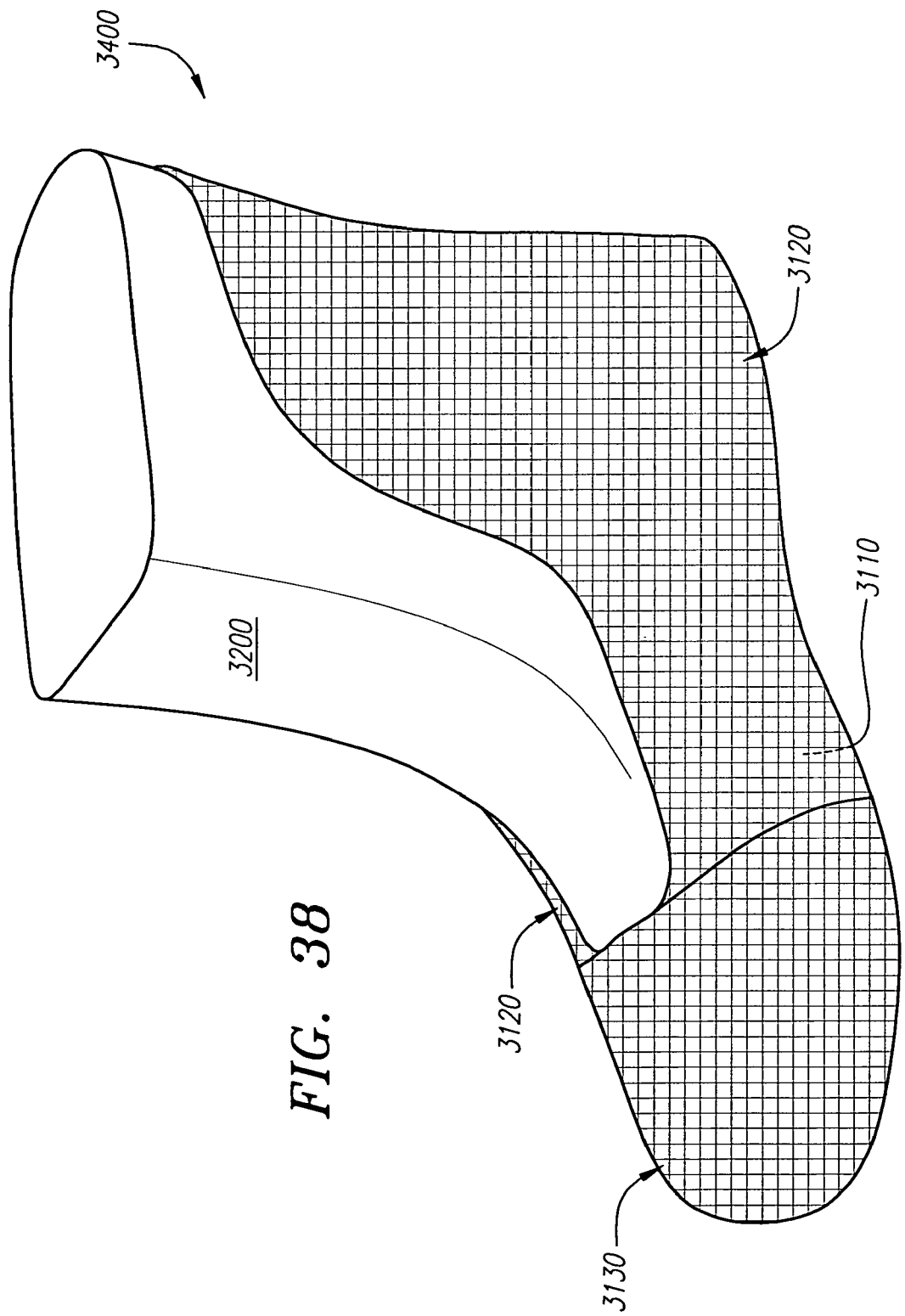
FIG. 38 is a medial side perspective view diagram illustrating the positioning of the outer facing pre-form lay-up substructure components illustrated in the pre-form kit of FIG. 28 laid over the male mold illustrated in FIGS. 29-37.

FIG. 38 is a medial side perspective view diagram of the pre-form construct after the sole, side wall, and toe cap outer facing PLSCs 3090, 3100 and 3110 are laid over the male mold 3200 on top of the first side panel PLSCs 3020, the first side reinforcement strip PLSCs 3030, the first back end reinforcement strip PLSC 3040, the second side panel PLSCs 3050, the third side panel PLSCs 3060, second side and back end reinforcement strip PLSCs 3070 and 3080, and ankle pocket and toe cap reinforcement PLSCs 3090 and 3100.

Notably, the positioning of each of the foregoing PLSCs over the mold and at defined relative positions to each other is facilitated by adhesive qualities of the plies comprising the PLSCs, which is derived from those plies being pre-impregnated with resin or being in the form of a tape. When in the form of a tape, it is typical that each ply has a release liner that is removed prior to the ply being laid on an adjacent ply. Each ply of the multi-ply PLSCs is, vis-a-vis the preferred implementation described in the above-table, in the form of a tape. As such the adhesive properties of the tape, in addition to facilitating the placement of the PLSC over the mold, also facilitates the formation of the multiply lay-up that forms the PLSC. It is contemplated that the release liner on the outer ply of the pre-form kit 3000 PLSCs 3010, 3020, 3030, 3040, 3050, 3060, 3070, 3080, 3090, and 3100 remain on each PLSC facilitate storage and handling of the kit 3000 components prior to the PLSC being placed over the three dimensional mold 3200 to form the pre-form construct 3400.

Figure 39:
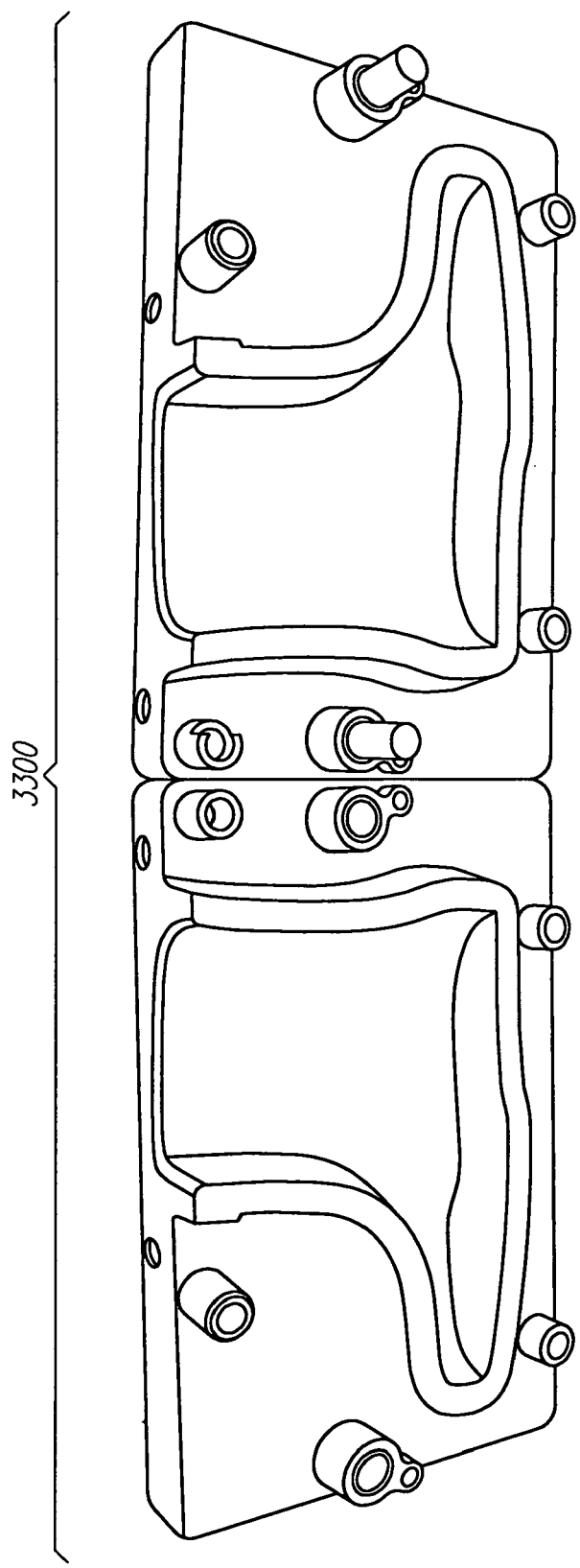
FIG. 39 is an internal perspective view of a female mold configured to receive and mold the exemplary pre-form construct of the unitary support structure lay-up illustrated in FIGS. 28-38 in connection with the process of FIG. 25.
Figure 40:
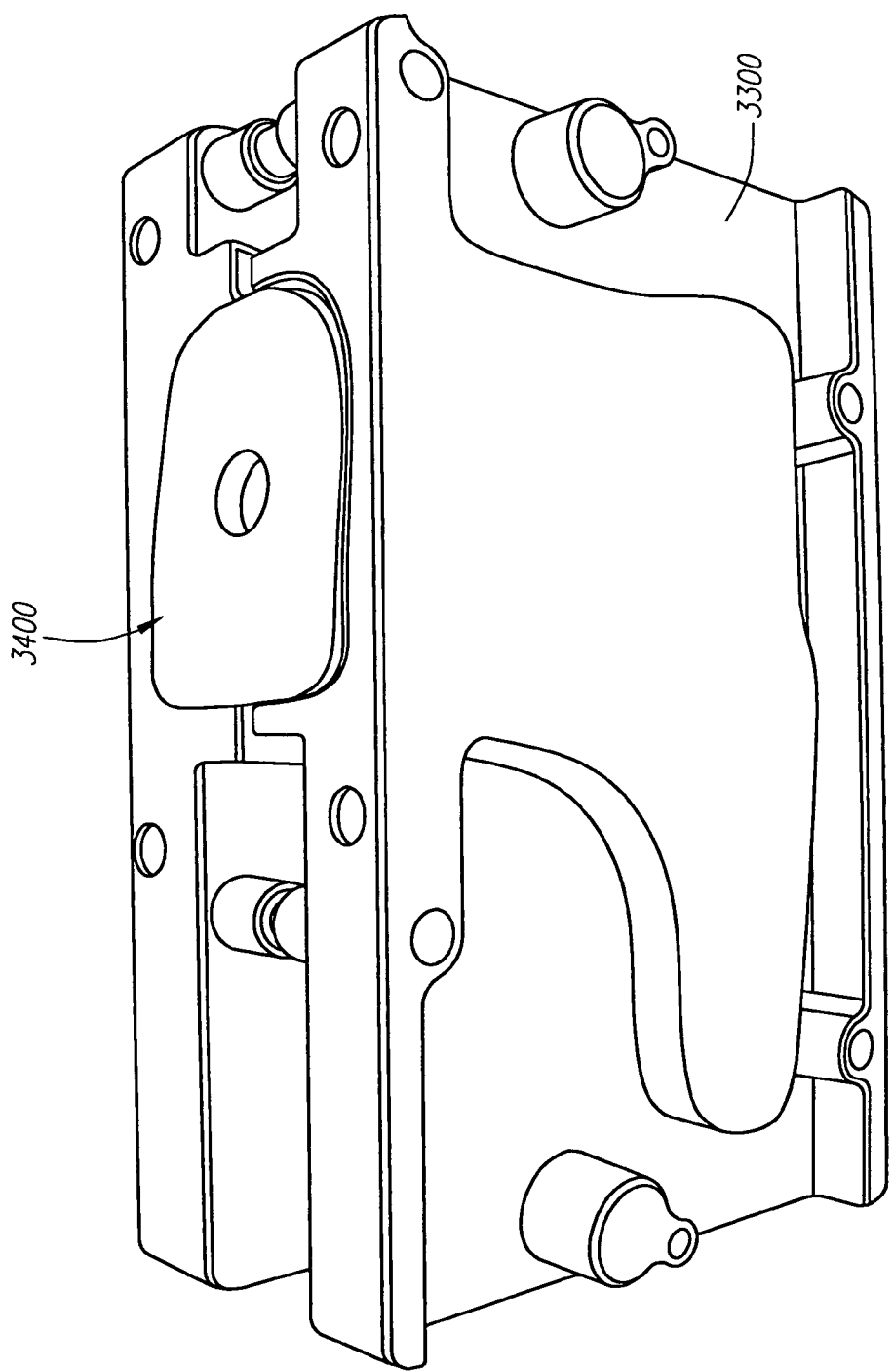
FIG. 40 is an external medial side perspective view of the female mold illustrated in FIG. 39 after receiving the exemplary pre-form construct of the unitary support structure lay-up illustrated in FIGS. 28-38 in connection with the process of FIG. 25.
Figure 41:
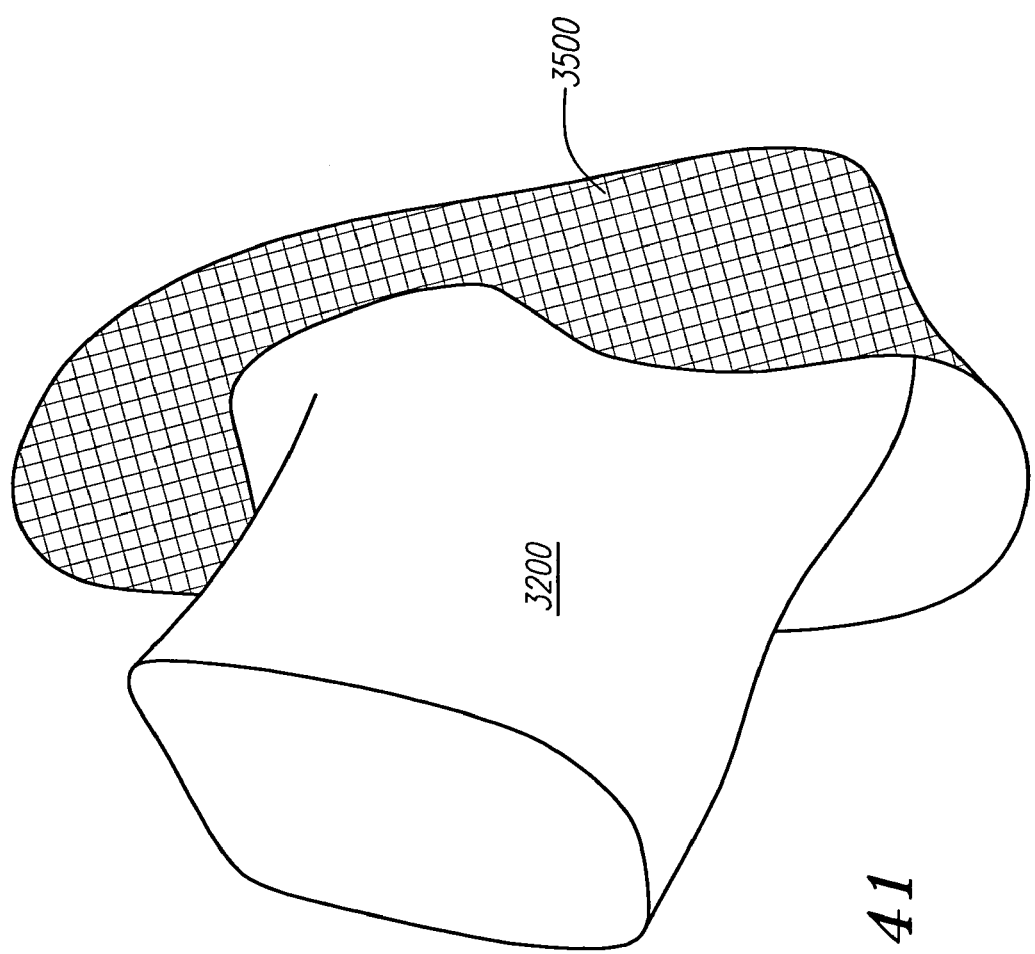
FIG. 41 is top lateral side perspective of the heat expandable component or male mold being removed from the cured pre-form construct of an exemplary unitary support structure formed by the lay up illustrated in FIGS. 28-38 prior to finishing in connection with the process of FIG. 25.

Once each of the ply lay-up sub components are placed over the male mold 3200 as depicted in FIGS. 30-38, the resultant pre-form construct 3400 may be cooled to stabilize it if necessary by refrigeration in accordance with step 2020 described in connection with the process diagrammed in FIG. 25. Such refrigeration may also serve as means for storing un-cured pre-form constructs prior to curing. Because, in the presently preferred exemplary manufacture, the male mold is formed of heat expanding silicone there is no need to remove the male mold 3200 from the pre-form construct prior to curing in that the heat expanding silicone that comprises the male mold itself serves as the heat expanding component. Thus steps 2030 and 2050 of the process diagrammed in FIG. 25 is not necessary. The uncured pre-form construct 3400 with the heat expanding silicone male mold 3200 is then placed within a female mold 3300 having the desired shape of the exterior walls of the desired form of the unitary support structure 110 in accordance with step 2040 of the process diagrammed in FIG. 25. Such a female mold 3300 is illustrated in FIGS. 39 and 40 and notably is configured to generally correspond to the outer formation of the male mold 3200 with the exception that it is slightly greater in dimension to facilitate the PLSCs placed over the male mold 3200. Once the uncured pre-form construct 3400 is placed in the female mold 3300 and the mold is closed and secured about the uncured pre-form construct 3400, heat is applied to the mold to cure the pre-form construct in the female mold 3330 in accordance with step 2060 of the process diagrammed in FIG. 25. After the pre-form construct 3400 is cured it is removed from the female mold (step 2070 of the process diagrammed in FIG. 25) and the heating expanding silicone male mold 3200 is removed from the cured construct as illustrated in FIG. 41 in accordance with step 2080 of the process diagrammed in FIG. 25.

Figure 42:
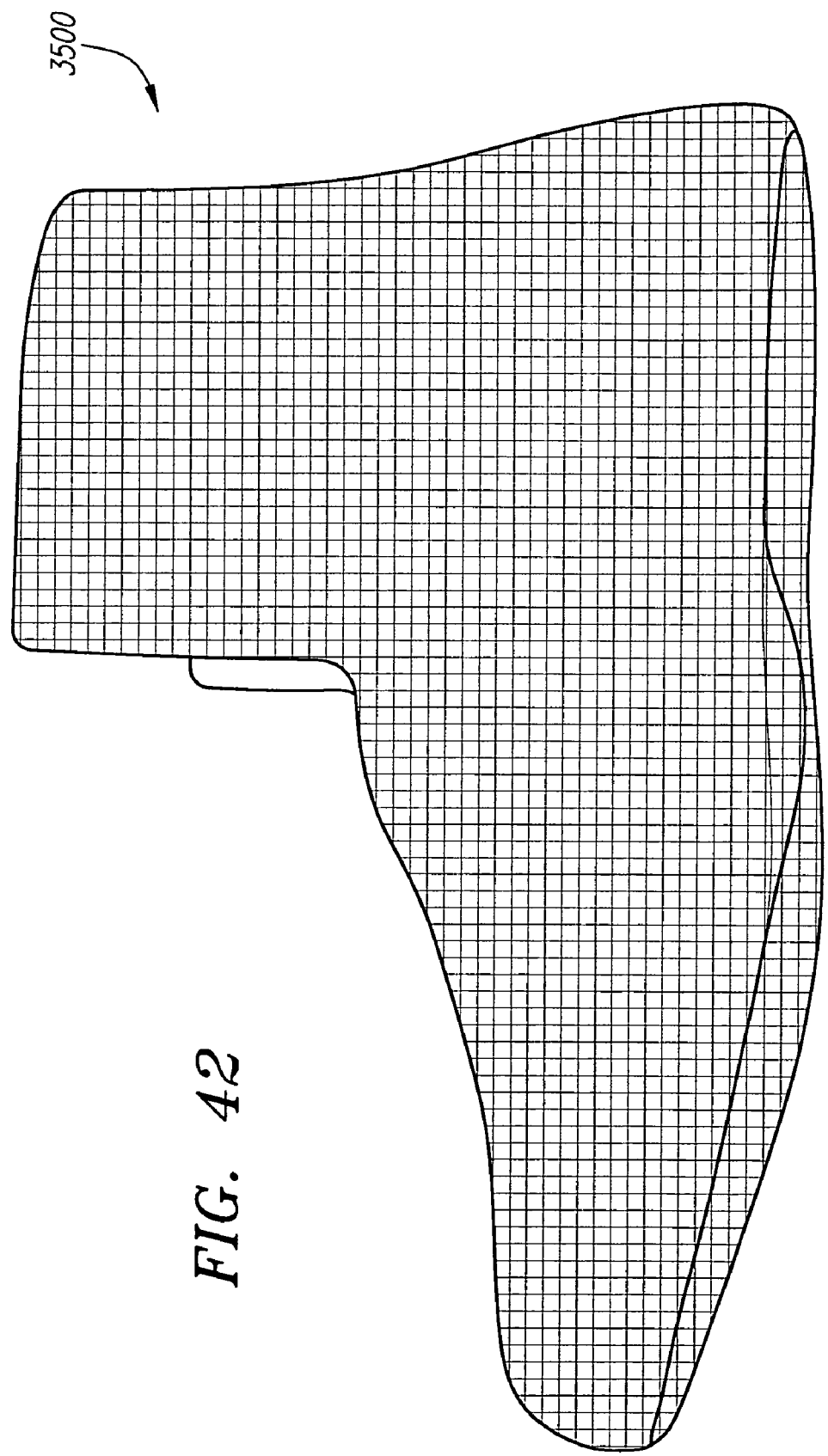
FIG. 42 is a medial side perspective view of the cured pre-form construct after the removal of the heat expandable component and/or male mold but prior to finishing.

The resultant cured pre-form construct 3500, illustrated in FIG. 42, is then placed within a template or jig 3600 (illustrated in FIG. 43) configured to receive the cured pre-form construct 3500. The outer perimeters of the template 3600 corresponds to the desired outer perimeters of the unitary support structure 110 and thereby facilitates the mechanical removal of the partitions or slots (e.g., 161, 162, 163, 164, 271, 272, and 273) and the extraneous wall sections via a suitable mechanical means, such as a rotary cutting device to finish the unitary support structure 110 in accordance with step 2090 of the process diagrammed in FIG. 25. Once the cured pre-form 3500 is finished it is incorporated as a unitary support structure 110 into an article of footwear (step 2100 of the process diagrammed in FIG. 25) as previously described.

Employment of the foregoing method of manufacture is capable of achieving efficient mass production of the articles of footwear disclosed herein. Notwithstanding, it is contemplated that such a kit may be employed in customized applications as well as mass production. In addition, while the kit 3000 above is illustrated as being comprised of a single set of PLSCs, it should be understood that a kit could be comprised of multiple sets of PLSCs, whether or not each set is identical.

V. Additional Operation Characteristics of the Preferred Implementations

The boot 100 of the article of footwear 1 is generally comprised of two components, a generally rigid molded unitary support structure 110 and generally non-rigidly formed upper portion 500. In the preferred implementations the unitary support structure 110 is formed of a sole 115 and a plurality of side walls that extend from the sole 115 upwardly to define the external and internal contours of the article of footwear as well as provide an integrated responsive support structure capable of efficiently transmitting forces from the foot 600. The side walls are longitudinally partitioned from one another to form substructures of the unitary support structure having regions of greater flexibility residing therebetween. Areas of configured flexibility in the boot, even at or about the sole, are capable of being discretely imparted. When the substructures are configured to generally coincide with discrete regions of the foot 600, such as the toe, mid, and heel regions 660, 680, and 670; flexibility and torsion in or between the defined regions of the foot 600 long appreciated in lasted footwear is thus facilitated. Firm support provided by the rigidly formed molded individual substructures is capable without the bulk and weight that a lasted article of footwear typically requires to achieve such support. As a result, break-in time is reduced or eliminated and degradation of the article of footwear 1 with time and use is limited.

The upper portion 500 builds on the performance characteristics embodied by the unitary support structure 110 and augments them to provide fit and performance that is even more similar to those long appreciated in lasted articles of footwear. The upper portion 500 is generally formed of multiple layers of natural or synthetic textiles that in a preferred implementation are stitched and glued to one another and fitted over the perimeter edges of the unitary support structure 110 and attached thereto so as to conform to the internal and external walls of the unitary support structure 110. The internal layers of the upper portion 500 may include areas formed of cushioning materials to provide fit and comfort to the wearer. The layers or panels of the upper portion 500 may preferably extend inwardly beyond the perimeter edges of the side walls that form the unitary support structure 110 and across the separations defined between the wall structures so that portions of the foot cavity are formed to fit similar to a lasted article of footwear. The degree of pliability of the upper portion may be engineered or varied to provide the desired communication between the various wall structures of the unitary support structure as well as the desired conformity around the foot of the wearer. As a result, the combination of a rigidly formed but flexible unitary support structure with a generally pliable upper portion, as described herein, forms a unique footwear hybrid that is capable of providing the fit and comfort similar to that of a lasted article of footwear while also achieving the desirable performance characteristics of a molded footwear structure.

The foregoing specification and the drawings forming part hereof are illustrative in nature and demonstrate certain preferred embodiments of the invention. It should be recognized and understood, however, that the description is not to be construed as limiting of the invention because many changes, modifications and variations may be made therein by those of skill in the art without departing from the essential scope, spirit or intention of the invention. Accordingly, it is intended that the scope of the invention be limited solely by the claims.

The invention claimed is:

1. An article of footwear configured to receive a wearer's foot comprising a pliable upper component and a molded unitary support structure formed of a plurality of wall structures including a sole and first and second side wall structures extending from a first side of the sole;
   the wearer's foot being enclosed by a perimeter and comprising a toe region, a mid region, a heel region, a ball, a lateral extent, an arch;
   the first and second side wall structures being longitudinally partitioned from one another by one or more longitudinal partitions;
   the sole being at least in part constructed of a first and second group of fibers disposed in a hardened resin matrix and wherein each of said first and second groups reside in different layers from one another and wherein the first group of fibers is aligned in a defined orientation that is different than the second group of fibers;
   the first wall being at least in part constructed of a third and fourth group of fibers disposed in a hardened resin matrix and wherein each of said third and fourth groups reside in different layers from one another and wherein the third group of fibers is aligned in a defined orientation that is different than the fourth group of fibers;
   the second wall being at least in part constructed of a fifth and sixth group of fibers disposed in a hardened resin matrix and wherein each of said fifth and sixth groups reside in different layers from one another and wherein the fifth group of fibers is aligned in a defined orientation that is different than the sixth group of fibers; and
   the pliable upper component comprising outer and inner panels that overlap the inner and outer surfaces of at least one of the first and second side walls structures, said inner or outer panel being non-detachably conjoined to the wall structure.

2. The article of footwear of claim 1, wherein one or more of the longitudinal partitions defined between the first and second side wall structures is configured to reside on the unitary support structure vertically below the ball of the wearer's foot.

3. The article of footwear of claim 1, wherein one or more of the longitudinal partitions defined between the first and second side wall structures is configured to reside on the unitary support structure vertically below the ankle of the wearer's foot.

4. The article of footwear of claim 1, wherein one or more of the longitudinal partitions defined between the first and second side wall structures is configured to reside on the unitary support structure vertically below the arch of the wearer's foot.

5. The article of footwear of claim 1, wherein one or more of the longitudinal partitions defined between the first and second side wall structures is configured to reside on the unitary support structure vertically below the perimeter of the wearer's foot.

6. The article of footwear of claim 1, wherein one or more of the longitudinal partitions defined between the first and second side wall structures is configured to reside on the unitary support structure longitudinally with the ball of the wearer's foot.

7. The article of footwear of claim 1, wherein one or more of the longitudinal partitions defined between the first and second side wall structures is configured to reside on the unitary support structure longitudinally with the lateral extent of the wearer's foot.

8. The article of footwear of claim 1, wherein one or more of the longitudinal partitions defined between the first and second side wall structures are configured to reside on the unitary support structure longitudinally between the mid region and the heel region of the wearer's foot.

9. The article of footwear of claim 1, wherein one or more of the longitudinal partitions defined between the first and second side wall structures are configured to reside on the unitary support structure longitudinally between the mid region and the heel region of the foot and one or more additional longitudinal partitions are configured to reside on the unitary support structure longitudinally between the toe region and mid region of the wearer's foot.

10. The article of footwear of claim 1, wherein one or more of the longitudinal partitions defined between the first and second side wall structures are configured to correspond with regions of desired flex in the article of footwear.

11. The article of footwear of claim 1, wherein the unitary support structure is attached to an ice skate blade and blade holder.

12. The article of footwear of claim 11, wherein one or more of the longitudinal partitions defined between the first and second side wall structures are configured to correspond longitudinally to positions on the blade that reside between laterally supported and unsupported regions of the blade.

13. The article of footwear of claim 11, wherein the blade holder is comprised of a heel and toe region longitudinally spaced a part from one another at their upper extents and wherein one or more of the longitudinal partitions defined between the first and second side wall structures are configured to correspond longitudinally to positions on the blade holder that correspond to a posterior end of the toe region of the blade holder.

14. The article of footwear of claim 11, wherein the blade holder is comprised of a heel and toe region longitudinally spaced a part from one another at their upper extents and wherein one or more of the longitudinal partitions defined between the first and second side wall structures are configured to correspond longitudinally to positions on the blade holder that correspond to an the anterior end of the heel region of the blade holder.

15. An article of footwear configured to receive a wearer's foot comprising pliable upper component and a molded unitary support structure formed of a plurality of wall structures including a sole and a first and a second side wall structure each wall structure extending from a first side of the sole;
the wearer's foot being enclosed by a perimeter and comprising a toe region, a mid region, a heel region, a ball, a lateral extent, an arch comprising a posterior end and an anterior end;
the first side wall structure includes a forward facing edge and the second side wall structure includes a rearward facing edge, said forward and rearward facing edges being longitudinally opposed to one another to define a slot there-between that extends upward above the sole from a terminal end point positioned on the unitary support structure to reside vertically below the arch of the foot,
regions of the first and second side wall structures residing above the terminal end point are non-contiguous with one another;
wherein said sole and first and second side wall structures each are at least in part constructed of multiple groups of fibers disposed in a hardened resin matrix;
wherein one group of fibers in each of said sole, and first and second wall structures is aligned in a defined orientation that is different than a second group of fibers residing in a different layer within the same wall structure; and
wherein the pliable upper component comprising outer and inner panels that overlap the inner and outer surfaces of at least one of the first and second side walls structures, said inner or outer panel being non-detachably conjoined to the wall structure.

16. The article of footwear of claim 15, wherein the terminal end point resides vertically below the perimeter of the foot.

17. The article of footwear of claim 15, wherein at least a portion of the slot is configured to coincide longitudinally with the ball of the foot.

18. The article of footwear of claim 15, wherein at least a portion of the slot is configured to coincide longitudinally with the lateral extent of the foot.

19. The article of footwear of claim 15, wherein at least a portion of the slot is configured to coincide longitudinally with the posterior end of the arch of the foot.

20. The article of footwear of claim 15, wherein at least a portion of the slot is configured to coincide longitudinally between the toe and mid regions of the foot.

21. The article of footwear of claim 15, wherein at least a portion of the slot is configured to reside longitudinally between the heel and mid regions of the foot.

22. The article of footwear of claim 15, wherein at least a portion of the slot is configured to reside longitudinally within the toe region of the foot and anterior to the ball of the foot.

23. The article of footwear of claim 15, wherein the terminal end point is positioned at the sole.

24. The article of footwear of claim 15, wherein the slot has a curve-linear shape.

* * * * *